(12) United States Patent
Pauly et al.

(10) Patent No.: US 9,576,553 B2
(45) Date of Patent: Feb. 21, 2017

(54) METHOD OF PRODUCING A REFLECTIVE OR REFRACTIVE SURFACE

(71) Applicant: ECOLE POLYTECHNIQUE FEDERALE DE LAUSANNE, Lausanne (CH)

(72) Inventors: Mark Pauly, Lausanne (CH); Thomas Kiser, Zurich (CH)

(73) Assignee: ECOLE POLYTECHNIQUE FEDERALE DE LAUSANNE, Lausanne (CH)

( * ) Notice: Subject to any disclaimer, the term of this patent is extended or adjusted under 35 U.S.C. 154(b) by 552 days.

(21) Appl. No.: 13/974,989

(22) Filed: Aug. 23, 2013

(65) Prior Publication Data
US 2014/0071155 A1    Mar. 13, 2014

(30) Foreign Application Priority Data

Sep. 13, 2012 (EP) .................................. 12184255

(51) Int. Cl.
| | | |
|---|---|---|
| *G09G 5/02* | (2006.01) | |
| *G06T 17/20* | (2006.01) | |
| *G02B 5/10* | (2006.01) | |
| *G02B 27/00* | (2006.01) | |
| *G02B 27/09* | (2006.01) | |

(52) U.S. Cl.
CPC ..... *G09G 5/02* (2013.01); *G02B 5/10* (2013.01); *G02B 27/0012* (2013.01); *G02B 27/0927* (2013.01); *G06T 17/20* (2013.01)

(58) Field of Classification Search
CPC ........................................................ G09G 5/02
See application file for complete search history.

(56) References Cited

U.S. PATENT DOCUMENTS

2012/0038644 A1* 2/2012 Jones ................... G06T 15/506
                                                                                   345/426

OTHER PUBLICATIONS

Patow, Gustavo, Xavier Pueyo, and Alvar Vinacua. "User-guided inverse reflector design." Computers & Graphics 31.3 (2007): 501-515.*
Papas, Marios, et al. "Goal-based Caustics." Computer Graphics Forum. vol. 30. No. 2. Blackwell Publishing Ltd, 2011.*
Anson, O., et al., "NURBS-based inverse reflector design," *Proceedings of CEIG 2008*, Barcelona, Sep. 3-5, 2008, pp. 1-10.
Canny, J., "A Computational Approach to Edge Detection," *IEEE Transactions on Pattern Analysis and Machine Intelligence*, Nov. 1986, vol. PAMI-8, No. 6, pp. 679-698.
Chaniotis, A.K., et al., "High order interpolation and differentiation using B-splines," *Journal of Computational Physics*, Jun. 2004, vol. 197, No. 1, pp. 253-274.
Doyle, S., et al., "Automated mirror design using an evolution strategy," *Optical Engineering*, Feb. 1999, vol. 38, No. 2, pp. 323-333.

(Continued)

*Primary Examiner* — Maurice L McDowell, Jr.
(74) *Attorney, Agent, or Firm* — Saliwanchik, Lloyd & Eisenschenk

(57) ABSTRACT

A method and apparatus for producing a reflective or refractive surface that reflects or refracts light shined thereon and reproduces on a screen a desired greyscale intensity image on which the reflective or refractive surface is based and a corresponding apparatus, wherein the method permits a reproduction of a reference grayscale image with adjustable precision.

28 Claims, 29 Drawing Sheets

(56) References Cited

OTHER PUBLICATIONS

Fattal, R., et al., "Gradient Domain High Dynamic Range Compression," *Proceedings of the 29th Annual Conference on Computer Graphics and Interactive Techniques*, New York, NY, 2002, pp. 249-256.

Finckh, M., et al., "Geometry Construction from Caustic Images," *Computer Vision—ECCV 2010*, vol. 6315 of *Lecture Notes in Computer Science*, Springer, 2010, pp. 464-477.

Golub, G.H., et al., *Matrix Computations*, Johns Hopkins University Press, 3rd ed., 1996.

Hackbush, W., *Multi-Grid Methods and Applications*, Springer Series in Computational Mathematics, Springer, 1985.

Loos, J., et al., "Using Wavefront Tracing for the Visualization and Optimization of Progressive Lenses," *Computer Graphics Forum*, 1998, vol. 17, No. 3, pp. 255-265.

Mas, A., et al., "Fast Inverse Reflector Design (FIRD)," *Computer Graphics Forum*, 2009, vol. 28, No. 8, pp. 2046-2056.

Neubauer, A., "Design of 3D-Reflectors for Near Field and Far Field Problems," *Institute for Mathematics and its Applications*, 1997, vol. 92, pp. 101-118.

Nocedal, J., et al., *Numerical Optimization*, Springer, 2nd ed., 2006.

Papas, M., et al., "Goal-based Caustics," *Computer Graphics Forum*, 2011, vol. 30, No. 2, pp. 503-511.

Patow, G., et al., "A Survey of Inverse Surface Design From Light Transport Behavior Specification," *Computer Graphics Forum*, 2005, vol. 24, No. 4, pp. 773-789.

Patow, G., et al., "User-guided inverse reflector design," *Computers & Graphics*, 2007, vol. 31, No. 3, pp. 501-515.

Richardson, W.H., "Bayesian-Based Iterative Method of Image Restoration," *Journal of the Optical Society of America*, Jan. 1972, vol. 62, No. 1, pp. 55-59.

Shewchuk, J.R., "An Introduction to the Conjugate Gradient Method Without the Agonizing Pain," Technical report, Carnegie Mellon University, Pittsburgh, PA, Aug. 4, 1994.

Walter, B., et al., "Single Scattering in Refractive Media with Triangle Mesh Boundaries," *ACM Transactions on Graphics*, Aug. 2009, vol. 28, No. 3, Article No. 92, pp. 1-8.

Westcott, B.S., et al., "Reflector synthesis for generalized far-fields," *Journal of Physics A: Mathematical and General*, 1975, vol. 8, No. 4, pp. 521-532.

Weyrich, T., et al., "Fabricating Microgeometry for Custom Surface Reflectance," *ACM Transactions on Graphics*, Aug. 2009, vol. 28, No. 3, Article No. 32, pp. 1-6.

\* cited by examiner

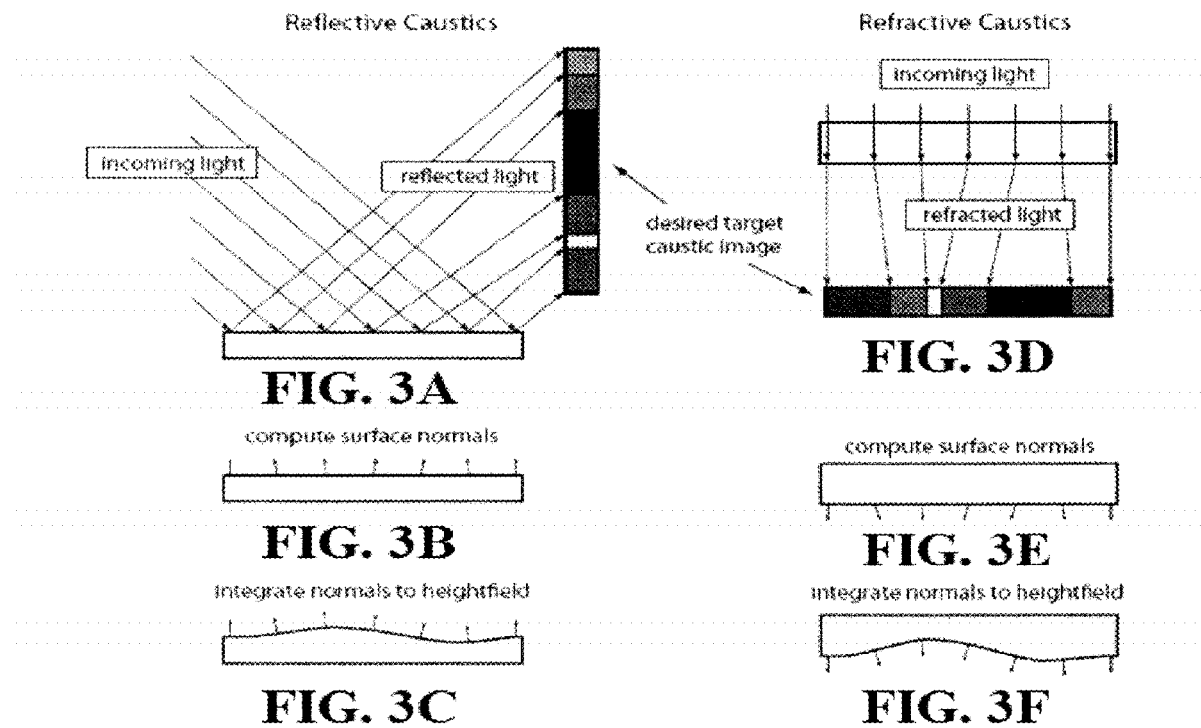
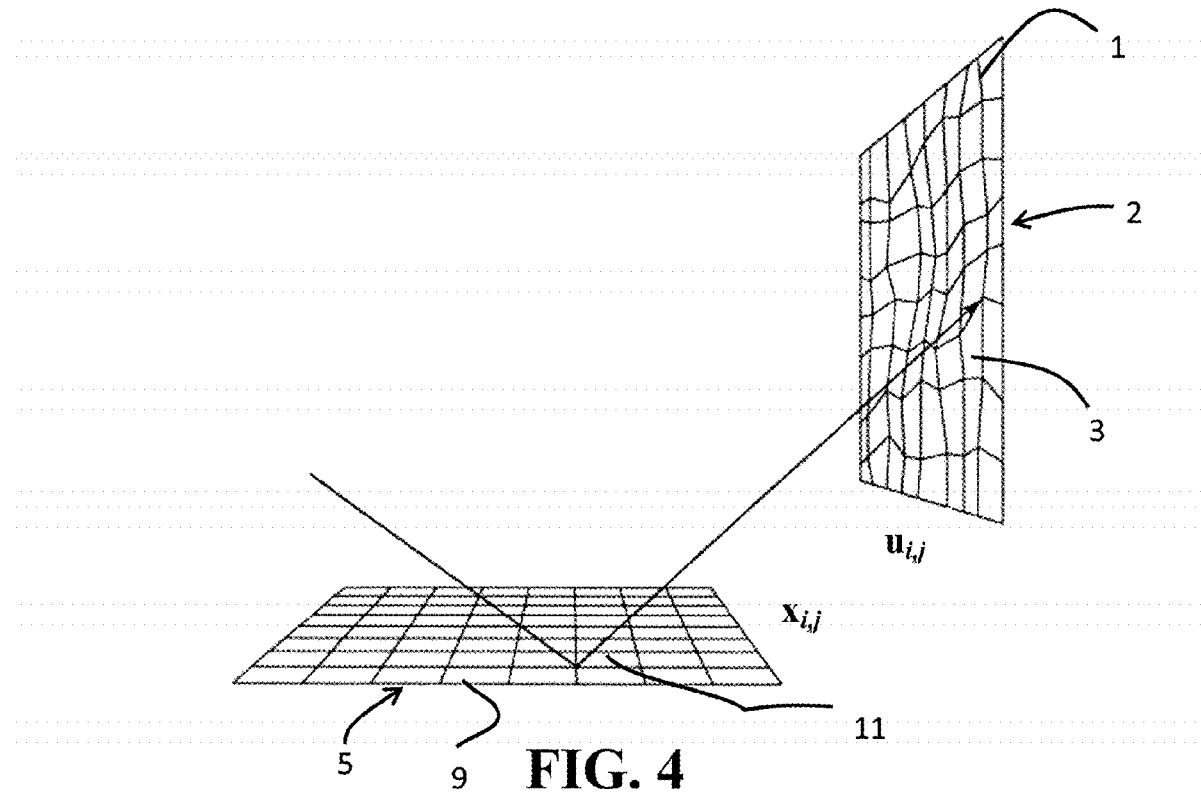

 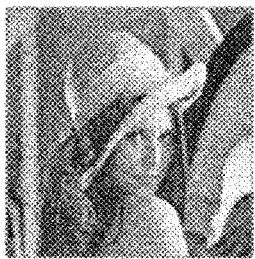  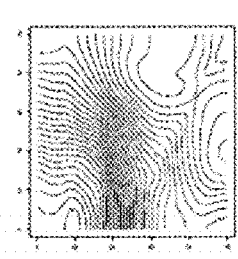
FIG. 5A   FIG. 5B   FIG. 5C   FIG. 5D
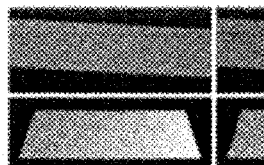 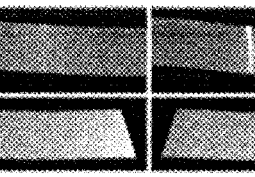  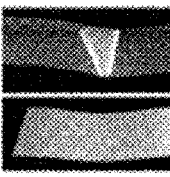 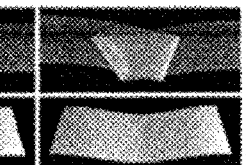
FIG. 6A   FIG. 6B   FIG. 6C   FIG. 6D   FIG. 6E
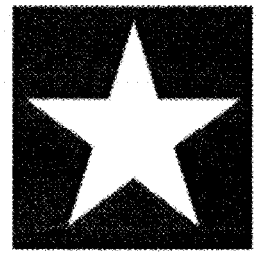 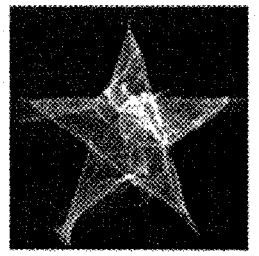 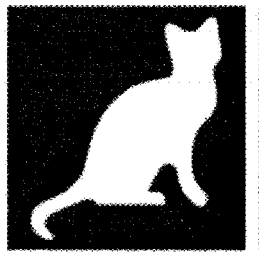 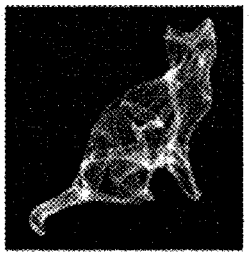
FIG. 7A   FIG. 7B   FIG. 7C   FIG. 7D

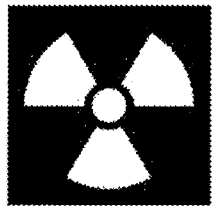 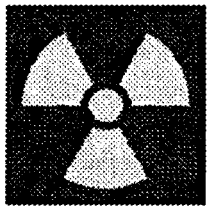 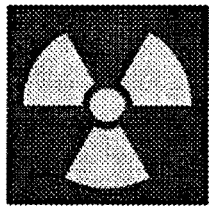 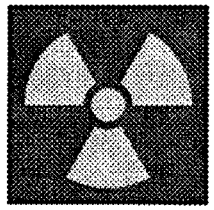 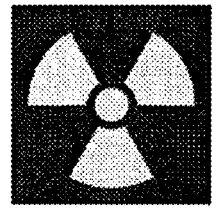
FIG. 16A    FIG. 16B    FIG. 16C    FIG. 16D    FIG. 16E
 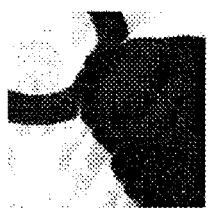 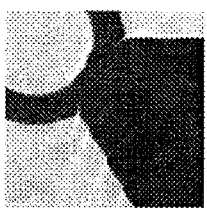 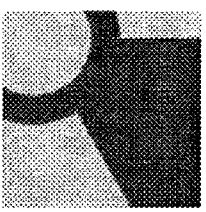 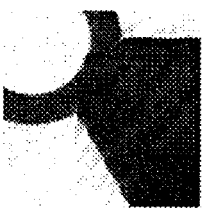
FIG. 16F    FIG. 16G    FIG. 16H    FIG. 16I    FIG. 16J
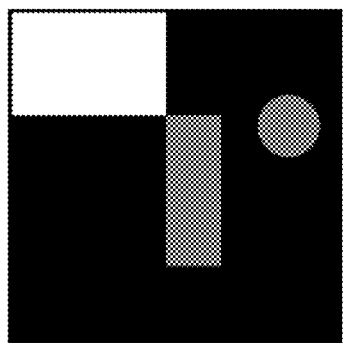 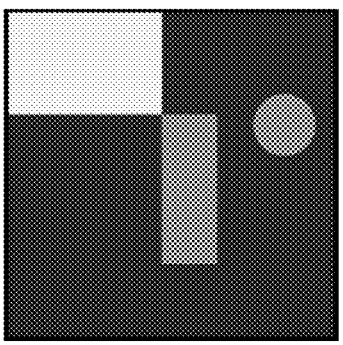 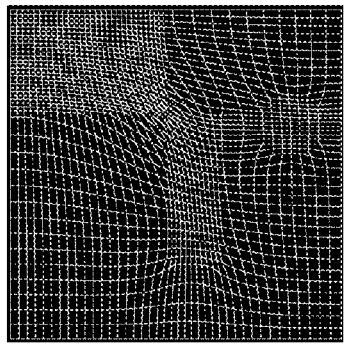
FIG. 17A    FIG. 17B    FIG. 17C

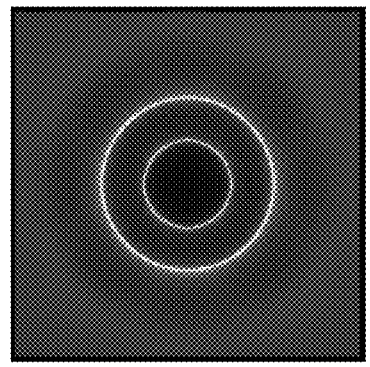 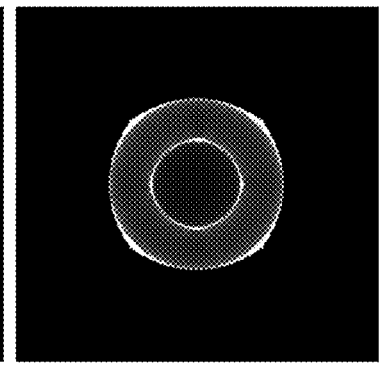
FIG. 29A  FIG. 29B
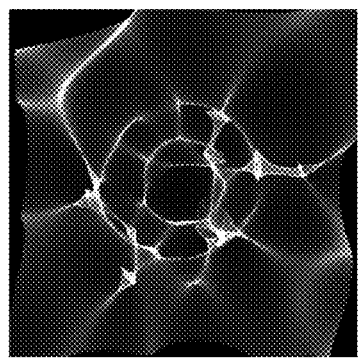 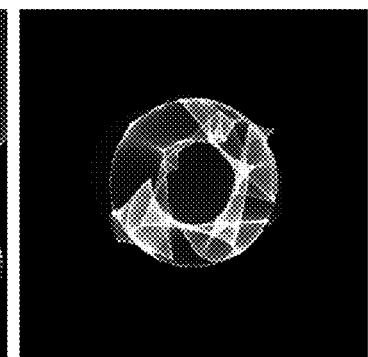
FIG. 29C  FIG. 29D
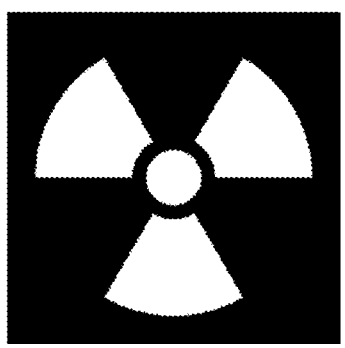 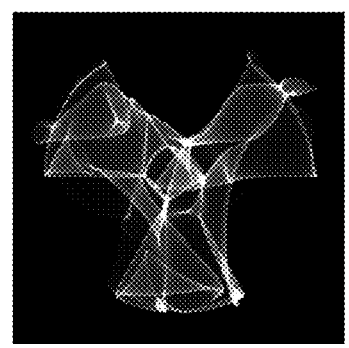 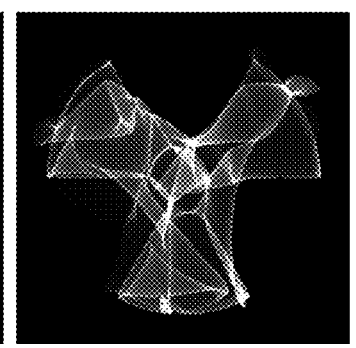
FIG. 30A  FIG. 30B  FIG. 30C

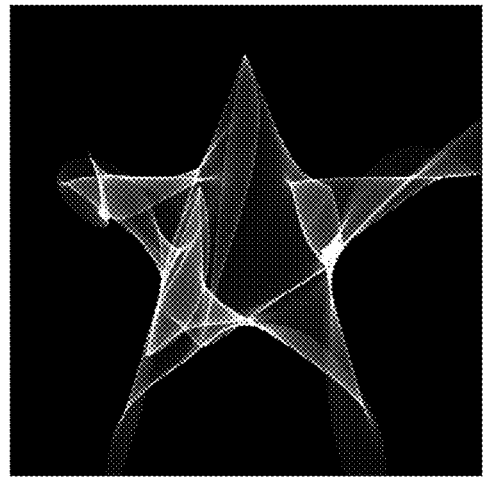
FIG. 33
 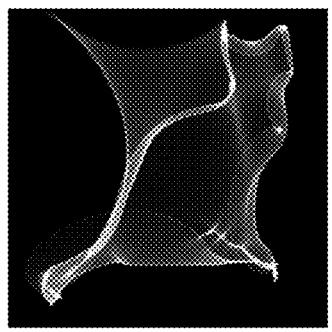 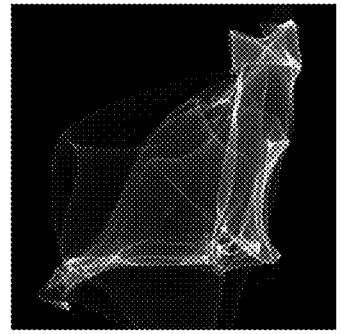
FIG. 34A    FIG. 34B    FIG. 34C

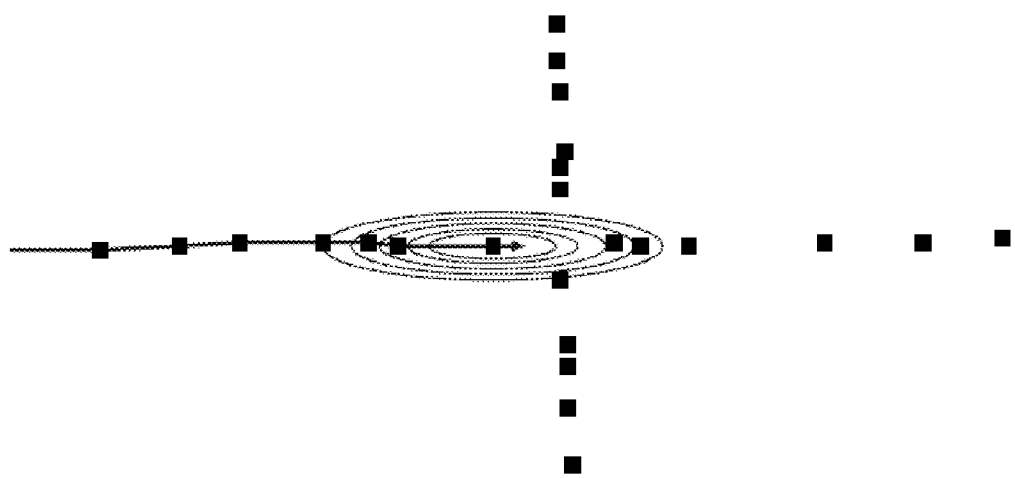
FIG. 37B
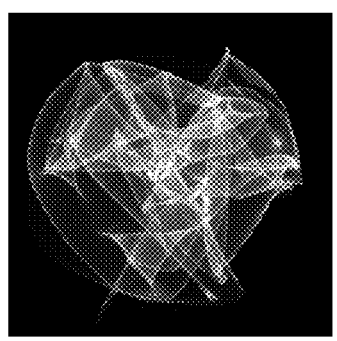 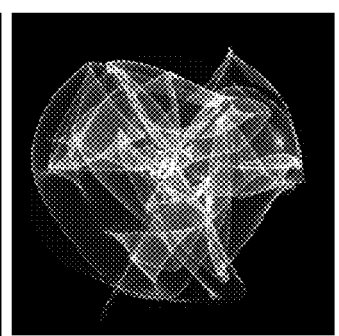 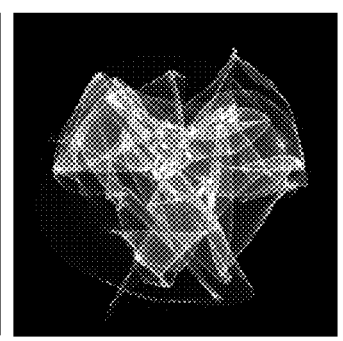
FIG. 38A      FIG. 38B      FIG. 38C

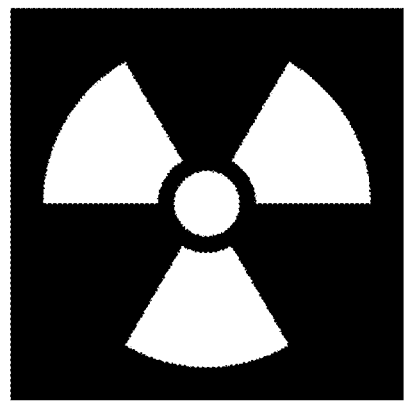
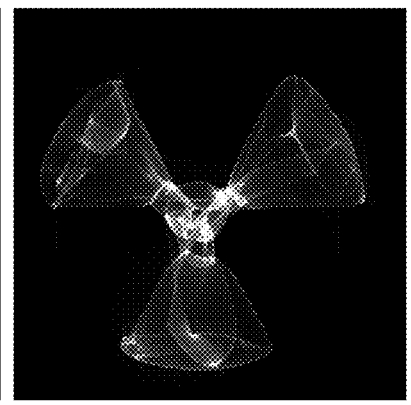
FIG. 39A  FIG. 39B
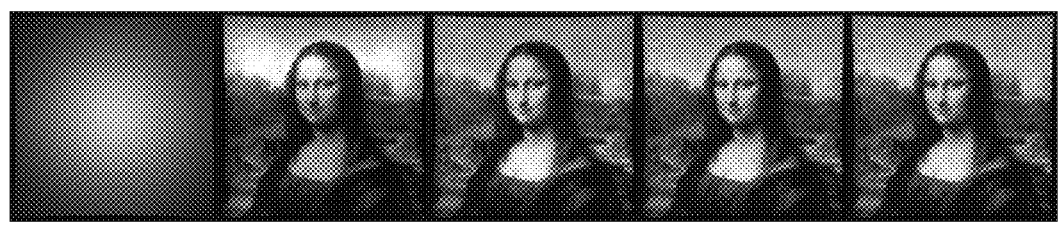
FIG. 40A FIG. 40B FIG. 40C FIG. 40D FIG. 40E

  
FIG. 43A  FIG. 43B  FIG. 43C
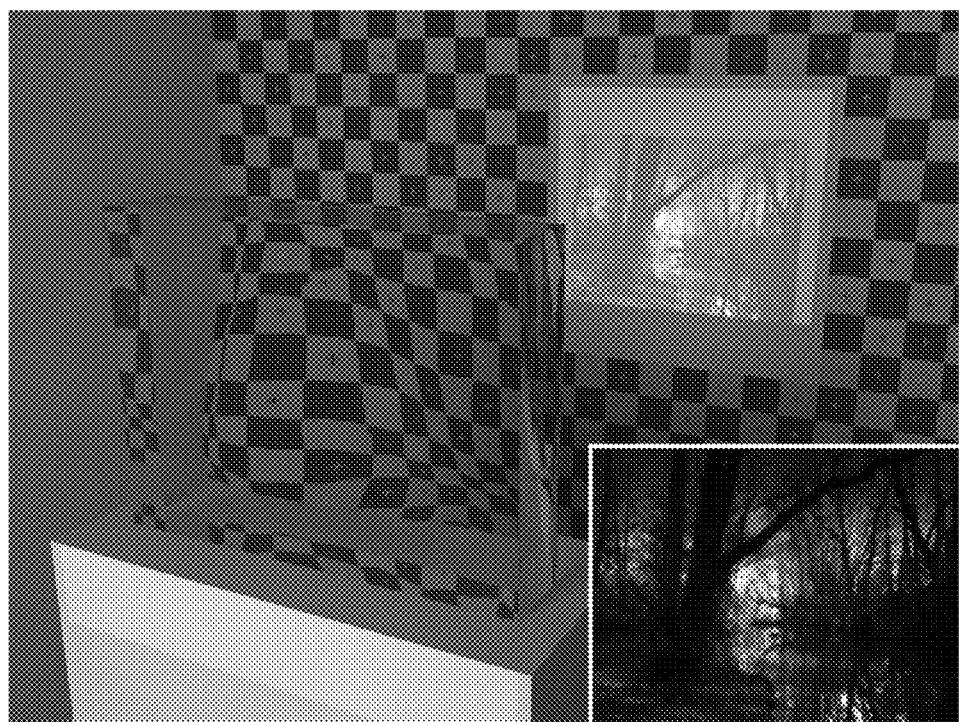
FIG. 44

METHOD OF PRODUCING A REFLECTIVE OR REFRACTIVE SURFACE

CROSS-REFERENCE TO RELATED APPLICATION

The present application claims priority to European patent application 12 184 255.3, filed on Sep. 13, 2012, the disclosure of which is hereby incorporated by reference in its entirety, including any figures, tables or drawings.

FIELD OF INVENTION

Embodiments of the invention relate to a method and an apparatus for producing a surface having a structure that reflects or refracts light shined thereon that reproduces on a screen a desired greyscale intensity image based on that the reflective or refractive surface was produced. Such an image is commonly known as caustics.

BACKGROUND INVENTION

Generally, in optics caustics are patterns of light created by reflection or refraction on curved surfaces. Computing caustics in a given three dimensional scene has been the subject of extensive research in computer graphics as it constitutes one of the main difficulties of photorealistic rendering algorithms.

The task of reproducing a pre-specified light distribution by a specular surface also arises in the field of inverse reflector design, which concentrates on reflectors for lamps. A survey on inverse reflector design is given by Patow and Pueyo [PP05; Patow et al; 2005]. Generally, such light distributions can be classified as either near-field or far-field distributions.

While near-field distributions specify an irradiance distribution on a given surface (typically a plane) that is to be reproduced, far-field distributions can be considered as limit cases where the surface to be illuminated is infinitely far away from the reflector, so that only the distribution of the ray directions matters. Methods for inverse reflector design typically employ an analysis-by-synthesis approach. A certain surface representation is chosen to parametrize the reflector, such as NURBS [ASG08; Anson et al. 2008]. Then, the light distribution caused by a surface is evaluated and rated against the desired one. This method is iteratively used to optimize the surface parameters. Various optimization strategies have been applied, including frameworks that allow an analytical differentiation, thereby enabling the use of the conjugate gradient method [Neu97; Neubauer 1997], and methods that compute derivatives approximately [FDL10; Finckh et al. 2010] to ones that employ no derivatives at all [ASG08; Anson et al. 2008].

Examples using an evolutionary optimization [DCC99; Doyle et al. 1999] also belong to the latter category. Common simplifications in the approaches are the assumption of perfect specularity of the surface and the assumption of only one bounce of light without interreflections or occlusions, although exceptions to both also exist [PPV07; Patow et al. 2007; MMP09; Mas et al. 2009]. The restriction to rotationally symmetric reflectors is also commonly used, particularly in theoretical works [WN75; Westcott et al. 1975].

These works mostly focus on reflective surfaces, although many approaches readily can be extended to refraction as well. One noteworthy example investigating the problem of refraction is the work by [FDL10; Finckh et al. 2010]. They use GPU computations to speed up the caustic evaluation, and a stochastic approximation algorithm for the optimization, which is able to find a global optimum.

Concerning refractive objects, the field of lens design is also noteworthy, although the goals of these problems are different, e.g. aberration correction. These problems are often restricted to a small number of parameters such as radii of the underlying primitive shapes [PP05; Patow et al. 2005]. Again, there are exceptions, e.g. the work by [LSS98; Loos et al. 1998], who use a NURBS-based representation to optimize progressive lenses.

[WPMR09; Weyrich et al. 2009] have chosen a different approach to reproduce a pre-specified far-field distribution. First, they generated a set of sloped, planar microfacets to realize the desired distribution of ray directions. Then, they arranged the microfacets in a regular array using simulated annealing to minimize the resulting discontinuities. Closely related to Weyrich et al.'s work is the system for near-fields proposed by [PJJ+11; Papas et al. 2011]. They extended the notion of microfacets to curved micropatches, which are used to produce specks of light with an anisotropic Gaussian distribution. To compute the shape of the micropatches that produce a Gaussian irradiance distribution, Papas et al. define a bijective mapping between points in the micropatch domain and points on the projection plane, analytically compute the surface normals that refract/reflect the light in this way, and finally integrate this normal field to arrive at the required micropatch surface.

It is an object of the present invention to provide a method for producing a reflective or refractive surface that reflects or refracts light shined thereon and reproduces on a screen a desired greyscale intensity image on which the reflective or refractive surface is based and a corresponding apparatus, wherein the method permits a reproduction of a reference grayscale image with adjustable precision.

BRIEF SUMMARY

The invention relates to computing the 3D shape of reflective or refractive objects, called "caustic generator object", or "generator" for short, such that when illuminated with light of a certain configuration, the reflected or refracted light creates a specific pattern as specified by an image or intensity map provided by the user, on a "caustic receiver surface" that is also provided by the user.

The invention is described in detail and illustrated with figures in the detailed description.

Accordingly, in a main aspect the invention provides a method for computing a freeform surface that exhibits a specific light reflection or refraction pattern comprising
  a step of discretization of the spatial light volume based on a 2D mesh representation, called the "photon mesh"; and
  an optimization step to produce the desired caustic generator object.

The method assumes as input the desired output light intensity distribution, specified by a gray-scale image or intensity map, the geometrical arrangement of light source, caustic generator, and caustic receiver, and a specification of light emittance of the light source and optical properties of the caustic generator material. The method assumes a geometric model of optics. To obtain the desired surface, the algorithm solves for the surface normals of the generator then derives the final surface from these normals. The optimization includes an objective term that ensures, that given the computed normal field, the actual surface is realizable. Two variants of the method exist: One takes as input a gray scale intensity image and produces output caustics without folds. Folds are regions of the photon mesh that overlap to create very bright spots or lines in the caustic image. The second method provides a means to create folds by integrating mathematical conditions for folds into the optimization scheme.

The optimization is designed to create a continuous, smooth surface that can be manufactured, for example, by milling with subsequent polishing. A smoothness term is incorporated into the optimization to ensure that sufficient smoothness is obtained.

The generation of caustics from given geometry is a popular problem in computer graphics. This patent application contemplates the inverse problem: Given a greyscale image, find the shape of a surface that will cast a caustic to match it. Two novel approaches are proposed. The first approach is suited for natural images and is able to reproduce them accurately with a smooth reflective or refractive surface. It works by optimizing a two-dimensional mesh on the specular surface, where each face is responsible for a patch of the caustic, and its area determines the resulting brightness of that patch. A normal field is obtained from this deformed mesh and subsequently integrated to a height field. The second approach, suited mainly for monochrome images, reproduces edges using the typical, sharp features of caustics, herein referred to as folds. Properties of such patterns are studied and turned into an optimization framework, which again produces a normal field. This idea is then extended to a system allowing user-guided corrections of the results. Both approaches are demonstrated on various images and verified using the open-source rendering software LuxRender.

Embodiments of the subject method comprise the acts of discretizing a two dimensional image into a first mesh of first nodes on a first surface, wherein nodes on the first surface define a first cell area $A_{d,1}$ of the first mesh on which a first beam of light with a first radiant flux $\Phi_1$, is incident, wherein the first cell area $A_{d,1}$ of the first mesh corresponds to an area of the two-dimensional image having a brightness to which the first radiant flux $\Phi_1$ corresponds; discretizing a reflective or refractive second surface into a second mesh of second nodes, wherein nodes on the second surface define a first cell area $A_{s,i}$ of the second mesh on which the first beam of light with the first radiant flux $\Phi_i$ is incident and is deviated towards the first cell area $A_{d,1}$ of the first mesh; and adjusting the positions of the nodes of the first cell area $A_{s,1}$ of the second mesh on the second surface so that the first cell area $A_{s,1}$ of the second mesh corresponds to a predefined radiant exitance $M_1$ of the first beam of light incident on the second surface.

According to embodiments of the subject method a height field is inferred from a given two dimensional grayscale image or caustic mesh by a "backward" calculation. The grayscale image is described by a fixed first mesh of first nodes defining cell areas of the first mesh between the nodes, while the nodes of the second mesh defining cell areas of the second mesh between the nodes on the specular or refractive second surface from where the rays emanate to the surface where the grayscale image is produced are moved. By deforming the second mesh or its cell areas, the desired amounts of light can be allocated to the corresponding cells of the fixed first mesh, wherein the larger the area of a cell in the "warped" second mesh on the specular plane is, the more light is projected on the unchanged cell area in the caustic mesh, increasing the brightness.

According to an embodiment the method further includes determining surface normals at each of the nodes of first cell area $A_{s,1}$ of the second mesh with adjusted positions on the second surface, the surface normals corresponding to rays of the first beam of light that are incident on the second surface and extend between the nodes of the first cell area $A_{s,1}$ of the second mesh with adjusted positions on the second surface and the nodes of the first cell area $A_{d,1}$ of the first mesh on the first surface; and calculating a height field corresponding to the surface normals.

According to another embodiment, the method comprises the adjusting of the positions of nodes of all cell areas $A_{s,i}$ of the second mesh. Once the desired deformation of the second mesh is found by applying the method to all cell areas of the second mesh, the normal field can be obtained. A mesh may include any suitable number of cells such as 10000, 1 million, 10 million, 100 million or any number in between. Both meshes may include the same number of cells.

The amount of light transported through a frustum defined by the rays forming a cell area of the first or second mesh remains constant. This allows assigning a brightness value to each cell of the first mesh, i.e. the photon mesh. Further details with regard to an embodiment for determining the desired areas of the cells in the warped mesh on the second surface are described in Section 3.1 Quad Brightness and Section 3.2 Integrability of the detailed disclosure.

The actual geometry of the second surface can be ignored in a first instance and is reduced to the corresponding field of surface normals. In order to reflect or refract rays at the node of the deformed second mesh on the specular second surface such that they intersect the receiving first mesh at the designated points, the normal field needs to be adjusted accordingly. Accordingly, normals n are computed from the incident and exitant ray directions a and b, wherein these vectors are assumed to be normalized and to point away from the specular surface. In a case of reflection, the normal can be inferred from incident and exitant directions according to the well-known Snell's law. For a case of refraction, it is assumed that the ray directions are physically meaningful and that they describe an actual refraction and not a total internal reflection. The desired surface normals can be computed in a simple way from a linear combination of the normalized ray directions.

According to one embodiment this can be done by interpolating the outgoing ray directions at the grid nodes using barycentric coordinates. Further details with regard to an embodiment for determining normals n from the incident and exitant ray directions a and b are described in Section 2.2 Backward Caustics and in Section 2.2.1 Ray Directions to Normals of the detailed disclosure.

The normal field can then be integrated to a height field which forms the surface that can be transferred to a transparent or reflective material. According to one embodiment this is achieved with an optimization algorithm that combines the requirement of an integrable normal field with the goal of reproducing an arbitrary intensity target image by the caustic created through reflection or refraction of the computed object. The optimization algorithm enables a user to specify arbitrary target intensity images and to obtain a reflective or refractive surface that, under the provided geometric configuration with respect to the caustic receiver and given incident lighting direction, produces a caustic pattern. Further details with regard to an embodiment for converting a normal field to a height field are described in Section 2.3 Normal Fields to Height Fields and Section 2.3.1 Normal Equations Matrix of the detailed disclosure.

According to an embodiment the field of surface normals is continuous and the height field is continuously differentiable. This simplifies the computations assuming that the caustic forms a continuous pattern. Furthermore, shadowing, interreflection, and dispersion effects can be ignored.

According to one embodiment the second surface to which the second mesh corresponds is perfectly specular and the surface of the caustic receiver, that is, the first surface on which the caustic image is visible, is assumed to be planar.

According to another embodiment the first mesh of first nodes and the second mesh of second nodes form a triangular or a quadrangular mesh comprising triangular or quadrangular cell areas. In principle, a mesh having any arbitrary structure can be used.

According to one embodiment, the first cell area $A_{d,i}$ of the first mesh and the first cell area $A_{s,i}$ of the second mesh are formed by at least three nodes. However, they may also be formed by any other suitable number of nodes including 4, 5, 6, 8, 10 or more nodes.

According to a further embodiment the first mesh of first nodes is a regular fixed mesh. Further details with regard to an embodiment for discretizing a height field as a regular grid are described in Section 2.1 Forward Caustics of the detailed disclosure.

According to yet another embodiment the method further comprises adjusting of the positions of nodes of a second cell area $A_{s,2}$ of the second mesh adjacent to the first cell area $A_{s,1}$ of the second mesh so that the second cell area $A_{s,2}$ of the second mesh corresponds to a predefined second radiant exitance $M_1$ of a second beam of light incident on the second surface, wherein the second beam of light is adjacent to the first beam and has a respective radiant flux $\Phi_2$ incident on a first cell area $A_{d,2}$ of the first mesh and on the second cell area $A_{s,2}$ of the second mesh that corresponds to a brightness in the respective second cell area $A_{d,2}$ of the first mesh of the two-dimensional image, and wherein the first cell area $A_{s,1}$ of the second mesh and the second cell area $A_{s2}$ of the second mesh have at least one node in common. Again the amount of light transported through each frustum defined by the rays delimiting a cell area $A_{s,i}$ of the first or second mesh remains constant. This allows assigning a brightness value to each field or cell area of the mesh which may include millions of cells. Further details with regard to an embodiment for reproducing a normal field by a height field are described in Section 2.1 Integrability of the detailed disclosure.

According to one embodiment the total area of the second mesh on the second surface including the sum of all second cell areas $A_{s,i}$ remains unchanged after the adjustment of the position of the nodes compared to the total area of the second mesh before the adjustment.

According to another embodiment the adjacent beams of light incident on the second surface comprise the same radiant exitance $M_i$. This represents a situation in which the second surface is irradiated with a collimated beam of light having a homogeneous distribution of intensity.

According to the invention another method for forming a reflective or refractive surface is provided which comprises the acts of discretizing a two dimensional image into a first mesh of first nodes on a first surface, wherein nodes on the first surface define a first cell area $A_{d,i}$ of the first mesh on which a beam of light with a first radiant flux $\Phi_i$ is incident; discretizing a reflective or refractive second surface into a second mesh of second nodes, wherein nodes on the second surface define a first cell area $A_{s,i}$ of the second mesh on which the beam of light with the first radiant flux $\Phi_i$ is incident; and adjusting the positions of the nodes of the first cell area $A_{d,i}$ of the first mesh on the first surface to correspond to a predefined radiant exitance $M_1$, wherein the predefined radiant exitance $M_1$ corresponds to a desired brightness of the two-dimensional image in the first cell area $A_{d,i}$ of the first mesh.

According to this method of the invention a height field is inferred from a given two dimensional grayscale image or caustic mesh by a "backward" calculation to determine a surface such that the reflection or refraction off that surface generates the desired caustic image. The grayscale image is described by a first mesh of first nodes and the reflective or refractive surface is described by a second mesh of second nodes. In contrast to the first method described above the nodes of the second mesh on the specular or refractive second surface from where the rays emanate to the caustic are fixed, while the nodes of the first mesh, i.e. on the caustic are moved. Hence, the first mesh or photon mesh is deformed to reproduce a given image. By deforming the first mesh, the desired amounts of light (radiant exitance $M_i$) can be allocated to the corresponding faces of the caustic, wherein the smaller the area of a face in the first mesh on the first surface is where the grayscale image or caustic is produced, the higher the amount of light per area of the face in the first mesh of the caustic becomes, increasing its brightness. In contrast, a larger area of a face of the first mesh on the first surface results in a reduced brightness. Once the deformation of this first mesh is found, the normal field is obtained similar to the method described above. A mesh may include any suitable number of cells such as 10000, 1 million, 10 million, 100 million or any number in between.

According to an embodiment the method further comprises determining surface normals of the second surface at each of the nodes of the first cell area $A_{d,i}$ of the second mesh, the surface normals corresponding to rays of the beam of light that are incident on the second surface and extend between the nodes of the first cell area $A_{d,1}$ of the second mesh on the second surface and the nodes with adjusted positions of the first cell area $A_{d,i}$ of the first mesh on the first surface; and calculating a height field corresponding to the surface normals.

In order to reflect or refract rays on the specular second surface such that they intersect the receiving surface with the first mesh at the designated points, the normal field needs to be adjusted accordingly. Accordingly, normals n are computed from the incident and exitant ray directions a and b, wherein these vectors are assumed to be normalized and to point away from the specular surface. In the case of reflection, the normal can be inferred from incident and exitant directions according to the well-known Snell's law. For a case of refraction, it is assumed that the ray directions are physically meaningful and that they describe an actual refraction and not a total internal reflection. The desired surface normals can be determined from a linear combination of the normalized ray directions. According to one embodiment this can be done by interpolating the outgoing ray directions at the grid nodes using barycentric coordinates. Further details with regard to an embodiment for determining normals n from the incident and exitant ray directions a and b are described in Section 2.2. Backward Caustics and in Section 2.2.1 Ray Directions to Normals of the detailed disclosure.

The normal field can then be integrated to a height field which forms the surface that can be transferred to a transparent or reflective material. This can be done by solving for the continuous surface that best fits the normal field. Further details with regard to an embodiment for integrating a normal field to a height field are described in Section 4.1.7 Integrability of the detailed disclosure.

According to another embodiment the field of surface normals is continuous and the height field is continuously differentiable. This characteristic may ensure that the deformation of the photon mesh leads to a meaningful normal field. According to an embodiment a solution to this problem is an optimization algorithm that combines the requirement of an integrable normal field with the goal of reproducing an arbitrary intensity target image by the caustic created through reflection or refraction of the computed object. Further details with regard to an embodiment for integrating a normal field to a height field are described in Section 4.1.7 Integrability of the detailed disclosure.

According to another embodiment the first mesh of first nodes and the second mesh of second nodes are a triangular or a quadrangular mesh comprising triangular or quadrangular cell areas. In principle, a mesh having any arbitrary structure can be used.

According to one embodiment, the first area $A_{d,i}$ of the first mesh and the second area $A_{s,i}$ of the second mesh are formed by at least three nodes. However, they may also be formed by any other suitable number of node including 4, 5, 6, 8, 10 or more nodes.

According to a further embodiment the second mesh of second nodes is a regular fixed mesh.

According to yet another embodiment the method further comprises the adjusting of the positions of nodes of a second cell area $A_{d,2}$ of the first mesh adjacent to the first cell area $A_{d,1}$ of the first mesh, wherein the second cell area $A_{d,2}$ of the first mesh corresponds to a second beam of light that is adjacent to the first beam of light wherein the second beam of light has a second radiant exitance $M_2$ on the second cell area $A_{d,2}$ of the first mesh that corresponds to a brightness in the respective second cell area $A_{d,2}$ of the first mesh of the two-dimensional image.

According to an embodiment the second cell area $A_{d,2}$ of the first mesh and the first cell area $A_{d,1}$ of the first mesh have at least one node or two or more nodes in common.

According to an embodiment, the method comprises the adjusting of the positions of nodes of all cell areas $A_{d,i}$ of the first mesh.

According to a further embodiment the adjacent beams of light comprise the same radiant flux $\Phi_i$ and the same radiant exitance $M_i$ on the first and second cell areas $A_{s,i}$ of the second mesh (9), respectively, and comprise the same radiant flux $\Phi_i$ and different radiant exitances $M_1$ and $M_2$ on the first and second cell areas $A_{d,i}$ of the first mesh (1) having adjusted node positions, respectively.

According to a further embodiment the method further comprises adjusting the positions of nodes of a second cell area $A_{d,2}$ of the first mesh, wherein the second cell area $A_{d,2}$ of the first mesh corresponds to a second beam of light that has a second radiant exitance $M_2$ at the second cell area $A_{d,2}$ of the first mesh and at least partially overlaps the first cell area $A_{d,1}$ of the first mesh so that the superposition of the first beam of light and the second beam of light corresponds to a superposed light intensity in the overlapping first cell area $A_{d,1}$ of the first mesh and second cell area $A_{d,2}$ of the first mesh on the first surface.

The superposition of the first beam of light and the second beam of light and of corresponding regions of the first mesh that overlap to create very bright spots, areas or lines in the caustic image are called folds. Further details with regard to an embodiment for generating folds and the characteristics and features of a corresponding fold generator are described in Section 4 Fold Generator, in Section 4.1 Realization, in Section 4.1.1. Fold Positions, in Section 4.1.2 Edge Orientation, in Section 4.1.3 Fold Orientation, in Section 4.1.4. Derivative-free Fold Orientation, and in Section 4.1.5 Enforcing Folds of the detailed disclosure.

According to a further embodiment the overlapping first cell area $A_{d,1}$ of the first mesh and the second cell area $A_{d,2}$ of the first mesh correspond to at least one step transition of the light intensity or a singularity of the light intensity in the two dimensional image. A step transition may include an increase of light intensity in the two dimensional image of more than 10%, 20%, 30%, 40%, 50% or 100% or more between two points of the image that are at a distance of less than $1/1 \times 10^3$ $1/1 \times 10^4$ or $1/1 \times 10^6$ or less of the diameter of the image. Furthermore, the step transition of light intensity can be described by a step function or a function singularity of the light intensity at a line or point of the image.

According to a further embodiment the method comprises adjusting the positions of the nodes of multiple or all cell areas $A_{d,i}$ of the first mesh, wherein the multiple cell areas $A_{d,i}$ of the first mesh correspond to multiple adjacent beams of light having respective radiant exitances $M_i$ on the cell areas $A_{d,i}$ of the first mesh and on the cell areas $A_{s,i}$ of the second mesh, the cell areas $A_{d,i}$ of the first mesh at least partially overlapping each other corresponding to multiple overlapping beams of light, wherein the regions on the first surface where the multiple beams of light superpose with each other include the regions of the step transitions of light intensity of the two-dimensional image.

According to another embodiment the method comprises adjusting the positions of the nodes of multiple or all cell areas $A_{d,i}$ of the first mesh, wherein the multiple cell areas $A_{d,i}$ of the first mesh correspond to multiple adjacent beams of light having respective radiant exitances $M_i$ on the cell areas $A_{d,i}$ of the first mesh and on the cell areas $A_{s,i}$ of the second mesh, wherein some of the cell areas $A_{d,i}$ of the first mesh at least partially overlap each other corresponding to multiple overlapping beams of light, wherein the regions on the first surface where the multiple beams of light superpose with each other include the regions of step transitions of light intensity of the two-dimensional image and some of the cell areas $A_{d,i}$ of the first mesh do not overlap each other corresponding to adjacent beams of light incident on adjacent cell areas $A_{d,i}$ of the first mesh.

According to a further embodiment the act of adjusting the positions of the nodes of the cell areas $A_{d,i}$ of the first mesh and of determining the surface normals of the second surface at the nodes of the first cell areas $A_{d,1}$ of the second mesh having adjusted positions is performed with an optimization algorithm. The adjusting of the positions of the nodes of the cell areas $A_{d,i}$ of the first mesh can be done according to the details in Section 3.1 Quad Brightness of the detailed disclosure. However, other methods can be suitable as well.

According to another embodiment the method further comprises the act of determining at least one cell area $A_{d,i}$ of the first mesh which comprises at least one edge of a step transition of light intensity corresponding to a light intensity function singularity in the two dimensional image and determining the position of the edge of the transition of light intensity in the at least one cell area $A_{d,i}$ of the first mesh.

According to another embodiment the act of determining at least one cell area $A_{d,i}$ of the first mesh which comprises at least one edge of a transition of light intensity includes using the Canny edge detection algorithm.

According to still another embodiment the method further comprises the act of determining a vector $d_{C,i}$ defining the orientation of the edge of the transition of light intensity and the direction of either high or low light intensity in the two-dimensional image with regard to the edge. The vector $d_{C,i}$ can be defined as having a position perpendicular to the edge of the transition of light intensity.

According to yet a further embodiment adjusting the positions of nodes of the first cell area $A_{d,1}$ of the first mesh on the first surface and of the second cell area $A_{d,2}$ of the first mesh on the first surface is at least partially in correspondence with the position of the edge of transition of light intensity so that the second cell area $A_{d,2}$ of the first mesh corresponding to the second beam of light overlaps the first cell area $A_{d,1}$ of the first mesh in a region which includes the edge of transition of light intensity and the first beam of light correspondingly overlaps the second beam of light.

According to another embodiment the method includes performing an optimization using an optimization algorithm to obtain the surface normals of the second surface. The surface normals of the second surface can be obtained once the positions of the nodes of the first cell area $A_{d,1}$ of the first mesh on the first surface and of the second cell area $A_{d,2}$ of the first mesh on the first surface have been determined.

According to yet another embodiment, the method includes the physical manufacturing of a surface of material according to the height field. The material can have a specular surface to reflect light or can be transparent to refract light. The material can consist of refractive acrylic glass or comprise this material or can consist of reflective aluminium or any other metal or comprise this material.

According to yet another embodiment, the method includes manufacturing the surface with multiple planar cell areas according to the calculated height field.

According to a further embodiment the cell areas can have a concave or convex shape. The shape can be achieved by a corresponding polishing process.

According to yet another embodiment, the method includes polishing the manufactured surface to remove or reduce edges.

According to yet another embodiment, the method includes providing a light source that is configured to shine collimated light, parallel light or light of a point light source on the surface comprising a height field.

According to the invention an apparatus is provided that is configured to carry out the method as previously described. According to one embodiment the system is configured to process the surface of a material to comprise the shape according to a height field as determined by the method as previously described.

According to an embodiment the system comprises a module that is configured to determine based on a template image the deformation of a mesh comprising several cells which correspond to imaginary partial light beams each having a respective radiant flux $\Phi_i$ such that in the deformed mesh each area of a cell corresponds to a predetermined light intensity or exitance $M_i$ of the respective imaginary partial beam, the sum of the predetermined light intensities forming the template image.

According to another embodiment the system comprises a module that is configured to obtain a field of surface normals on a surface on which the imaginary partial light beams impinge based on the determined deformation of the mesh. The surface may correspond to a refractive or reflective surface or to a surface corresponding to an image formed by the imaginary partial light beams.

According to an embodiment the system comprises a module that is configured to determine a height field based on the field of surface normals, the height field representing a surface of a refractive or reflective slab of material that produces the template image when light is shined on it.

According to another embodiment the system comprises an optimization algorithm calculating at least one of the deformed mesh, the field of surface normal and the height field.

According to an embodiment the system comprises a fold generator capable of detecting and determining the position and/or orientation of a transition of light intensity in the template image.

According to yet another embodiment the fold generator includes a module for determining the deformation of a mesh corresponding to light intensities of imaginary partial beams defined by the template image, wherein the module considers at least one edge of a light transition in the template image as a singularity of the light intensity distribution function and/or as an area where the cells of the deformed mesh overlap each other corresponding to an overlap of beams emanating from different cell areas of a fixed mesh on the refractive or reflective surface. Due to the overlapping cells folds or overlapping light intensities are generated in the image that is generated when light is shined on the surface corresponding to the height field.

Furthermore, according to an embodiment one or more computer storage media having stored thereon multiple instructions that, when executed by one or more processors of a device cause the one or more processors to perform a method according to one or more embodiments described above.

Further characteristics advantages and features of the invention will result from the following description of exemplifying embodiments of the invention with reference to the enclosed drawings and the detailed disclosure.

BRIEF DESCRIPTION OF DRAWINGS

FIGS. 3A-3F show a schematic sketch of the optimization method for generating a reflective (FIGS. 3A-3C) or refractive (FIGS. 3D-3F) surface wherein the required surface normal vectors (FIGS. 3B and 3E) are computed such that the reflection or reflection of the uniform incoming light creates the desired caustic image and the actual 3D surface is obtained through integration (FIGS. 3C and 3F);

FIG. 4 schematically shows deforming (vertices $u_{i,j}$) of a mesh on the receiving plane, while the mesh on the specular surface (vertices $x_{i,j}$) is fixed;

FIGS. 5A-5D show the result of a caustic optimization, wherein the input intensity image is shown in FIG. 5A, an actual produced caustic computed with a global illumination light simulation tool is shown in FIG. 5B, a difference image in FIG. 5C illustrates that the differences are minor, and the caustic in FIG. 5B is produced by a height-field surface whose iso-contour lines are shown in FIG. 5D;

FIGS. 6A-6E show a caustic of a reflective strip which starts to overlap itself as the strip is bent, creating a fold;

FIGS. 7A-7D show a caustic with folds obtained with a reflective or reflective surface that matches the shape of input target images (FIGS. 7A and 7C), and creates a lively caustic pattern with folds as shown in light simulations (FIGS. 7B and 7D);

FIG. 13A is a template image and FIG. 13B is the result;

FIG. 15A is before normals to height field optimization and FIG. 15B is the normals to height field optimization;

FIGS. 16A-16J show the effect of the contrast added to the brightness, where FIG. 16A is the template image and the results after 200 iterations of the brightness warping and the subsequent normals to height field conversion are shown in FIGS. 16B-16D and after 1000 iterations are in FIG. 16E;

FIGS. 17A-17C show a brightness warping result, where FIG. 17A is the template image, the result is shown in FIG. 17B, and the distortion of the caustic mesh that results in the minimalistic pattern is shown in FIG. 17C;

FIG. 18A shows the template image and FIG. 18B shows the result after normals to height field optimization;

FIG. 20A shows the template image, FIG. 20B shows the LuxRender result, FIG. 20C shows the height field isocontours, and FIG. 20D shows the enhanced difference;

FIG. 24 shows the caustic is located on the desired side of the edge, i.e. the side $d_{C,i}$ points to;

FIG. 28A and FIG. 28B without the preparation, FIG. 28C and FIG. 28D with it;

FIGS. 29A-29D show optimization output for an input specifying two concentric circles, initialized using a planar height field (FIG. 29A, FIG. 29B) and a Perlin noise height field (FIG. 29C, FIG. 29D);

FIGS. 30A-30C show an optimization result for the radioactivity symbol, initialized using an 81×81 height field with Perlin noise, where the distortion introduced by the normal field to height field optimization and by using an actual height field for rendering is barely visible to the naked eye, where FIG. 30A shows the template image, FIG. 30B shows the result from the normal field, and FIG. 30C shows the LuxRender result;

FIG. 31A is the template image, FIG. 31B is the LuxRender result, FIG. 31C is the template image, and FIG. 31D is the LuxRender result;

FIG. 32A shows a template image, FIG. 32B shows a flat field, and FIG. 32C shows a Perlin field;

FIG. 33 shows an optimization result for the pentagram, initialized using a height field with Perlin noise;

FIGS. 34A-34C show an optimization result for a cat silhouette (template image by Christopher Martin), initialized using a planar field for FIG. 34B and a height field with Perlin noise for FIG. 34C, where FIG. 34A shows a template image, FIG. 34B shows a flat field, and FIG. 34C shows a Perlin field;

FIGS. 37A-37B show a cutout of the detected $x_C$ is displayed (FIG. 37A), where the tracing step is illustrated in FIG. 37B, using a function with an elliptical shape instead of the Euclidean distance allows us to handle intersections more reliably;

FIGS. 38A-38C illustrate interactive editing steps, where the fold generator result is shown with the detected folds in FIG. 38A, the points that were used as the fold generator's input are shown in dark blue, folds from undesired regions are moved by shifting the corresponding photons, where their new positions are shown in red in FIG. 38B, and the fold generator is then re-run with these points added to its constraints, resulting in FIG. 38C, where FIG. 38A is before editing, FIG. 38B is edited, and FIG. 38C is after fold generator re-run;

FIGS. 39A-39B show an interactive result for the radioactivity symbol, where FIG. 39A is a template image, and FIG. 39B is a LuxRender result;

FIGS. 40A-40E show an initial brightness distribution and results after applying and re-applying brightness warping to the Mona Lisa template, where the light source is located 4 cm away from the first refractive plane, and a 10×10 cm field, 1 cm away from the first plane, is used to generate the caustic;

FIG. 41A is the original image, and FIG. 41B is a deconvolution, and FIG. 41C is a reconstruction;

FIG. 42A shows a rendering of two glass blocks, one perfectly specular, and one whose top face uses the rough glass material, while its other faces are also perfectly specular, and the distance to the checkerboard floor is half the distance between the specular surface and receiver used for FIG. 42B and FIG. 42C, where FIG. 42A is rough glass, FIG. 42C is without deconvolution, and FIG. 42C is with deconvolution;

FIGS. 43A-43C show LuxRender results for Claude Monet's "Mohnblumen", where the deconvolution was used to abolish the blur introduced by using an area light source, the corresponding point spread function is displayed in the inset in FIG. 43C, where FIG. 43A is a template image, and FIG. 43B is without deconvolution, and FIG. 43C is with deconvolution; and FIG. 44 shows a rendering showing a brightness warping result together with the glass object casting the caustic.

DETAILED DISCLOSURE

Figure 1:
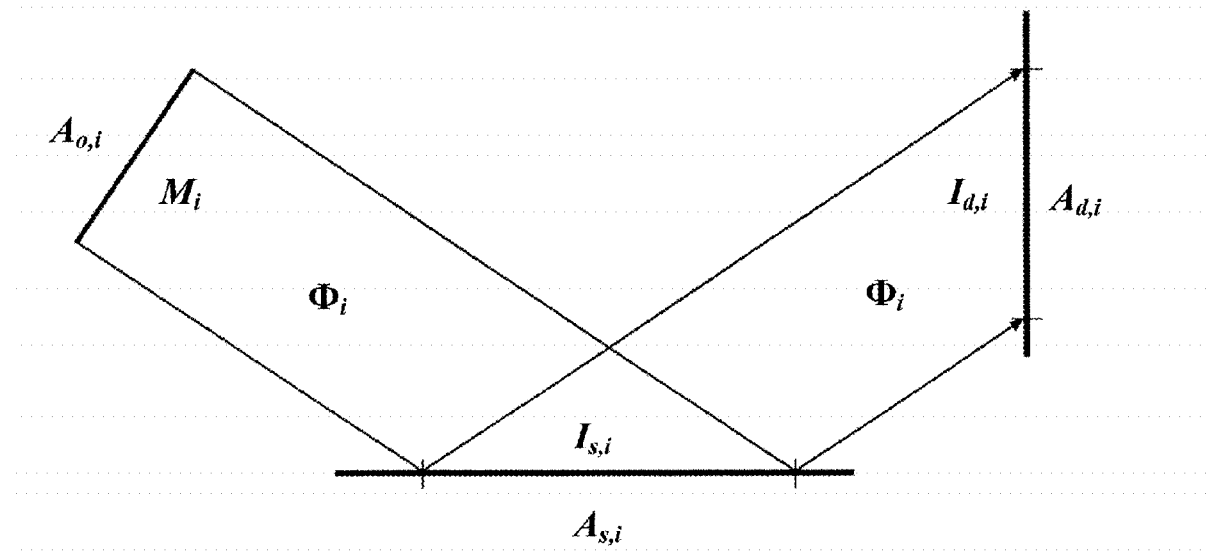
FIG. 1 shows the reflection of a light beam on a specular surface and its deviation to a photon mesh as a basic principle of the embodiment.

Embodiments of the invention will be described with reference to FIGS. 1-7D. According to a first embodiment a reflective surface has been produced based on a given grayscale image (FIG. 5A), wherein the reflection or refraction off that generated surface reproduces the original grayscale image (FIG. 5B).

In the method it was assumed that no inter-reflection and shadowing effects occurred, and the specular surfaces were assumed to be smooth, so that the generated caustic will be contiguous. This allowed the use of a two-dimensional mesh that basically defines the cross section of the light beam.

The original grayscale image on a planar surface 2 was discretized in a regular mesh 1 and the specular surface 5 was discretized in a regular mesh 9 as well. According to the discretization of the image and the surface, a hypothetical light beam is discretized into several partial beams, wherein each partial beam corresponds to a cell 3 of the mesh 1 on the discretized grayscale image and a cell 11 on the specular surface 5.

While a fixed mesh 1 was used to describe the grayscale image, the nodes of the mesh 9 of the specular surface 5 which confine the partial beam are moved around. By deforming that mesh 9, the desired amounts of light can be allocated to the corresponding faces of the caustic that is to be reproduced. The allocation of the desired amounts of light is based on the intensity distribution in the discretized grayscale image: the larger the area of a cell in the warped mesh 9 on the specular surface 5, the more light is projected on the unchanged cell area in the caustic mesh 1, increasing its brightness. The boundary vertices of the warped mesh 9 were confined to remain on the border.

Assuming perfect specularity of the specular surface 5, the radiant flux $\Phi_i$ (the total emitted or incident power) remains constant throughout each beam that can be defined by a triangle, quadrilateral or multilateral cell area of the mesh 1 or 9 (see FIG. 1). The flux is equal to the radiant exitance $M_i$ (the emitted power per unit area) times the area in the original mesh $A_{o,i}$, $$\Phi_i = M_i A_{o,i}; \quad (1.1)$$

it is equal to the irradiance $I_{s,i}$ (the incident power per unit area) times the area $A_{s,i}$ on the specular surface, $$\Phi_i = I_{s,i} A_{s,i}; \quad (1.2)$$

and equal to the irradiance $I_{d,i}$ times the area $A_{d,i}$ on the receiver, $$\Phi_i = I_{d,i} A_{d,i}; \quad (1.3)$$

Assuming a parallel light source and equally-sized triangles, $M_i$ and $I_{s,i}$ are the same for each triangle. Consequently, the resulting irradiance $I_{d,i}$ on the receiver surface 2, the contribution by this triangle or multilateral is proportional to the original area divided by the resulting area in the photon mesh 1. Basically, this is the resulting caustic brightness when a Lambertian (i.e., perfectly diffuse) reflectance model is assumed for the receiver.

Once the deformation of this mesh 9 is found, the normal field is obtained by interpolating the outgoing ray directions at the grid nodes using barycentric coordinates. The determination of the deformation of the mesh 9 is described in the Section 3.1. Quad Brightness of the detailed disclosure, while the determination of the normal field according to one embodiment is described in Section 3.2 of the detailed disclosure.

The normal field is subsequently integrated to a height field surface. This height field surface reproduces the desired caustic images with a very high accuracy. The height field surface was subsequently transferred to a reflective surface of a material plate.

A result of a caustic that is generated by shining light on the manufactured reflective surface is shown in FIG. 5B. FIG. 5A shows the intensity image on which the manufactured reflective surface was based. The difference image shown in FIG. 5C illustrates that the differences between the original intensity image and the caustic produced with the manufactured reflective surface are minor. A calculated height-field surface comprising iso-contour lines is shown in FIG. 5D.

According to a further embodiment a refractive or reflective specular surface was generated that produces a caustic with folds. Folds are effects that are produced by a superposition of beams emanating from different cell areas of the specular surface. Folds are the typical bright contours that occur when a contiguous caustic overlaps itself (see FIGS. 6A-6E). The introduction of folds does not support the precise reproduction of an original image but emphasizes prominent features in the original image. They also introduce an ambiguity in the sense that a point of the caustic pattern cannot be traced back to exactly one point on the reflective or refractive surface. Hence, a caustic including folds may comprise additional optic effects that are not necessarily included in the original image.

For this approach a fixed, regular mesh on the reflective or refractive surface (vertices $x_{i,j}$) was considered, and a mesh of the same connectivity on the receiving surface (vertices $u_{i,j}$) was deformed (see FIG. 4). The vectors pointing from $x_{i,j}$ to $u_{i,j}$ are the desired directions of the rays reflected or refracted on the specular surface. While a fixed mesh 9 of the specular surface 5 was used, the nodes of the mesh 1 describing the grayscale image are moved around. By deforming that mesh 1, the desired amounts of light can be allocated to the corresponding faces of the caustic that is to be reproduced. The allocation of the desired amounts of light is based on the intensity distribution in the discretized grayscale image: the larger the area of a cell in the warped mesh 1 that corresponds to the grayscale image on the receiving surface 1, the less light is projected on the cell area in the caustic mesh 1, decreasing its brightness. This principle is shown in FIGS. 3A-3C for reflective caustics and in FIGS. 3D-3F for refractive caustics.

However, the process described so far does not include folds. As the input for the generation of folds the Canny edge detection algorithm was used to detect edges and transitions of light intensity in an input image. In particular with the detection algorithm cells of the mesh were determined that included transitions of light intensity. Then the position and orientation of the edges and transitions of light intensity were determined. Using an optimization algorithm, the deformation of the mesh 1 on the caustic surface is determined, wherein transition edges are treated as singularities of the light intensity distribution function and as areas where the cells of the original mesh 1 overlap each other and accordingly the beams emanating from different cell areas of the fixed mesh 9 on the specular surface 5.

Using the incoming and outgoing ray directions from the specular surface 5 to the surface 1 of the caustic, the normal field was computed, and then a height field was found that optimally matched these normals using the approach described in Section 2.3. Normal Fields to Height Fields of the detailed disclosure (see FIGS. 3A-3F).

Variables that have been used to characterize the desired folds in the cells of the mesh are described in Sections 4.1. and 4.1.1 to 4.1.9 of the detailed disclosure.

Subsequently, the normal field was generated which was then integrated to a height fields. It was again ensured that the generated normal field could be integrated to a height field. In this aspect, the method that has been used is roughly the same as for the above embodiment and as described in Section 3.2 of the detailed disclosure.

Examples of caustics with folds which have been obtained with reflective or refractive materials to which calculated height fields have been transferred are shown in FIGS. 7A-7D. FIGS. 7A and 7C describe the target image based on which height fields have been determined and calculated and FIGS. 7B and 7D show the caustic images comprising folds that have been obtained by shining light on slabs of a transparent or reflective material comprising a surface structure corresponding to the calculated height field.

Is it is clearly visible, that the folds in addition to emphasizing prominent structures of the target images such as edges of light transitions comprise appear at other positions not related to the original image and comprise a shape which is not fully predictable. However, this artificial aspect in the caustic images is desirable. However, as is visible in FIGS. 7B and 7D, the position and generation of the folds in the caustic is controlled, since the folds have been generated to appear within the bright white areas of the original target image only.

Modifications may be applied to the specific embodiments described above without leaving the scope of the invention.

EMBODIMENTS

Embodiment 1

A method for forming a reflective or refractive surface, comprising:
  discretizing a two-dimensional image into a first mesh (1) of first nodes on a first surface (2), wherein nodes on the first surface (2) define a first cell area $A_{d,1}$ of the first mesh (1) on which a first beam of light with a first radiant flux $\Phi_1$ is incident, wherein the first cell area $A_{d,1}$ of the first mesh (1) corresponds to an area of the two-dimensional image having a brightness to which the first radiant flux $\Phi_1$ corresponds;
  discretizing a reflective or refractive second surface (5) into a second mesh (9) of second nodes, wherein nodes on the second surface (2) define a first cell area $A_{s,1}$ of the second mesh (9) on which the first beam of light with the first radiant flux (1), is incident and is deviated towards the first cell area $A_{d,1}$ of the first mesh (1); and
  adjusting the positions of the nodes of the first cell area $A_{s,1}$ of the second mesh (9) on the second surface (2) so that the first cell area $A_{s,1}$ of the second mesh (9) corresponds to a predefined radiant exitance $M_1$ of the first beam of light incident on the second surface (5).

Embodiment 2

The method according to embodiment 1, wherein
  determining surface normals at each of the nodes defining the first cell area $A_{s,1}$ of the second mesh (9) with adjusted positions on the second surface (2), the surface normals corresponding to rays of the first beam of light that are incident on the second surface (5) and extend between the nodes of the first cell area $A_{s,1}$ of the second mesh (9) with adjusted positions and the nodes of the first cell area $A_{d,1}$ of the first mesh (1) on the first surface (2); and
  calculating a height field corresponding to the surface normals, the height field defining the reflective or refractive surface.

Embodiment 3

The method according to embodiment 1 or embodiment 2, wherein the field of surface normals is continuous and the height field is continuously differentiable.

Embodiment 4

The method according to any one of embodiments 1 to 3, wherein the first mesh (1) of first nodes and the second mesh (9) of second nodes are a triangular or a quadrangular mesh comprising triangular or quadrangular cell areas.

Embodiment 5

The method according to any one of embodiments 1 to 4, wherein the first mesh (1) of first nodes is a regular fixed mesh.

Embodiment 6

The method according to any one of embodiments 1 to 5, further comprising the adjusting of the positions of nodes of a second cell area $A_{s,2}$ of the second mesh (9) adjacent to the first cell area $A_{s,1}$ of the second mesh (9) so that the second cell area $A_{s,2}$ of the second mesh (9) corresponds to a predefined second radiant exitance $M_1$ of a second beam of light incident on the second surface (5), wherein the second beam of light is adjacent to the first beam and has a respective radiant flux $\Phi_2$ incident on a first cell area $A_{d,2}$ of the first mesh (1) and on the second cell area $A_{s,2}$ of the second mesh (9) that corresponds to a brightness in the respective second cell area $A_{d,2}$ of the first mesh (1) of the two-dimensional image, and wherein the first cell area $A_{s,1}$ of the second mesh (9) and the second cell area $A_{s,2}$ of the second mesh (9) have at least one node in common.

Embodiment 7

The method according to embodiment 6, wherein the adjacent first beam of light and second beam of light comprise the same radiant exitance $M_i$ on the second surface (5).

Embodiment 8

A method for forming a reflective or refractive surface, comprising:

discretizing a two dimensional image into a first mesh (1) of first nodes on a first surface (2), wherein nodes on the first surface (2) define a first cell area $A_{d,1}$ of the first mesh (1) on which a beam of light with a first radiant flux $\Phi_1$ is incident; discretizing a reflective or refractive second surface (5) into a second mesh (9) of second nodes, wherein nodes on the second surface (2) define a first cell area $A_{s,2}$ of the second mesh (9) on which the beam of light with the first radiant flux $\Phi_1$ is incident; and adjusting the positions of the nodes defining the first cell area $A_{d,1}$ of the first mesh (1) on the first surface (2) to correspond to a predefined radiant exitance $M_1$, wherein the predefined radiant exitance $M_1$ corresponds to a desired brightness of the two-dimensional image in the first cell area $A_{d,1}$ of the first mesh (1).

Embodiment 9

The method according to embodiment 8, further comprising:
determining surface normals of the second surface (3) at each of the nodes of the first cell area $A_{d,1}$ of the second mesh (1), the surface normals corresponding to rays of the beam of light that are incident on the second surface (5) and extend between the nodes of the first cell area $A_{s,1}$ of the second mesh (1) on the second surface (2) and the nodes with adjusted positions of the first cell area $A_{d,1}$ of the first mesh (1) on the first surface (2); and
calculating a height field corresponding to the surface normals.

Embodiment 10

The method according to embodiment 8 or embodiment 9, wherein the field of surface normals is continuous and the height field is continuously differentiable.

Embodiment 11

The method according to any one of embodiments 8 to 10, wherein the first mesh (1) of first nodes and the second mesh (9) of second nodes are a triangular or a quadrangular mesh comprising triangular or quadrangular cell areas.

Embodiment 12

The method according to any one of embodiments 8 to 11, wherein the second mesh (1) of second nodes is a regular fixed mesh.

Embodiment 13

The method according to any one of embodiments 8 to 12, further comprising adjusting of the positions of nodes of a second cell area $A_{d,2}$ of the first mesh (1) adjacent to the first cell area $A_{d,1}$ of the first mesh (1), wherein the second cell area $A_{d,2}$ of the first mesh (1) corresponds to a second beam of light that is adjacent to the first beam of light wherein the second beam of light has a second radiant exitance $M_2$ on the second cell area $A_{d,2}$ of the first mesh (1) that corresponds to a brightness in the respective second cell area $A_{d,2}$ of the first mesh (1) of the two-dimensional image.

Embodiment 14

The method according to embodiment 13, wherein the adjacent beams of light comprise the same radiant flux $\Phi_i$ and the same radiant exitance $M_i$ on the first and second cell areas $A_{s,i}$ of the second mesh (9), respectively, and comprise the same radiant flux $\Phi_i$ and different radiant exitances $M_1$ and $M_2$ on the first and second cell areas $A_{d,i}$ of the first mesh (1) having adjusted node positions, respectively.

Embodiment 15

The method according to any one of embodiments 8 to 14, further comprising adjusting the positions of nodes of a second cell area $A_{d,2}$ of the first mesh (1), wherein the second cell area $A_{d,2}$ of the first mesh (1) corresponds to a second beam of light that has a second radiant exitance $M_2$ at the second cell area $A_{d,2}$ of the first mesh (1) and at least partially overlaps the first cell area $A_{d,1}$ of the first mesh (9) so that the superposition of the first beam of light and the second beam of light corresponds to a superposed light intensity in the overlapping first cell area $A_{d,1}$ of the first mesh (1) and second cell area $A_{d,2}$ of the first mesh (1) on the first surface.

Embodiment 16

The method according to embodiment 15, wherein the overlapping first cell area $A_{d,1}$ of the first mesh (1) and the second cell area $A_{d,2}$ of the first mesh (1) correspond to at least one step transition of the light intensity or a singularity of the light intensity in the two dimensional image.

Embodiment 17

The method according to embodiment 15 or embodiment 16, comprising adjusting the positions of the nodes of multiple cell areas $A_{d,i}$ of the first mesh (1), wherein the multiple cell areas $A_{d,i}$ of the first mesh (1) correspond to multiple adjacent beams of light having respective radiant exitances $M_i$ on the cell areas $A_{d,i}$ of the first mesh (1) and on the cell areas $A_{s,i}$ of the second mesh (9), the cell areas $A_{d,i}$ of the first mesh (1) at least partially overlapping each other corresponding to multiple overlapping beams of light, wherein the regions on the first surface where the multiple beams of light superpose with each other include the regions of the step transitions of light intensity of the two-dimensional image.

Embodiment 18

The method according to any one of embodiments 8 to 17, wherein the act of adjusting the positions of the nodes of the cell areas $A_{d,i}$ of the first mesh (1) and of determining the surface normals of the second surface (3) at the nodes of the first cell areas $A_{d,1}$ of the second mesh (1) having adjusted positions is performed with an optimization algorithm.

Embodiment 19

The method according to any one of embodiments 8 to 18, further comprising the act of determining at least one cell area $A_{d,i}$ of the first mesh (1) which comprises at least one edge of a step transition of light intensity corresponding to a light intensity function singularity in the two dimensional image and determining the position of the edge of the transition of light intensity in the at least one cell area $A_{d,i}$ of the first mesh (1).

Embodiment 20

The method according to embodiment 19, wherein the act of determining at least one cell area $A_{d,i}$ of the first mesh (1)

which comprises at least one edge of a transition of light intensity includes using the Canny edge detection algorithm.

Embodiment 21

The method according to one of embodiments 19 or 20, further comprising the act of determining a vector $d_{C,i}$ defining the orientation of the edge of the transition of light intensity and the direction of either high or low light intensity in the two-dimensional image with regard to the edge.

Embodiment 22

The method according to any one of embodiments 15 to 19, wherein adjusting the positions of nodes of the first cell area $A_{d,1}$ of the first mesh (1) on the first surface (2) and of the second cell area $A_{d,2}$ of the first mesh (1) on the first surface (2) is at least partially in correspondence with the position of the edge of transition of light intensity so that the second cell area $A_{d,2}$ of the first mesh (1) corresponding to the second beam of light overlaps the first cell area $A_{d,1}$ of the first mesh (1) in a region which includes the edge of transition of light intensity and the first beam of light correspondingly overlaps the second beam of light.

Embodiment 23

The method according to any one of embodiments 17 to 22, including performing an optimization using an optimization algorithm to obtain the surface normals of the second surface (3).

Embodiment 24

An apparatus for forming a reflective or refractive surface that is configured to carry out the method according to anyone of the preceding embodiments.

Embodiment 25

A system configured to determine based on a template image the deformation of a mesh (1, 9) comprising several cells which correspond to imaginary partial light beams each having a respective radiant flux $\Phi_i$ such that in the deformed mesh each area of a cell corresponds to a predetermined light intensity or exitance $M_i$ of the respective imaginary partial beam, the sum of the predetermined light intensities forming the template image.

Embodiment 26

The system of embodiment 25 comprising a module that is configured to obtain a field of surface normals on a surface (2, 5) on which the imaginary partial light beams impinge based on the determined deformation of the mesh (1, 9), the surface (2, 5) corresponding to a refractive or reflective surface or to a surface corresponding to the template image formed by the imaginary partial light beams.

Embodiment 27

The system of one of embodiments 25 or 26, comprising a module that is configured to determine a height field based on the field of surface normals, the height field representing a surface of a refractive or reflective slab of material that produces the template image when light is shined on it.

Embodiment 28

The system of any one of embodiments 25 to 27, comprising an optimization algorithm configured to calculate at least one of the deformed mesh (1, 9), the field of surface normals and the height field.

Embodiment 29

The system of any one of embodiments 25 to 28, comprising a fold generator module capable of detecting and determining the position and/or orientation of a transition of light intensity in the template image.

Embodiment 30

The system of embodiment 29, wherein the fold generator module is capable of determining the deformation of a mesh (1, 9) corresponding to the light intensities of partial beams defined by the template image, wherein the module considers at least one edge of a light transition in the template image as a singularity of the light intensity distribution function and as an area where the cells of the deformed mesh (1, 9) overlap each other corresponding to an overlap of partial beams emanating from different cell areas of the mesh on the refractive or reflective surface.

Embodiment 31

One or more computer storage media having stored thereon multiple instructions that, when executed by one or more processors of a device cause the one or more processors to perform a method according to any of embodiments 1 to 23.

Section 1

Caustics are patterns of light arising when light is reflected or refracted by curved surfaces. Depending on the objects involved, caustics can become very complex, which greatly increases the visual appeal of a scene. Computing caustics in a given three-dimensional scene is one of the difficulties of photorealistic rendering and has been the subject of extensive research.

Figure 8:
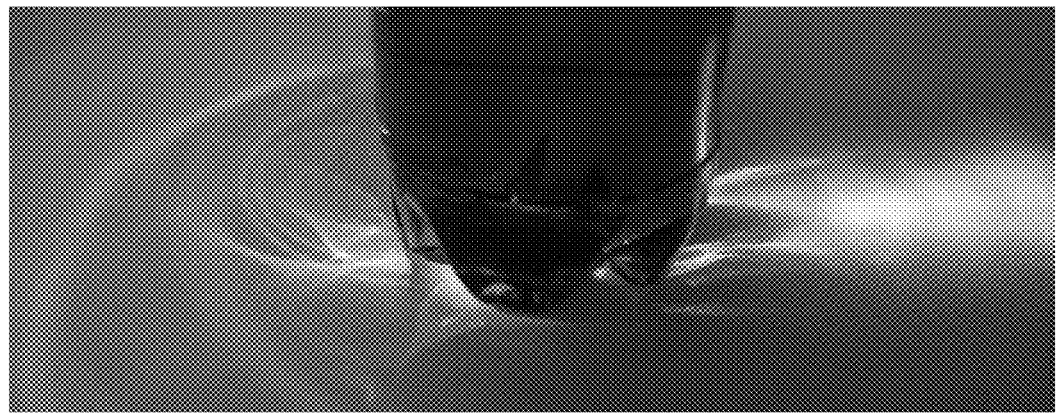
FIG. 8 shows reflective and refractive caustics caused by a plastic bottle filled with water.

FIG. 8 shows reflective and refractive caustics caused by a plastic bottle filled with water, clearly distinguishable by their color. The light was occluded so only the bottle and a small piece of the table was illuminated directly.

This patent application contemplates the inverse problem: Given an image, compute the shape of a reflective or refractive object that, when lit by a given light source, projects the image onto a known diffuse surface. In contrast to a transparency, this does not work by absorption but by redirecting light, so essentially the complete radiant power is cast onto the diffuse surface. As a consequence, some regions of a caustic may be brighter than they would be if illuminated just by direct light.

This inverse problem of finding a reflector or refractor for a given caustic is difficult for several reasons. The shape of a surface offers a large optimization space, which is furthermore ridden by many local minima. The time most rendering software requires to compute a caustic furthermore makes it impractical to apply optimization algorithms, which need to evaluate their objective functions thousands or even millions of times. Gpus have been successfully employed to alleviate that problem, though [FDL10].

Another reason for the difficulty are folds (FIG. 6A-6D). Folds are the typical bright contours that occur when a contiguous caustic overlaps itself. The problem with folds is that they are very prominent but difficult to control. They also introduce an ambiguity in the sense that a point of the caustic pattern can not be traced back to exactly one point on the reflective or refractive surface.

FIGS. 6A-6E show a caustic (top) of a reflective strip (bottom), where the caustic starts to overlap itself as the strip is bent, creating a fold.

In this patent application, two approaches are proposed. In the first approach, dubbed brightness warping, a fixed, contiguous caustic is considered as a quad mesh. This representation is computed from a known specular surface, most simply, a rectangle. The reflective or refractive surface is then divided into quadrangular patches which correspond to the faces in the caustic. By optimizing the area of these patches, the brightness of the corresponding caustic quads can be adjusted to a given distribution. In a second step, a normal field is computed from this mapping and subsequently converted to a height field. This is not possible for arbitrary normal fields, therefore the area optimization step must also assert that the result can indeed be integrated to a height field.

This procedure implies considerable restrictions for the algorithm, namely it is limited to a fixed, contiguous caustic represented by a mesh and requires a given brightness distribution for its faces. It furthermore ignores the actual shape of the reflector or refractor and operates only on surface normals. These simplifications result in a differentiable objective function, enabling the use of gradient-based optimization methods. In addition, they both remedy the problem of sub-optimal local minima and bypass costly caustic evaluations. Despite the simplifications, the approach is powerful enough to faithfully reproduce images.

The second approach proposed in this patent application takes another perspective on the problem. While the first one varies the brightness distribution of a caustic of a fixed shape, this one modifies the caustic shape. The methods are similar in that they both operate on a mapping of reflector/refractor faces to caustic faces. This method is based on various equations describing folds at prespecified positions, which are used as objectives to optimize the caustic, introducing folds where they are desired. Again, a normal field is obtained from the optimization output and subsequently integrated to a height field. The approach is later extended to allow manual editing of caustics.

While the first approach is suited for generating prespecified natural images as caustics without folds, the second one generates the typical fold features, but has no control over the overall brightness distribution. It is therefore mostly suited for simple, monochrome patterns such as logos, which are mainly formed by reproducing their contours.

Applications of this work are mainly of an artistic nature. Caustics are interesting from an artistic viewpoint since the shape of the corresponding specular object does not directly reveal the caustic it will produce. Surfaces generated with one of the approaches proposed in this patent application could be used in architecture or interior design, for example, as special windows that create interesting caustics when lit by sunlight. The first approach could also be used for luminaire design. These applications often involve strongly curved reflectors and low distances to the light source, so the method is not suited directly due to the simplifications being made. However, it could provide a basis for novel methods which lift these restrictions.

Section 1.1 Related Work

The task of reproducing a prespecified light distribution by a specular surface also arises in the field of inverse reflector design, which concentrates on reflectors for lamps. A survey on inverse reflector design is given by Patow and Pueyo [PP05]. There are two types of such light distributions, near-field and far-field distributions. Near-field distributions specify an irradiance distribution on a given surface (typically a plane) that is to be reproduced, which is also the goal in this patent application. Far-field distributions can be thought as limit cases where the surface to be illuminated is infinitely far away from the reflector, so only the distribution of the ray directions matters.

Methods for inverse reflector design typically employ an analysis-by-synthesis approach: Some surface representation is chosen to parametrize the reflector, such as nurbs [ASG08]. Then, the light distribution caused by a surface is evaluated and rated against the desired one, which is used to iteratively optimize the surface parameters. Various optimization strategies have been applied, ranging from frameworks that allow analytical differentiation, thereby enabling the use of the conjugate gradient method [Neu97], and methods that compute derivatives approximately [FDL10] to ones use no derivatives at all [ASG08]. Examples using evolutionary optimization [DCC99] also belong to the latter category. To the author's knowledge, none of these methods employ a similar two-step approach that first optimizes a normal field and only later computes a height field from it. This may be due to the fact that typical applications use a light source close to the reflector, which is strongly curved so the light is focused, rendering this two-step approach rather inappropriate.

The simplifications imposed on the scene vary; assumptions of perfect specularity and only one bounce of light without interreflections or occlusions (as used in this patent application) are common, though there are exceptions to both [PPV07, MMP09]. The restriction to rotationally symmetric reflectors is also commonly used, particularly in theoretical works [WN75].

These works mostly focus on reflective surfaces, though many readily extend to refraction. One noteworthy example investigating the refractive problem is the work by Finckh et al. [FDL10]. They use gpu computations to speed up the caustic evaluation, and a stochastic approximation algorithm for the optimization, which is able to find a global optimum.

Concerning refractive objects, the field of lens design is also noteworthy, though the goals of these problems are different, e.g. aberration correction. These problems are often restricted to a small number of parameters such as radii of the underlying primitive shapes [PP05]. Again, there are exceptions, e.g. the work by Loos et al. [LSS98], who use a nurbs-based representation to optimize progressive lenses.

Weyrich et al. [WPMR09] have chosen a different approach to reproducing a prespecified far-field distribution: First, they generate a set of sloped, planar microfacets to realize the desired distribution of ray directions. Then, they arrange them in a regular array using simulated annealing to minimize the resulting discontinuities.

Strongly related to Weyrich et al.'s work is the system for near-fields proposed by Papas et al. [PJJ+11]. Papas et al. extend the notion of microfacets to curved micropatches, which are used to produce specks of light with an anisotropic Gaussian distribution. They explicitly "focus on the more complex effect of refraction, while the reflective case follows by analogy". To demonstrate their results, they also physically manufacture refractive surfaces from acrylic glass (pmma, trademarked Plexiglas).

There is an overlap between the brightness warping method proposed here and their work, in fact, the name was borrowed from a section titled "Irradiance Warp" [PJJ+11, section 5.1]. To compute the shape of the micropatches that produce a Gaussian irradiance distribution, Papas et al. "define a bijective mapping between points in the micropatch domain and points on the projection plane", "analytically compute the surface normals that refract/reflect the light in this way", and finally "integrate this normal field to arrive at the required micropatch surface". The approach proposed here works in the same way, with two main differences. First, the bijective mapping is inverted, i.e. the points on the projection plane are fixed here, while the ones on the specular surface are moved. Second, due to the simple shape of the desired caustics, Papas et al. do not need to explicitly account for the integrability of their normal fields, which is a key ingredient to reproduce arbitrary images. It must be noted that the method proposed here was developed without knowledge of Papas et al.'s work, which only afterward came to the author's attention, and the method's name was changed from a less adequate one later on.

Section 1.2

The remainder of this patent application is structured as follows. Section 2 lists the assumptions that are made to develop the approaches. It furthermore describes several building blocks to be used later. The brightness warping approach is devised in Section 3, and the fold generating method in Section 4. Results of the two approaches are also discussed in their respective Sections. Section 5 then considers the functionalities that provide a basis for user-guided editing of folds.

Section 6 discusses issues concerning both approaches and describes how some restrictions that were made in Section 2 are lifted in the implementation. Additional ideas on how further restrictions could be lifted, and pointers to potential future work are found in Section 7.

Section 2

This section first describes the assumptions and simplifications that the next three sections are based on. Sections 2.1 through 2.3 then outline the basic functionalities of the implementation, which were devised in a preliminary work.

Throughout this patent application, a flat height field is being used to generate the caustics. It is discretized by means of a regular grid. To further simplify the computations, the height field's actual displacement is disregarded, and a simple plane is used for raytracing. Only the reflected/refracted ray directions are computed from the height field's normals. So in essence, the operations are based on a normal-mapped plane, although the physical reproducibility of the normal field must still be ensured (see Section 2.3). A discussion of this simplification can be found in Sections 6.2.1 and 7.1.

The diffuse surface the caustic is projected on (hereafter referred to as the receiver) is also assumed to be a plane. The light is assumed to be emitted by a distant light source, so the rays are treated as parallel. Point light sources are discussed in Section 6.1.1.

The reflections and refractions are considered to be perfectly specular; an alternative is explained in Section 6.1.2. We assume that no shadowing, no interreflection and, for refraction, no total internal reflection occurs. Spectral effects like dispersion are also neglected.

The caustic is furthermore assumed to be a contiguous pattern, which means that the normal field will be continuous and the corresponding the height field is continuously differentiable. This obviously limits the caustics that can possibly be generated, but makes the design of the approaches considerably simpler.

The approaches devised in this patent application work for reflective as well as refractive setups. In the reflective case, there is only one height field. In the refractive case, two surfaces are involved, one where the light enters the medium, and one where it exits. The first of the two is simply assumed to be planar (keeping the incident light parallel), and the algorithms operate only on the second surface.

Section 2.1 Forward Caustics

Let us begin by describing the way caustics are generated from a height field in the implementation. The approach we use is related to photon mapping or beam tracing that starts from the light source.

As mentioned above, the specular surfaces are assumed to be smooth, and no interreflection and shadowing occurs, so the caustic will be contiguous. This allows us to use a two-dimensional triangle mesh that basically defines the cross section of the light beam. We can then trace a ray for each vertex individually. In analogy to the photon mapping method, the projection of these vertices on the receiver will hereafter be referred to as photon positions, and the mesh they form as photon mesh.

Figure 9:
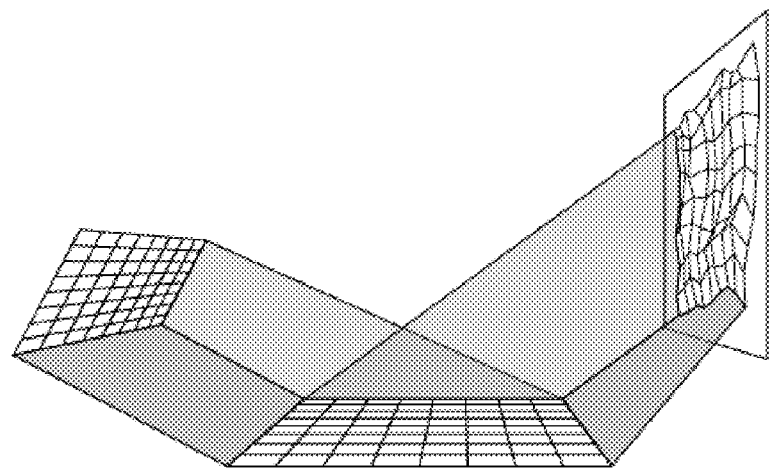
FIG. 9 shows the generation of a caustic, where on the left, a light beam is discretized using a mesh that matches the normal field in the middle, and the field deforms the mesh as it is reflected and projected onto the receiver on the right.

FIG. 9 shows the generation of a caustic, where on the left, a light beam is discretized using a mesh that matches the normal field in the middle, and the field deforms the mesh as it is reflected and projected onto the receiver on the right.

Figure 10:
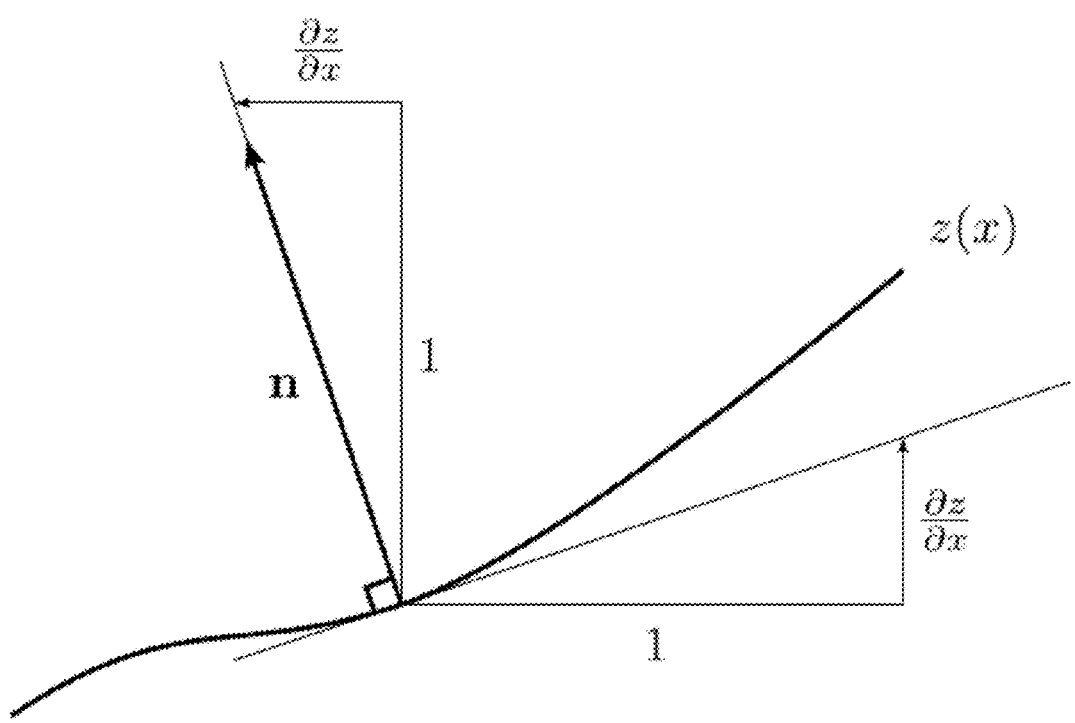
FIG. 10 shows a normal curve.

In order to reflect or refract a ray, we obviously need to obtain the normals from the height field. FIG. 10 shows that the normal of a height field $z(x, y)$ is collinear with the vector $$\left(-\frac{\partial z}{\partial x}, -\frac{\partial z}{\partial y}, 1\right)^T. \tag{2.1}$$

FIG. 10 shows a reflection of a light beam.

As our height field is discretized as a regular grid, we can simply compute the normal at each node of the height field by using finite differences, and then use bilinear interpolation (along with a re-normalization) to obtain normals at arbitrary positions on the surface. Using the standard raytracing operations, we can now compute the photon mesh cast on the receiver. The shape of the photon mesh defines the resulting brightness distribution in the caustic pattern; let us therefore consider the light transported through the scene.

FIG. 1 shows a normal of a curve.

Assuming perfect specularity, the radiant flux $\Phi_i$ (the total emitted or incident power) remains constant throughout each beam defined by a triangle i, see FIG. 1. It is equal to the radiant exitance $M_i$ (the emitted power per unit area) times the area in the original mesh $A_{o,i}$, $$\Phi_i = M_i A_{o,i} \tag{2.2}$$

it is equal to the irradiance $I_{s,i}$ (the incident power per unit area) times the area $A_{s,i}$ on the specular surface, $$\Phi_i = I_{s,i} A_{s,i}; \tag{2.3}$$

and equal to the irradiance $I_{d,i}$ times the area $A_{d,i}$ on the receiver, $$\Phi_i = I_{d,i} A_{d,i}. \tag{2.4}$$

Assuming a parallel light source and equally-sized triangles, $M_i$ and $I_{s,i}$ are the same for each triangle. In essence, the resulting irradiance $I_{d,i}$ on the receiver contributed by this triangle is proportional to the original area divided by the resulting area in the photon mesh. Colloquially, this is the resulting caustic brightness, when a Lambertian (i.e. perfectly diffuse) reflectance model is assumed for the receiver. In an implementation, the actual magnitude of these quantities does not matter, the resulting brightness of the caustic can be arbitrarily scaled to ensure meaningful visualization.

Section 2.2 Backward Caustics

Considering that the caustic can be treated as a two-dimensional mesh of triangles (which may possibly overlap itself), it seems consequential that by editing that photon mesh, one can modify the caustic directly. In contrast to the previous section, where the caustic was computed from a height field, this is the inverse problem, i.e. a height field is to be inferred from a given caustic mesh, so this can be seen as "backward" caustic computation.

In order to reflect or refract rays on the specular surface such that they intersect the receiver at the designated points, the normal field needs to be adjusted accordingly.

First, a way to compute a normal n from the incident and exitant ray directions a and b is required, which is described in Section 2.2.1. Section 2.3 then explains how the normal field will be converted to a height field so it becomes physically meaningful. Unfortunately, this step can usually not reproduce the normal field accurately, making direct editing of a caustic in this way extremely cumbersome due to the arising distortions.

Section 2.2.1 Ray Directions to Normals

As mentioned, we first need a way to compute a normal n from the incident and exitant ray directions a and b. These vectors are assumed to be normalized and to point away from the specular surface.

In the case of reflection, it is trivial to infer the normal from incident and exitant directions; it is collinear with their mean.

For refraction, let us furthermore assume that the ray directions are physically meaningful and that they describe an actual refraction and not a total internal reflection, i.e., If no total internal reflection occurs, the angle between refractive ray directions is always at least ninety degrees plus the critical angle $\theta c$ of the corresponding material boundary; $\theta c = \arcsin \tilde{\eta}$, where $\tilde{\eta}$ is either $\eta$ or $\eta-1$, whichever is less than 1. Now consider Snell's law $$\frac{\sin\alpha}{\sin\beta} = \frac{n_b}{n_a} =: \eta. \tag{2.5}$$

The vectors $a-(a\cdot n)n$ and $b-(b\cdot n)n$ (see FIG. 12) are collinear with opposite directions, and have lengths $\sin \alpha$ and $\sin \beta$, respectively.

Thus $$a-(a\cdot n)n = -\eta(b-(b\cdot n)n), \tag{2.6}$$

which can be rearranged to $$a+\eta b = ((a+\eta b)\cdot n)n. \tag{2.7}$$

It follows that the projection of $a+\eta b$ on n is the same as the original vector. For $\eta \neq 1$, this vector always has nonzero length, so n and $a+\eta b$ must be collinear.

We can therefore compute the desired surface normal from a linear combination of the normalized ray directions, a much simpler method than the one described by Papas et al. [PB+11]. There is not even a need for a distinction between reflection and refraction, since setting $\eta=1$ will yield the desired result in the case of reflection.

Figure 11:
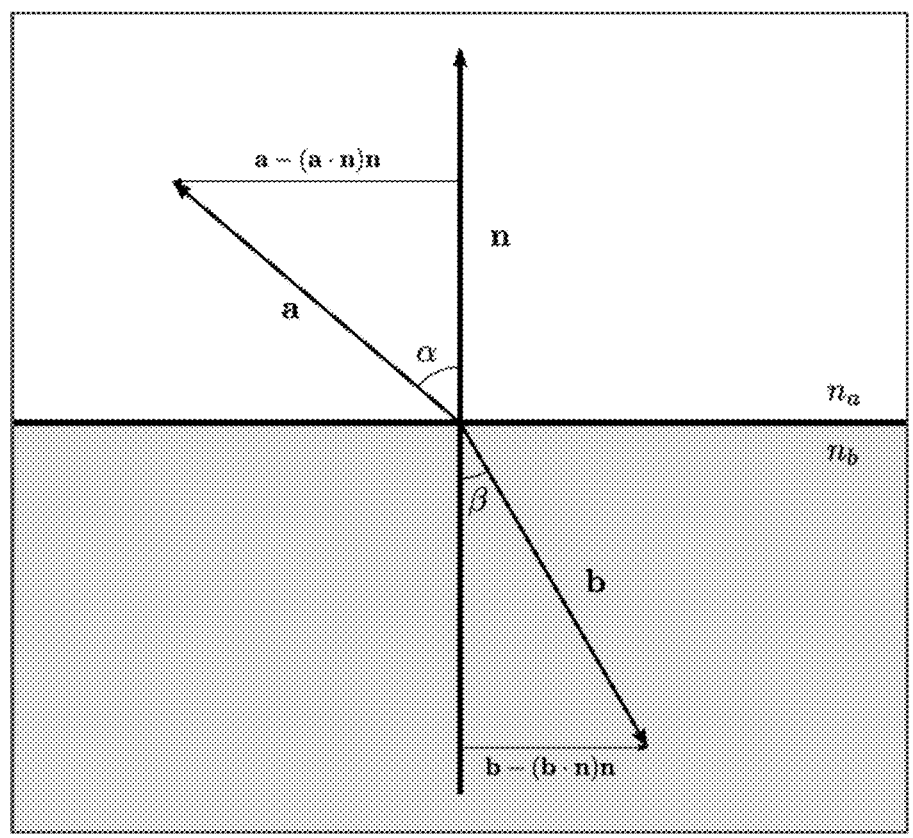
FIG. 11 illustrates refraction.

FIG. 11 illustrates refraction.

Section 2.3 Normal Fields to Height Fields

From a given photon mesh, one can now obtain the normal field using the insight from the previous section. In order to physically manufacture a reflective or refractive object that produces the desired caustic, the normal field must be converted to a height field. This section describes how.

As described in Section 2.1, a normal field n(x, y) can be computed from a height field z(x, y) by normalizing the vector $$\left(-\frac{\partial z}{\partial x}(x, y), -\frac{\partial z}{\partial y}(x, y), 1\right)^T. \tag{2.8}$$

Conversely, we can easily obtain derivatives for the desired field from the normals:

$$\frac{\partial z}{\partial x}(x, y) = -\frac{n_x(x, y)}{n_z(x, y)} \tag{2.9a}$$

$$\frac{\partial z}{\partial y}(x, y) = -\frac{n_y(x, y)}{n_z(x, y)}. \tag{2.9b}$$

However, the resulting vector field may not be a gradient field and thus not exactly reproducible. Algorithms that generate a normal field therefore must account for its integrability in order to be practicable.

This is the basis for the normal field to height field conversion; the remaining part of this section details the mathematical aspects of the optimization.

From equation (2.9), it seems natural to formulate the problem as a system of linear equations, which approximate the derivatives of height field values using finite differences. A slightly different, analytical approach to integrating gradient fields is used in the literature, e.g. by Fattal et al. [FLW02].

Figure 12:
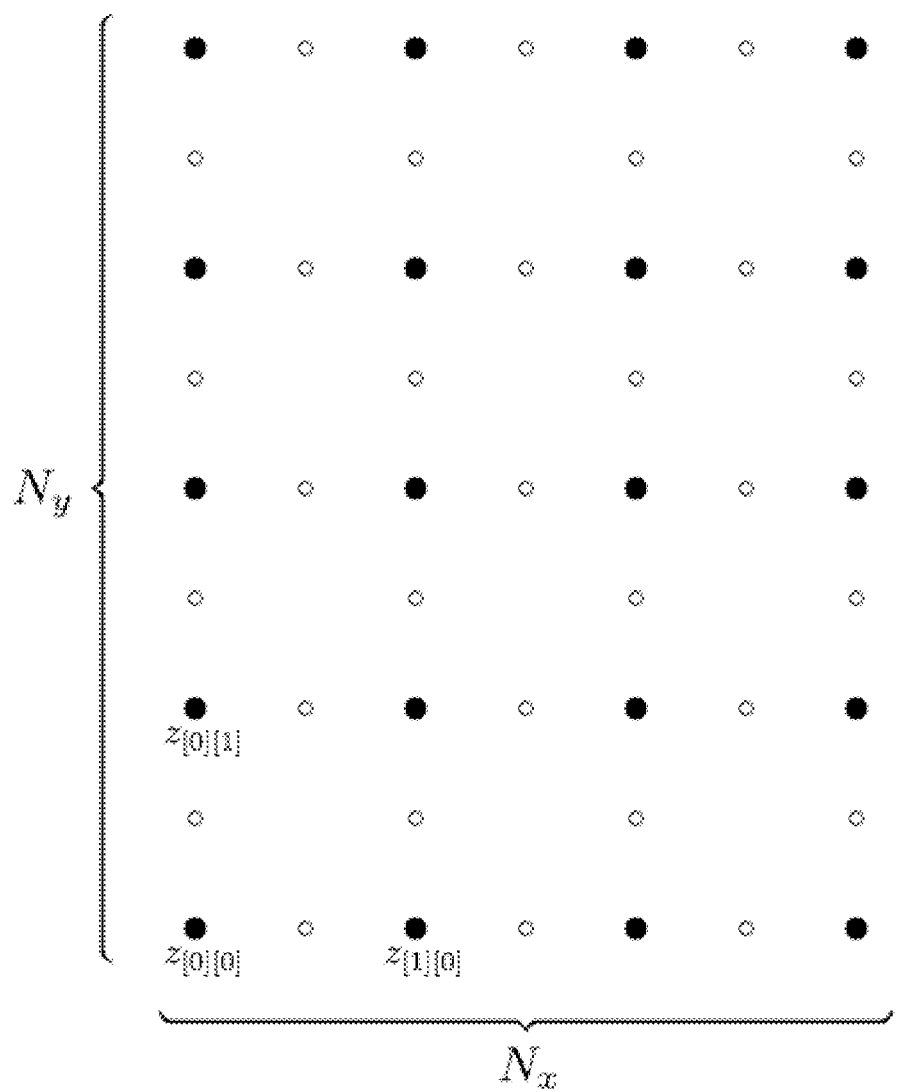
FIG. 12 show an arrangement of the height field/normal field elements.

The simplest way is to compute the derivatives on the midpoints of the grid edges, see FIG. 12. To obtain the values at these positions, the normals from the two adjacent grid nodes are averaged. It should be noted that this will lead to some blurring between the original normal field and the one reconstructed from the resulting height field.

FIG. 12 shows an arrangement of the height field/normal field elements. The small points represent the locations of the derivatives. The unknowns are ordered from bottom to top and left to right, i.e. $\{z[0][0], z[0][1], \ldots, z[1][0], \ldots\}$. This determines the ordering of the matrix rows and columns in Section 2.3.1.

In matrix notation, we obtain a linear system $Ax \approx b$. A and b consist of two parts; $(N_x-1)N_y$ rows for the $$\frac{\partial z}{\partial x},$$

and $N_x(N_y-1)$ rows for the $$\frac{\partial z}{\partial y}.$$

The vector x contains me $N_x N_y$ unknowns. As expected, the possibility of inconsistent fields leads to a system that has more equations than unknowns for $N_x, N_y > 2$, which we solve by least squares. The corresponding normal equations are $$A^T A x = A^T b \tag{2.10}$$

Section 2.3.1 Normal Equations Matrix

Let us take a closer look at A, and derive $A^T A$ from equation (2.10) to be used for an efficient, matrix-free implementation. As just mentioned, A consists of two parts:

$$A = \begin{bmatrix} A_x \\ A_y \end{bmatrix}. \tag{2.11}$$

$A_x$ consists of $(N_x-1) \times N_x$ blocks, each being an $N_y \times N_y$ submatrix. Each row of blocks corresponds to a column of $$\frac{\partial z}{\partial x}$$

derivatives. For convenience, the factor from $$\frac{1}{h}$$

the finite differences is moved to the right-hand side, where h is the grid spacing. Thus, b contains the desired derivatives multiplied by h, and the only nonzero entries of $A_x$ are $\pm 1$.

$$A_x = \begin{bmatrix} -1 & & & & +1 & & & & & & & & \\ & -1 & & & & +1 & & & & & & & \\ & & \ddots & & & & \ddots & & & & & & \\ & & & -1 & & & & +1 & & & & & \\ \hline & & & & -1 & & & & +1 & & & & \\ & & & & & -1 & & & & +1 & & & \\ & & & & & & \ddots & & & & \ddots & & \\ & & & & & & & -1 & & & & +1 & \\ \hline & & & & & & & & \ddots & & & & \ddots \\ \hline & & & & & & & & & -1 & & & +1 \\ & & & & & & & & & & -1 & & & +1 \\ & & & & & & & & & & & \ddots & & \ddots \\ & & & & & & & & & & & & -1 & +1 \end{bmatrix} \quad (2.12)$$

$A_y$ consists of $N_x \times N_x$ each being an $(N_y-1) \times N_y$ submatrix. Each row of blocks represents a column of $$\frac{\partial z}{\partial x}$$

derivatives.

$$A_y = \begin{bmatrix} -1 & +1 & & & & & & \\ & -1 & +1 & & & & & \\ & & \ddots & \ddots & & & & \\ & & & -1 & +1 & & & \\ \hline & & & & -1 & +1 & & \\ & & & & & -1 & +1 & \\ & & & & & & \ddots & \ddots \\ & & & & & & -1 & +1 \\ \hline & & & & & & & \ddots \\ \hline & & & & & & & & -1 & +1 \\ & & & & & & & & & -1 & +1 \\ & & & & & & & & & & \ddots & \ddots \\ & & & & & & & & & & & -1 & +1 \end{bmatrix} \quad (2.13)$$

Defining the $N-1 \times N$ matrix $$D_N := \begin{bmatrix} -1 & +1 & & & \\ & -1 & +1 & & \\ & & \ddots & \ddots & \\ & & & -1 & +1 \end{bmatrix} \quad (2.14)$$

allows us to write $A_x$ and $A_y$ using the Kronecker product.

$$A_x = D_{N_x} \otimes I_{N_y} \quad (2.15a)$$

$$A_y = I_{N_x} \otimes D_{N_y} \quad (2.15b)$$

Using $(A \otimes B)^T = A^T \otimes B^T$ and the mixed-product property of the Kronecker product $(A \otimes B)(C \otimes D) = AC \otimes BD$, we obtain $$A^T A = A_x^T A_x + A_y^T A_y = (D_{N_x}^T \otimes I_{N_y})(D_{N_x} \otimes I_{N_y}) + (I_{N_x} \otimes D_{N_y}^T)(I_{N_x} \otimes D_{N_y}) = (D_{N_x}^T D_{N_x} \otimes I_{N_y}) + (I_{N_x} \otimes D_{N_y}^T D_{N_y}), \quad (2.16)$$

with the $N \times N$ matrix $$D_N^T D_N = \begin{bmatrix} 1 & -1 & & & & \\ -1 & 2 & -1 & & & \\ & -1 & 2 & -1 & & \\ & & \ddots & \ddots & \ddots & \\ & & & -1 & 2 & -1 \\ & & & & -1 & 1 \end{bmatrix}. \quad (2.17)$$

Putting this together, we can see the format of $A^T A$, which consists of $N_x \times N$ blocks of $N_y \times N_y$ submatrices. This allows for an efficient implementation of the product $A^T Ax$.

$$A^T A = \begin{bmatrix} \begin{matrix} 2 & -1 & & \\ -1 & 3 & -1 & \\ & -1 & 3 & -1 \\ & & \ddots & \ddots \end{matrix} & \begin{matrix} -1 & & & \\ & -1 & & \\ & & -1 & \\ & & & \ddots \end{matrix} & & & & \\ \hline \begin{matrix} -1 & & & \\ & -1 & & \\ & & -1 & \\ & & & \ddots \end{matrix} & \begin{matrix} 3 & -1 & & \\ -1 & 4 & -1 & \\ & -1 & 4 & -1 \\ & & \ddots & \ddots \end{matrix} & \begin{matrix} -1 & & & \\ & -1 & & \\ & & -1 & \\ & & & \ddots \end{matrix} & & & \\ \hline & \begin{matrix} -1 & & & \\ & -1 & & \\ & & -1 & \\ & & & \ddots \end{matrix} & \begin{matrix} 3 & -1 & & \\ -1 & 4 & -1 & \\ & -1 & 4 & -1 \\ & & \ddots & \ddots \end{matrix} & \begin{matrix} -1 & & & \\ & -1 & & \\ & & -1 & \\ & & & \ddots \end{matrix} & & \\ \hline & & \ddots & \ddots & \ddots & \\ \hline & & & \begin{matrix} -1 & & & \\ & -1 & & \\ & & -1 & \\ & & & \ddots \end{matrix} & \begin{matrix} 3 & -1 & & \\ -1 & 4 & -1 & \\ & -1 & 4 & -1 \\ & & \ddots & \ddots \end{matrix} & \begin{matrix} -1 & & & \\ & -1 & & \\ & & -1 & \\ & & & \ddots \end{matrix} \\ \hline & & & & \begin{matrix} -1 & & & \\ & -1 & & \\ & & -1 & \\ & & & \ddots \end{matrix} & \begin{matrix} 2 & -1 & & \\ -1 & 3 & -1 & \\ & -1 & 3 & -1 \\ & & & \ddots \end{matrix} \end{bmatrix} \quad (2.18)$$

There is a noteworthy similarity to the matrix corresponding to a two-dimensional Poisson equation on a regular grid. Indeed, the approach used by Fattal et al. [FLW02] leads to Poisson's equation; one slight difference is that the derivation shown here automatically implicates the boundary condition.

Matrix Singularity

It should be noted that if $z(x, y)$ is a solution to the optimization problem, then so is $z'(x, y) = z(x, y) + d$. In other words, when adding a constant to all unknowns, the result will remain unchanged; in matrix notation (using the vector of ones 1), this implies $$A1=0. \quad (2.19)$$

This is also evident from the fact that the sums in A's rows are 0. Consequently, the matrix $A^T A$ from the normal equations is singular and merely positive semi-definite. This problem can be avoided by fixing one of the unknowns to 0 by removing the corresponding row and column from $A^T A$ and $A^T b$, which makes the matrix strictly positive definite and the solution unique.

In fact, the effort for that additional handling is not necessary for both the Gauss-Seidel and the conjugate gradient method, which state symmetry and strict positive definiteness as sufficient (but not necessary) conditions for convergence [GVL96, She94]. The former also converges for strictly diagonally dominant matrices, but it is easy to see that $A^T A$ is only weakly diagonally dominant. Despite this, the Gauss-Seidel as well as the conjugate gradient method will work with the above matrix. Appendix A contains a rough outline why they do.

Section 3 Brightness Warping

As explained in Section 2, a caustic can be generated by discretizing the light beam using a mesh, and tracing a ray for each vertex. The resulting projection on the receiver forms the photon mesh, and by deforming it, the caustic can be edited. This is most easily achieved if there is an exitant ray for each grid node of the height field, so the per-node normals can directly be obtained from the ray directions without the need for interpolation.

This observation was the basis for an approach developed in a preliminary project. It attempted to deform ("warp") an initially regular photon mesh to match a predefined caustic image using some rough heuristics. A result is displayed in FIGS. 13A-13B. The approach was designed to retain the bijectivity of the initial caustic, i.e. it was not supposed to produce folds. The desired brightness of each face is thus determined by the corresponding piece of the image, without having to account for possible overlaps in the caustic.

Figure 13A:
FIGS. 13A and 13B show a result where a caustic is warped using rough heuristics, where
Figure 13B:

FIGS. 13A-13B shows results where a caustic mesh is warped using rough heuristics, where FIG. 13A is a template image and FIG. 13B is a result The origin of FIG. 13A is "Mona Lisa", Leonardo da Vinci, public domain; http://en.wikipedia.org/wiki/File:Mona_Lisa.jpeg, retrieved on 13th Oct., 2010.

One issue with this approach was that modifications to better match the desired brightnesses shifted the faces, which in turn changed their desired brightness. To overcome this issue, the setup can be reversed (FIG. 2): A fixed mesh is used to describe the caustic, and the points on the specular surface which cast the corresponding rays are moved around. By deforming that mesh instead, the desired amounts of light can be allocated to the corresponding faces of the caustic; the larger the area of a face in this warped mesh on the specular plane, the more light is projected on the unchanged area in the caustic mesh, increasing the brightness. The boundary vertices of the warped mesh are confined to remain on the border.

Figure 2:
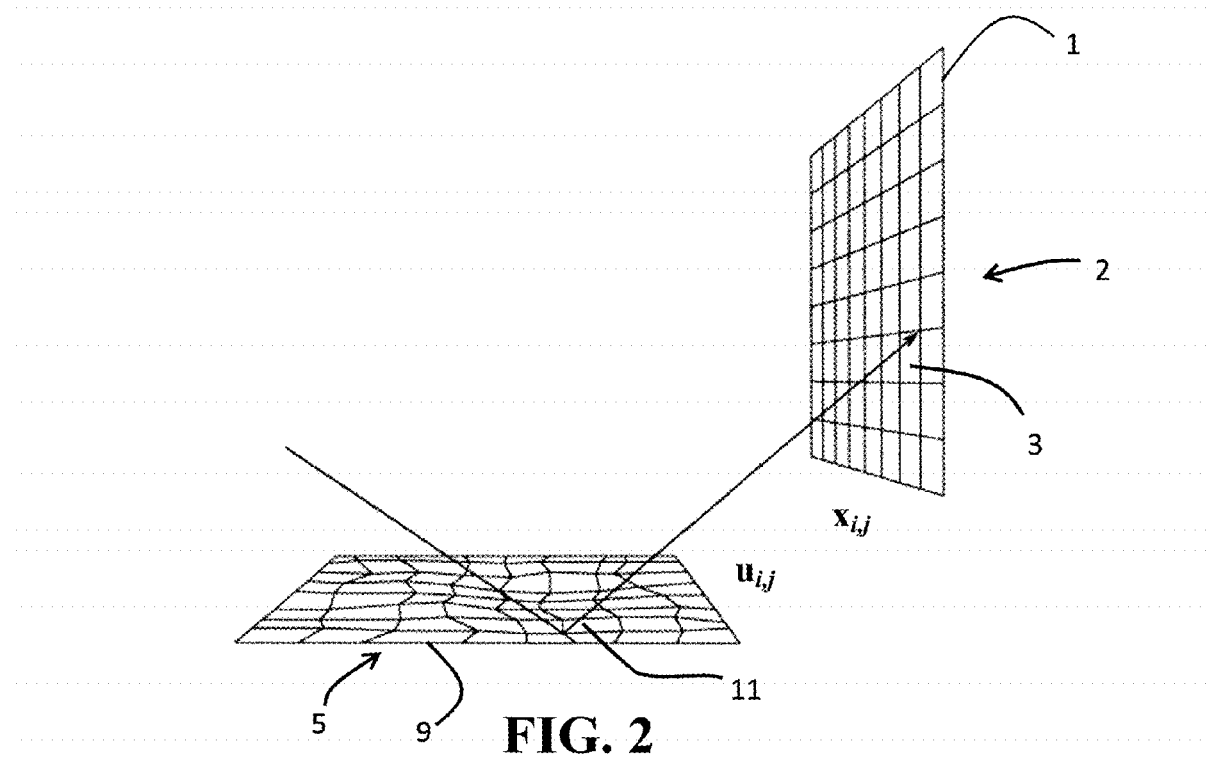
FIG. 2 schematically shows deforming (vertices $u_{i,j}$) of a mesh on the specular plane, while the mesh on the receiving surface (vertices $x_{i,j}$) is fixed.

FIG. 2 illustrates brightness warping, where a mesh on the specular plane is deformed (vertices $u_{i,j}$), while the mesh on the receiver (vertices $x_{i,j}$) is fixed.

Once the deformation of this mesh is found, the normal field is obtained by interpolating the outgoing ray directions at the grid nodes using barycentric coordinates. The normal field can then be integrated to a height field.

It should be noted that this approach cannot introduce folds or otherwise change the overall shape of a caustic by design. However, there is no assumption that prevents the specified photon mesh from having folds if there are folds, they will be preserved. In fact, this is another advantage over directly deforming the caustic mesh, since in that case it would be necessary to account for overlapping faces that make up the total resulting brightness. As a downside, the step where the warped mesh is mapped back to a regular grid may cause some degradation of the caustic's shape.

We will now set up a system of equations describing the brightness constraints (it will be seen that they are quadratic). Additionally, we want to ensure that the resulting normal field can be integrated to a height field. The corresponding equations will also be nonlinear.

The system of equations is posed as a least squares problem, using a linear combination of the corresponding objective functions. This optimization problem can then, for example, be solved by steepest descent or the nonlinear conjugate gradient method.

We will first derive the two objective functions for the optimization, then point out an issue about how to combine them and how to improve the convergence, and finally show the results this approach produces.

Section 3.1 Quad Brightness

First, we will determine the desired area of each quadrilateral in the warped mesh. As seen in equations (2.3) and (2.4), for a face i we have $$I_{s,i} A_{s,i} = I_{d,i} A_{d,i}, \quad (3.1)$$

where $I_{s,i}$ is the irradiance on the reflector/refractor corresponding to the desired area $A_{s,i}$, and $I_{d,i}$ is the irradiance on the receiver corresponding to the area $A_{d,i}$.

$I_{s,i}$ is the same for all faces since a parallel light source is assumed; the $A_{d,i}$ are determined by the given caustic mesh. $I_{d,i}$ is not known but proportional to the desired brightness $b_i$ of the caustic face, which is obtained from the desired image, therefore $$A_{s,i} \propto b_i A_{d,i}. \quad (3.2)$$

The right-hand side is known, and by summing over all faces, the proportionality constant can be eliminated since the total area on the specular surface is also fixed:

$$A_{s,i} = b_i A_{d,i} \cdot \frac{\sum_j A_{s,j}}{\sum_j b_j A_{d,j}}. \quad (3.3)$$

In Section 2.1, this was described using triangles. The implementation uses a mesh of quadrilaterals, which should not be an issue since the algorithm does not seem to cause them to intersect themselves in practice. To avoid singularities, a constant value is added to the image, making all $b_i$ strictly positive so the corresponding faces do not become arbitrarily small. The choice of this constant is a trade-off between stability and contrast the implementation therefore allows the user to change it.

The area of a non-self-intersecting quadrilateral with counterclockwise labelling ABCD is $$\frac{1}{2}(\det[\; u_B - u_A \quad u_D - u_A \;] + \det[\; u_C - u_D \quad u_C - u_B \;]). \quad (3.4)$$

We turn this into the corresponding brightness condition, where $As_{,ABCD}$ is the desired area from above. It is reasonable to use relative area deviations for the least squares optimization, thus $$\frac{1}{2A_{s,ABCD}}(\det[\; u_B - u_A \quad u_D - u_A \;] + \det[\; u_C - u_D \quad u_C - u_B \;]) \stackrel{!}{=} 1. \quad (3.5)$$

We can rewrite this in matrix notation, where u is a vector containing all $u_P$, and $M_{ABCD}$ is symmetric:

$$f_{ABCD}(u) := u^T M_{ABCD} u - 1 \stackrel{!}{=} 0. \quad (3.6)$$

Squaring and summing this quantity for all quadrilaterals, we obtain the objective function for the brightness part.

The gradient of the squared expression, $$\frac{\partial}{\partial u}(f_{ABCD}(u)^2) = 2(u^T M_{ABCD} u - 1) \cdot 2 M_{ABCD} u, \quad (3.7)$$

now allows us to use this brightness objective in a gradient-based optimization.

Section 3.2 Integrability

As mentioned earlier, we also want to make sure that the resulting normal field can faithfully be reproduced by a height field.

To start, let us briefly recap how the normal $n_P$ at a vertex P on the reflective or refractive surface interlinks the height field and the warped mesh. The normal is defined by the corresponding ingoing and outgoing light directions i and $o_P$ and the quotient of refractive indices η (see Section 2.2.1, η=1 for reflection). The incident direction i is constant and assumed to be normalized; $o_P$ is simply the distance vector between the corresponding odes on the specular and diffuse surface, and not normalized here.

Without loss of generality, we consider the specular, normal-mapped surface to be located in the xy plane. A little notational abuse therefore allows us to write $o_P = x_P - u_P$, where the vertex position $u_P$ is treated as three-dimensional vector with a z component of 0.

The normal $n_P$ is now linked to the derivatives of the unknown height field z(u) as seen in Section 2.3:

$$\frac{\partial z}{\partial u} = -\frac{n_{Px}}{n_{Pz}} = -\frac{\|o_P\| i_x + \eta o_{Px}}{\|o_P\| i_z + \eta o_{Pz}}. \quad (3.8a)$$

$$\frac{\partial z}{\partial v} = -\frac{n_y}{n_{Pz}} = -\frac{\|o_P\| i_y + \eta o_{Py}}{\|o_P\| i_z + \eta o_{Pz}}. \quad (3.8b)$$

Since the derivatives correspond to the normal divided by its z component, the normal $n_P$ does not need to be normalized. Therefore, the modified definition $n_P = \|o_P\| i + \eta o_P$ instead of is used here $$n_P = i + \eta \frac{o_P}{\|o_P\|}$$

for convenience.

To ensure the existence of a height field with the same normals, the vector field defined by the normals must be conservative, i.e. the line integral around any closed loop must be zero, $$\oint \nabla_z(r) \cdot dr \stackrel{!}{=} 0. \qquad (3.9)$$

This is a consequence of the gradient theorem.

An alternative condition, which requires partial derivatives of the vector field defined by equation (3.8), is stated by Fattal et al. [FLW02]. The approach described here operates on a quad mesh, where the vertices define the values of the vector field, so the computation of the field's partial derivatives would not be trivial. Moreover, we are also interested in the derivatives of the corresponding equations, which would complicate things even more. It is therefore preferable to stick to the loop integral above in order to assert the normal field's integrability.

If that condition is satisfied for the edges of all quadrilaterals ABCD of our mesh, it will hold for every closed loop along mesh edges, and hopefully be approximately satisfied for any loop in general. To formulate the loop integral, we linearly interpolate the vector field along the quad edges, which is equivalent to averaging the values of the edge's end points. Again, the up are treated as three-dimensional vectors with a z component of 0.

$$-\oint_{ABCD} \nabla_z(r) \cdot dr \approx \frac{1}{2}\left(\frac{n_A}{n_{Az}} + \frac{n_B}{n_{Bz}}\right) \cdot (u_B - u_A) + \qquad (3.10)$$

$$\frac{1}{2}\left(\frac{n_B}{n_{Bz}} + \frac{n_C}{n_{Cz}}\right) \cdot (u_C - u_B) +$$

$$\frac{1}{2}\left(\frac{n_C}{n_{Cz}} + \frac{n_D}{n_{Dz}}\right) \cdot (u_D - u_C) +$$

$$\frac{1}{2}\left(\frac{n_D}{n_{Dz}} + \frac{n_A}{n_{Az}}\right) \cdot (u_A - u_D)$$

$$= \frac{1}{2}\left(\left(\frac{n_B}{n_{Bz}} - \frac{n_D}{n_{Dz}}\right) \cdot (u_C - u_A) - \left(\frac{n_C}{n_{Cz}} - \frac{n_A}{n_{Az}}\right) \cdot (u_B - u_D)\right)$$

$$=: g_{ABCD}(u)$$

Squaring and summing this quantity for all quadrilaterals, we obtain the objective function for the integrability part.

We exemplarily derive this term for uAx, to be used for steepest descent or the conjugate gradient method.

$$\frac{d}{du_{Ax}}(g_{ABCD}(u)^2) = \qquad (3.11)$$

$$g_{ABCD}(u)\left(-\left(\frac{n_{Bx}}{n_{Bz}} - \frac{n_{Dx}}{n_{Dz}}\right) + \frac{d}{du_{Ax}}\left(\frac{n_A}{n_{Az}} \cdot (u_B - u_D)\right)\right)$$

Recalling the definitions $n_A = |o_A|i + \eta o_A$ and $o_A = x_A - u_A$, we obtain:

$$\frac{d}{du_{Az}}\left(\frac{n_A}{n_{Az}} \cdot (u_B - u_D)\right) = \frac{1}{n_{Az}}\left(\frac{dn_A}{du_{Ax}} \cdot (u_B - u_D)\right) - \qquad (3.12)$$

$$\frac{1}{n_{Az}^2}(n_A \cdot (u_B - u_D))\frac{dn_{Az}}{du_{Ax}}$$

$$= \frac{1}{n_{Az}}\left(\frac{d\|o_A\|}{du_{Ax}}(i \cdot (u_B - u_D)) - \eta(u_{Bx} - u_{Dx})\right) - \frac{1}{n_{Ax}^2}\frac{d\|o_A\|}{du_{Ax}}i_z(n_A \cdot (u_B - u_D))$$

$$= \frac{1}{n_{Az}}\left(\frac{d\|o_A\|}{du_{Ax}}\left(\left(i - i_z\frac{n_A}{n_{Az}}\right) \cdot (u_B - u_D)\right) - \eta(u_{Bx} - u_{Dx})\right).$$

Finally, $$\frac{d\|o_A\|}{du_A} = \frac{1}{2\|o_A\|} \cdot 2(u_A - x_A) = -\frac{o_A}{\|o_A\|}. \qquad (3.13)$$

Putting everything together, $$\frac{d}{du_{Ax}}(g_{ABCD}(u)^2) = g_{ABCD}(u)\left(-\left(\frac{n_{Bx}}{n_{Bz}} - \frac{n_{Dx}}{n_{Dz}}\right) - \qquad (3.14)\right.$$

$$\left.\frac{1}{n_{Az}}\eta(u_{Bx} - u_{Dx}) - \frac{1}{n_{Az}}\frac{o_{Ax}}{\|o_A\|}\left(i - i_z\frac{n_A}{n_{Az}}\right) \cdot (u_B - u_D)\right),$$

we are now able to use this integrability condition in an optimization.

Section 3.3 Consistency Correction

Putting the integrability and brightness functions together using some weighting coefficient λ, we obtain the naïve objective $$\min_u \sum_{ABCD} (\lambda \cdot f_{ABCD}(u)^2 + g_{ABCD}(u)^2). \qquad (3.15)$$

The problem with this is that when the field resolution changes, the functions will act differently: $g_{ABCD}$ is a loop integral along the quadrilateral edges, so its value will halve when the field resolution is doubled. Since the number of faces quadruples, the sum over $g^2_{ABCD}$ does not depend on the resolution. On the other hand, $f_{ABCD}$ is the current quad area divided by the desired area and therefore resolution-independent. The sum over all quads will therefore quadruple when the resolution doubles. To obtain a consistent, resolution-independent measure, we multiply g by the average quad area, so the optimization reads $$\min_u \sum_{ABCD} (\lambda \bar{A}_d \cdot f_{ABCD}(u)^2 + g_{ABCD}(u)^2). \qquad (3.16)$$

Section 3.4 Multigrid

Figure 14A:
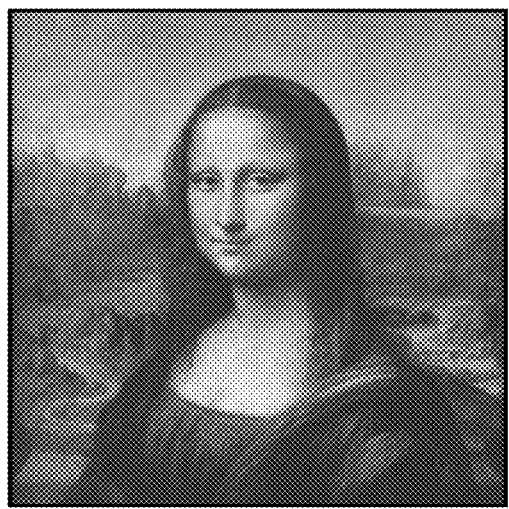
FIGS. 14A-14B illustrate brightness warping output for the Mona Lisa template (FIG. 14A) on a 321×321 field, after 100 nonlinear conjugate gradient iterations without multigrid (FIG. 14B)
Figure 14B:
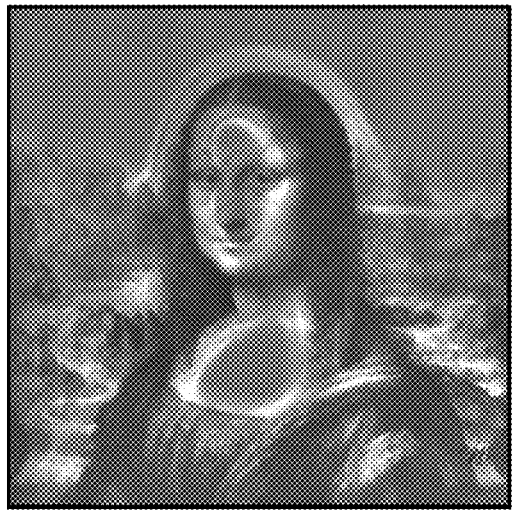

The implementation of this approach soon showed that it captures fine details very well, however, it is apparently slow in terms of propagating brightness changes over large distances, see FIGS. 14A-14B. This is not surprising, considering that equally-sized quads in an area of constant brightness will practically prevent each other from growing or shrinking. This issue can be overcome by a multigrid approach [Hac85], which considerably reduces the number of iterations required for the optimization.

Multigrid methods are typically applied to linear problems, e.g. Poisson equations, that are solved using an iterative method such as Gauss-Seidel. After running a few iterations to reduce high-frequency components of the residual errors, these are downsampled to a coarser grid, where the equivalent problem is solved recursively. The solution is then interpolated back to the finer grid and added to the previous solution as a correction. Finally, the iterative method is applied again to obtain the final solution.

The problem at hand is nonlinear, so restricting only a residual and using the resulting coarse-grid solution as a correction is not applicable here. Nevertheless, because all terms are defined with respect to the faces that make up the warped mesh, it is straightforward to solve the full brightness warping optimization on a lower resolution. More precisely, the coarse problem can be obtained by joining four quads of the high-resolution warped mesh to one low-resolution quad. This restriction scheme obviously affects how the field resolutions should be chosen. The number of quadrangles in one dimension is chosen as a multiple of a power of two. The resolutions specified throughout this work are understood to be the number of vertices, so these are the number of quadrangles plus one. The desired face areas for the coarse mesh are then simply the sums of the four corresponding faces of the fine mesh. The integrability terms do not require any action for the coarsening step. After solving the problem on the lower resolution, the warped mesh is simply subdivided, and the nonlinear conjugate gradient method is applied on the higher resolution, reproducing finer details of the desired image.

FIGS. 14A-14B illustrates brightness warping output for the Mona Lisa template on a 321×321 field, after 100 nonlinear conjugate gradient iterations without multigrid. Note the fine details such as the curly hair on the right or the bridge in the background despite the obvious artifacts. Furthermore, there are no perfectly black areas, since a constant value was added to the template image for stability reasons, as mentioned in Section 3.1 (here, the values in the initial brightness range between 0 and 1 were augmented by 0.25, which noticeably affects the contrast).

Section 3.5 Results

FIGS. 15A through 20D, and FIGS. 5A-5D, show some examples that were generated using a multigrid solver. The output images were rendered by the software as described in Section 2.1 in FIGS. 15A through 18B. To verify the results, the physically-based software LuxRender was used to generate the output images in FIGS. 19A through 20D, and FIGS. 5A-5D; in these cases the actual height field was used to render the caustics and not just a normal field.

For each image except FIGS. 20A-20D, the optimization for a 641×641 field (limited to 200 iterations per multigrid level, and excluding the normal field to height field conversion) took between three and four minutes. The normal field to height field conversion took just under twenty seconds at this resolution. For the 1793×1281 field in FIGS. 20A-20D, the optimization took about eighteen minutes, plus two minutes for the height field computation. The tests were run on an Intel Core 2 Quad Processor Q6600 at 2.4 GHz running RedHat Enterprise Linux; the implementation is single-threaded and hardly optimized.

The brightness of the resulting images was adjusted so the brightest areas became roughly white. On the images in FIGS. 15-15B, the same adjustment was performed as in FIG. 14B.

Figure 15A:
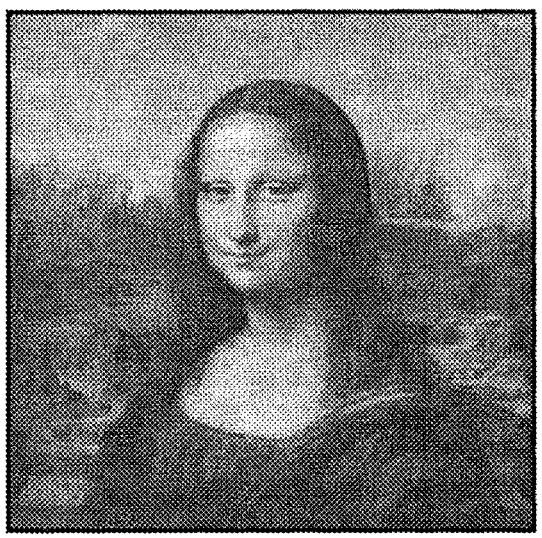
FIGS. 15A-15B illustrate brightness warping output for the Mona Lisa template on a 641×641 field, using a multigrid approach with at most 200 nonlinear conjugate gradient iterations per level, where
Figure 15B:

FIGS. 15A-15B illustrates brightness warping output for the Mona Lisa template on a 641×641 field, using a multigrid approach with at most 200 nonlinear conjugate gradient iterations per level. Besides some minor blurring (as predicted in Section 2.3), the difference introduced by converting the normal field to a height field is hardly noticeable.

It can be seen that the proposed approach is able to accurately reproduce images. Since it produces a smooth surface, the results do not suffer from the quantization artifacts inherent to systems like the one proposed by Papas et al. [PJJ+11]. There are also no small discontinuities that may introduce artifacts, and there is less danger of damaging surface features while polishing a milled prototype. As seen in FIGS. 20A-20D, high resolutions can be realized in a practicable amount of time, generating results of virtually arbitrary precision. Thus, the achievable accuracy of caustics using this method is mainly limited by the manufacturing process, namely how accurately a height field can be produced, and how well the surface can be polished to near-perfect specularity.

The popular Lena test image (FIGS. 5A-5D) was also used by Papas et al. as one of their examples, and in addition, they have asked Finckh et al. to run their algorithm [FDL10] on it. A simulation of the resulting caustic can be seen in [PJJ+11, FIG. 11] for the approach by Finckh et al. (which apparently generated a fold-free caustic), and in [PJJ+11, FIG. 12] for the one that Papas et al. have proposed. Their setup, a 10 cm field at a distance of 25 cm to the receiver, was also used in the examples shown here.

Considering the achievable accuracy, it is unsurprising that both the methods by Papas et al. and Finckh et al. are outperformed by the approach proposed in this patent application. For a more meaningful and fair comparison, however, it would be interesting to physically manufacture the field as Papas et al. have done. Unfortunately, this was not possible due to time constraints.

FIGS. 16A-16J show the effect of the constant added to the brightness. The results after 200 iterations of the brightness warping and the subsequent normal to height field conversion are shown in FIG. 16B, FIG. 16C and FIG. 16D, with detail cut-outs underneath. The conversion introduces considerable artifacts for the lowest value, but running the optimization longer helps to improve the integrability, see FIG. 16E. Using a value of +0.025 for this image produces no useable results as it leads to unrecoverable instabilities in the brightness warping computation, shown in FIG. 16F, which includes the visualization of the photon mesh.

Figure 18A:
FIGS. 18A-18B show a brightness warping result for the panda template (originally by Friedrich W. Kuhnert, 1865-1926), using a 10×10 cm field of 641×641 nodes, with a distance of 25 cm to the receiver and a refractive index of 1.5, where
Figure 18B:

FIGS. 17A-17C show a brightness warping result, same setup as in FIGS. 15A-15B. The distortion of the caustic mesh that results in this minimalistic pattern is displayed in FIG. 17C. FIGS. 18A-18B show a brightness warping result for the panda template (originally by Friedrich W. Kuhn-ert, 1865-1926), using a 10×10 cm field of 641×641 nodes, with a distance of 25 cm to the receiver and a refractive index of 1.5. The brightness value was augmented by 0.05 for the optimization, considerably reducing the loss of contrast seen in FIG. 15A-15B. The origins of FIG. 18A is "Prankenbar", Friedrich W. Kuhnert (1865-1926), public domain; http://en.wikipedia.org/wiki/File:Prankenbaer-drawing.jpg, retrieved on 13th Oct., 2010.

Figure 19A:
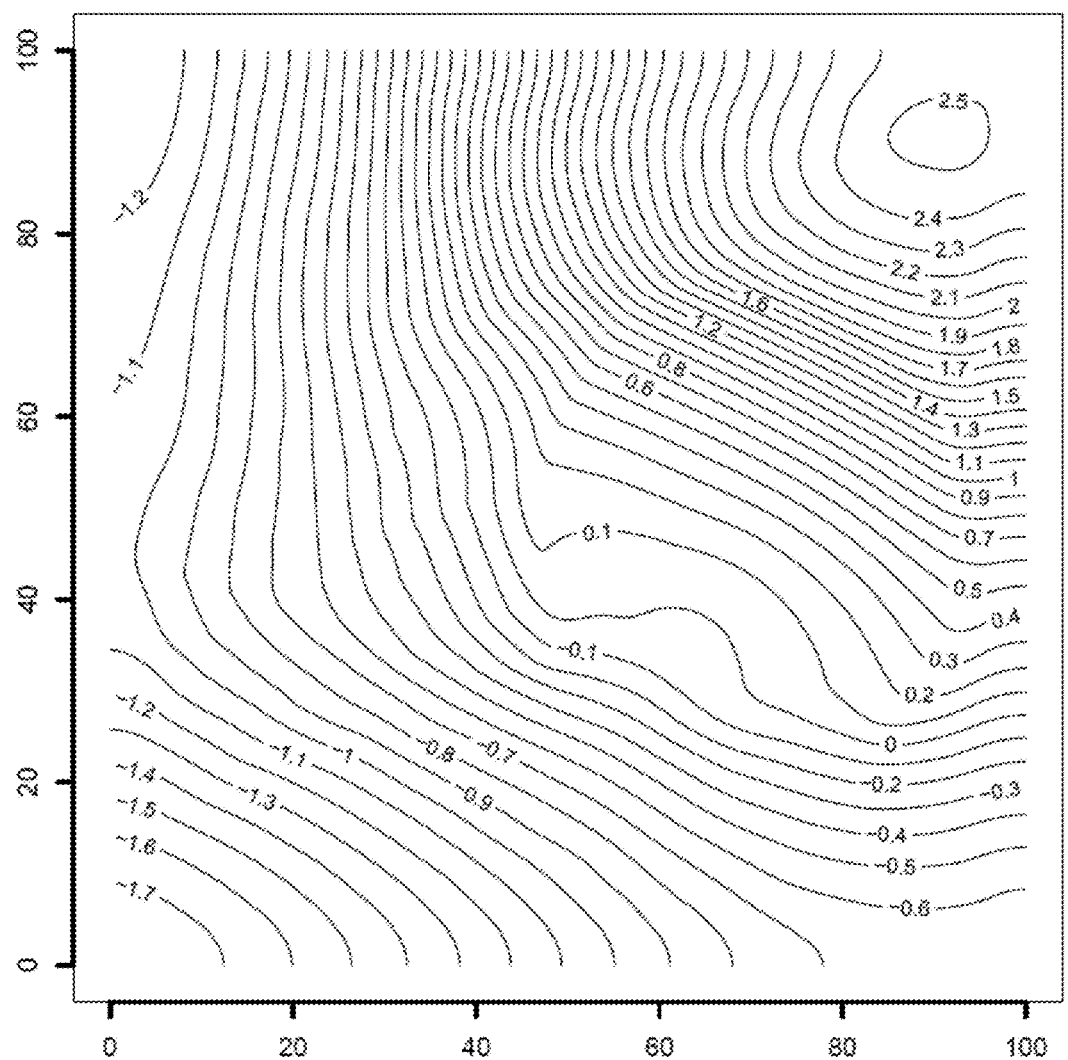
FIGS. 19A-19B show height field isocontours (FIG. 19A) and LuxRender simulation results (FIG. 19B) for the panda image, where the measurements in FIG. 19A are given in millimeters.
Figure 19B:

FIGS. 19A-19B show a height field isocontours and LuxRender simulation result for the panda image, where the measurements in FIG. 19A are given in millimeters.

Figure 20A:
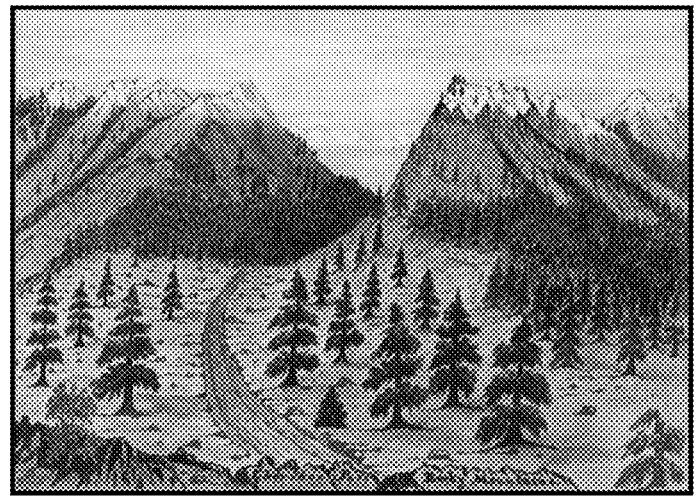
FIGS. 20A-20D show brightness warping result for the "Cherokee Pass, Rocky Mountains" image (a 1859 drawing by Daniel A. Jenks), where
Figure 20B:
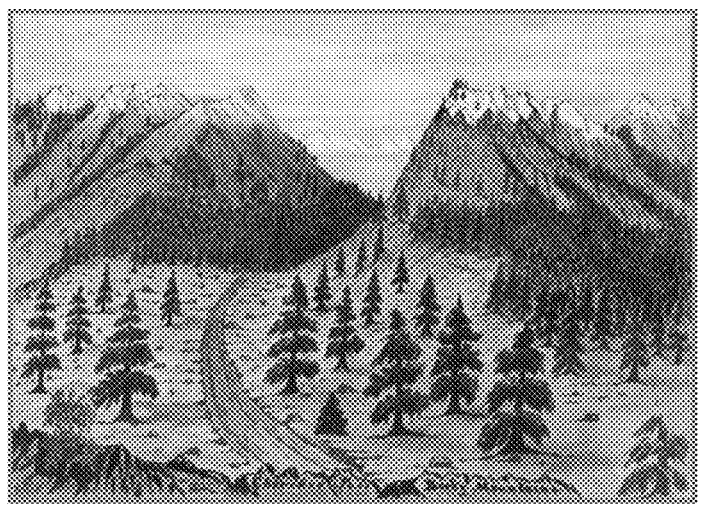
Figure 20C:
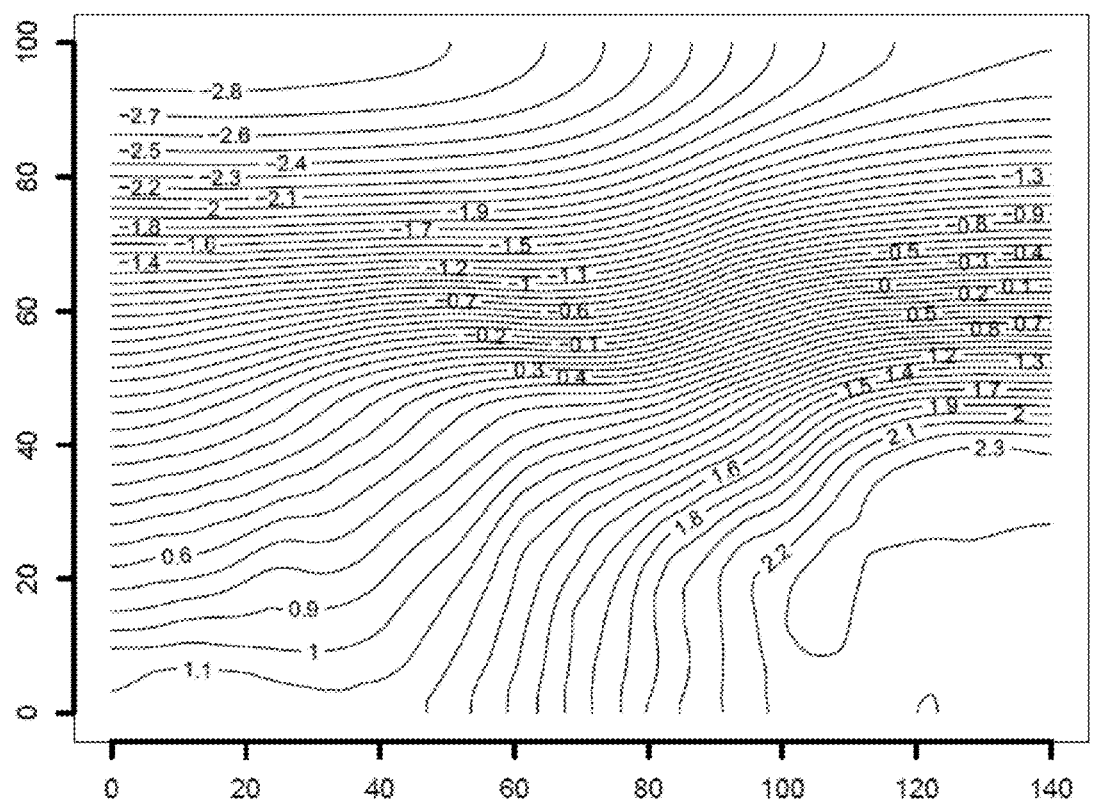
Figure 20D:
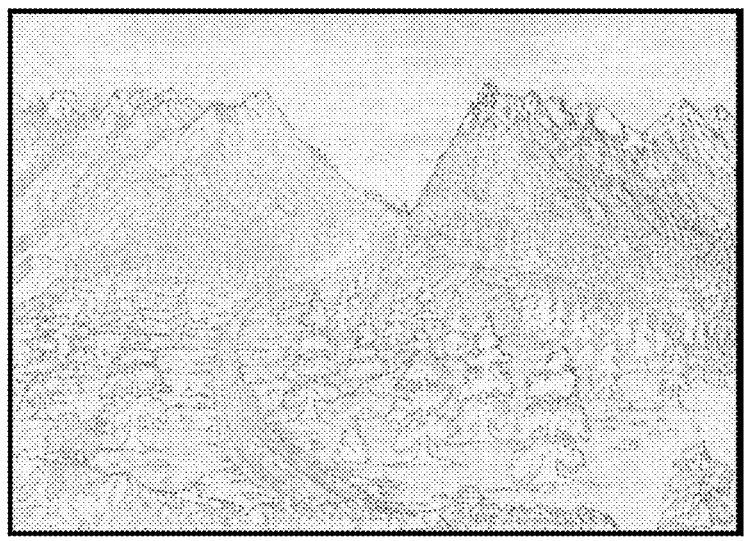

FIGS. 20A-20D show brightness warping result for the "Cherokee Pass, Rocky Mountains" image (a 1859 drawing by Daniel A. Jenks). The image was generated using a deliberately abundant field resolution of 1793×1281 over 14×10 cm, the same setup as in FIGS. 18A-18B was used otherwise. The difference image FIG. 20D was obtained by adjusting FIG. 20A according to the constant added to the brightness, and computing the difference to FIG. 20B. The result was multiplied by 4 for better visibility and then inverted. The origins of FIG. 20A is "Cherokee Pass, Rocky Mountains" (1859), Daniel A. Jenks, public domain; http://en.wikipedia.org/wiki/File:Cherokee_Pass2.jpg, retrieved on 14th Apr., 2011.

FIGS. 5A-5D show a brightness warping result for the Lena test image. It was not necessary to increment the brightness values in this example, otherwise the setup was the same as in FIGS. 18A-18B. Again, FIG. 5D was obtained by multiplying the difference between FIG. 5A and FIG. 5B by 4 and inverting the result. The origins of FIG. 5A is "Lena", copyright held by Playboy Enterprises, Inc.; http://en.wikipedia.org/wiki/File:Lenna.png, retrieved on 23rd Mar., 2011.

Section 4 Fold Generator

The previous approach is not suited for generating a caustic with folds, yet these are a key feature of visually compelling caustic patterns. One of the main difficulties with folds is that they can not simply be generated at random locations, since they imply bright, sharp contours, which may drown out the desired image, and it is not trivial to gain explicit control over the shape and position of these contours. Furthermore, folds may span over the whole caustic, so an approach that tries to introduce them locally would probably be too restrictive.

In this approach, we set up several conditions that will hopefully help us generate a caustic that features folds at designated locations.

Section 4.1 Realization

The setup used for this method is the same as for the preliminary work briefly mentioned in Section 3, i.e. we consider a fixed, regular mesh on the reflective or refractive surface (positions), and deform a mesh of the same connectivity on the receiving surface (positions $u_j$), see FIG. 4.

The vectors pointing from $x_j$ to $u_j$ are the desired directions of the reflected or refracted rays. Using these and the incoming ray directions, we can compute the normal field, and then find a height field that optimally matches these normals using the approach described in Section 2.3.

In Sections 4.1.1 through 4.1.6 as well as in Section 4.1.8, the x and u vectors are understood as two-dimensional vectors with respect to the corresponding planes, that is, $$u = \begin{pmatrix} u \\ v \end{pmatrix}$$

and $$x = \begin{pmatrix} x \\ y \end{pmatrix}.$$

Let us now define some variables that we use to characterize the desired folds.

FIG. 4 shows the $x_{i,j}$ form a regular grid on the specular plane, the $u_{i,j}$ are node coordinates of the deformed mesh on the receiver. Note that the $x_{i,j}$ are fixed and the $u_{i,j}$ are not, like they were for the brightness warping approach, but the assignment to the two surfaces is swapped, i.e. the $x_{i,j}$ are on the specular and the $u_{i,j}$ on the diffuse surface, in contrast to FIG. 2.

First of all, let $u_{C,i}$ denote the ith designated fold point. Since a fold forms an edge with a sharp decrease in brightness, we also need a vector that defines the orientation, which we will denote by $d_{C,i}$. This normalized vector is to be orthogonal to the fold edge, and points to the side that is supposed to be illuminated (FIG. 21).

Figure 21:
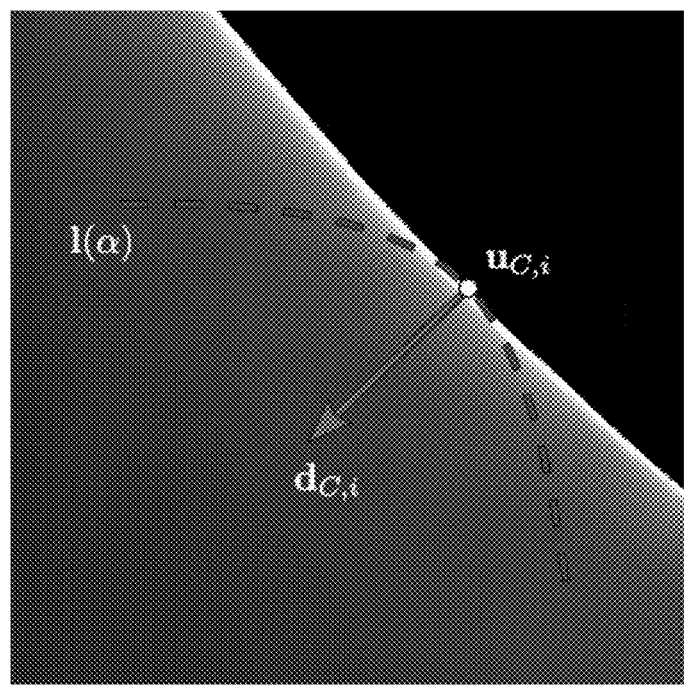
FIG. 21 shows an arrangement of $u_{C,i}$, $d_{C,i}$ and $l(\alpha)$.

FIG. 21 shows an arrangement of $u_{C,i}$, $d_{C,i}$ and $l(\alpha)$ (cf. Sections 4.1.2 and 4.1.3).

We will also need to know a point x on the specular surface where an incident ray is reflected or refracted so it will intersect the receiver at $u_{C,i}$. It specifies where the field is to be modified in order to control the caustic in the area around $u_{C,i}$. That point is not fixed, so we introduce an unknown vector $x_{C,i}$ for each $u_{C,i}$.

Furthermore, the $u_j$ will have to be used as a function u(x), using an appropriate interpolation kernel k:

$$u(x, y) = \sum_j u_j k(x - x_j) k(y - y_j). \tag{4.1}$$

The derivatives are then defined using the kernel's derivative, $$\frac{\partial u}{\partial x} = \sum_j u_j k'(x - x_j) k(y - y_j) \tag{4.2a}$$

$$\frac{\partial u}{\partial y} = \sum_j u_j k(x - x_j) k'(y - y_j). \tag{4.2b}$$

and analogously for higher derivatives.

With these definitions, we can set out to form the various equations that will hopefully produce the desired folds.

Section 4.1.1 Fold Positions

Figure 22:
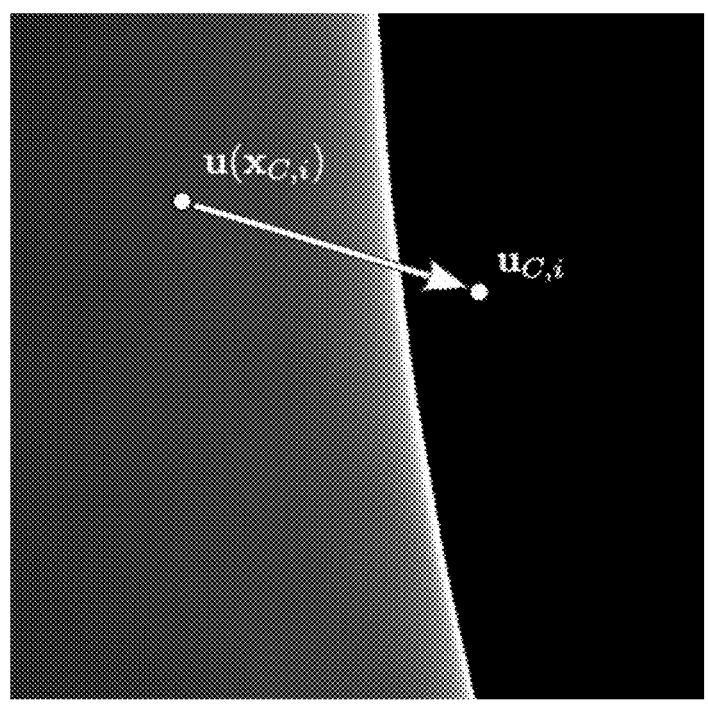
FIG. 22 shows the corresponding point of the caustic, for $x_{C,i}$ maps to $u_{C,i}$.

FIG. 22 shows the corresponding point of caustic $x_{C,i}$, for maps to $u_{C,i}$.

We have introduced the unknowns $x_{C,i}$, where we want an incident ray to be reflected or refracted onto $u_{C,i}$, so we have to enforce this condition:

$$\|f_1\| := \|u(x_{C,i}) - u_{C,i}\| \stackrel{!}{=} 0. \tag{4.3}$$

Note, in each equation (4.3), that $f_1$ is defined for a point i, so strictly speaking, the name $f_{1,i}$ would be more accurate. The same hold for the following sections.

As in Section 3.3, we will want to be careful to use quantities that do not change when the grid resolution changes. However, up to Section 4.1.6, we rely on u(x) to produce folds as desired and do not require correction factors.

The optimization will be posed as a least squares problem, so we square equation (4.3) and sum it over all specified points i. To be able to solve the optimization problem, the derivatives are also shown here and in the following sections. Deriving $\|f_1\|^2$ for $u_j$ yields $$2f_1 k(x_{C,i} - x_j) k(y_{C,i} - y_j); \tag{4.4a}$$

the derivatives for the $x_{C,i}$ are the scalar products $$2f_1 \cdot \Sigma u_j k'(x_{C,i} - x_j) k(y_{C,i} - y_j) \text{ for } x_{C,i}, \tag{4.4b}$$

$$2f_1 \cdot \Sigma u_j k(x_{C,i} - x_j) k'(y_{C,i} - y_j) \text{ for } y_{C,i}. \tag{4.4c}$$

Figure 23:
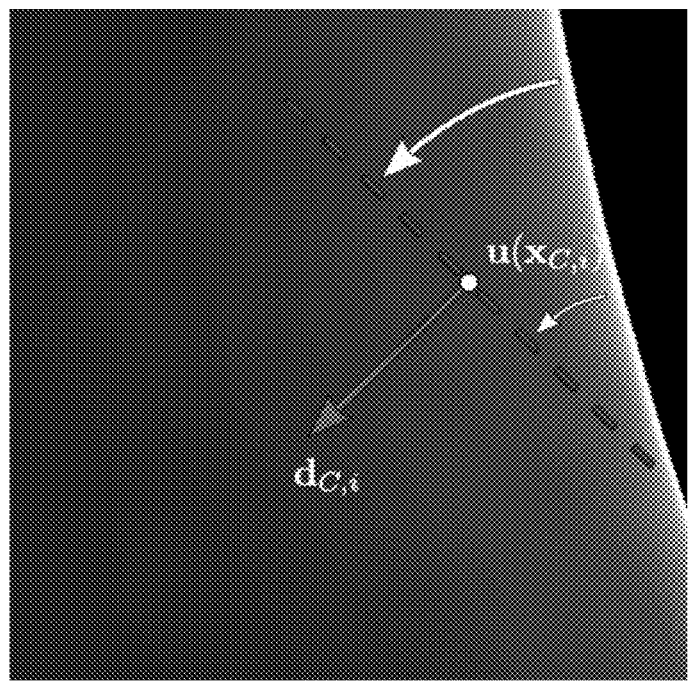
FIG. 23 shows $u(x_{C,i})$ lies on a fold edge orthogonal to $d_{C,i}$.

FIG. 23 shows $u(x_{C,i})$ lies on a fold edge orthogonal to $d_{C,i}$.

Section 4.1.2 Edge Orientation

Now let us take a look at the features of a fold that we want to reproduce. Consider the curve on the caustic pattern that is defined by following a straight line on the specular surface, $l(\alpha):=u(x_{C,i}+\alpha t)$, as shown in FIG. 21.

If $u(x_{C,i})$ forms a fold, we obtain a critical point at $\alpha=0$ when projecting $l(\alpha)$ onto $d_{C,i}$. In other words, the resulting curve $l(\alpha)$ is orthogonal to the direction $d_{C,i}$ at $\alpha=0$. We therefore impose this condition, ensuring that the caustic features a fold or at least a bright area (if the critical point is a saddle point) that is orthogonal to $d_{C,i}$.

$$\frac{\partial u}{\partial \alpha}(u(x_{C,i}+\alpha t))\cdot d_{C,i} = \left(\frac{\partial u}{\partial x}t_x + \frac{\partial u}{\partial y}t_y\right)d_{C,i,x} + \left(\frac{\partial v}{\partial x}t_x + \frac{\partial v}{\partial y}t_y\right)d_{C,i,y} \stackrel{!}{=} 0 \quad (4.5)$$

Since we want this condition to hold for every t, we can eliminate that parameter to obtain a condition that can be used for the optimization.

$$f_{2,x} := \frac{\partial u}{\partial x}(x_{C,i})\cdot d_{C,i} = \frac{\partial u}{\partial x}d_{C,i,x} + \frac{\partial v}{\partial x}d_{C,i,y} \stackrel{!}{=} 0 \quad (4.6a)$$

$$f_{2,y} := \frac{\partial u}{\partial y}(x_{C,i})\cdot d_{C,i} = \frac{\partial u}{\partial y}d_{C,i,x} + \frac{\partial v}{\partial y}d_{C,i,y} \stackrel{!}{=} 0 \quad (4.6b)$$

We square these terms and include them in the optimization. The various derivatives of $(f_{2,x})^2$ are $$2f_{2,x}k'(x_{C,i}-x_j)k(y_{C,i}-y_j)d_{C,i} \text{ for } u_j, \quad (4.7b)$$

$$2f_{2,x}(\Sigma_j u_j k''(x_{C,i}-x_j)k(y_{C,i}-y_j))\cdot d_{C,i} \text{ for } x_{C,i}, \quad (4.7b)$$

$$2f_{2,x}(\Sigma_j u_j k'(x_{C,i}-x_j)k'(y_{C,i}-y_j))\cdot_{C,i} \text{ for } y_{C,i}. \quad (4.7c)$$

The gradient of $(f_{2,y})^2$ can be derived analogously.

Figure 24:
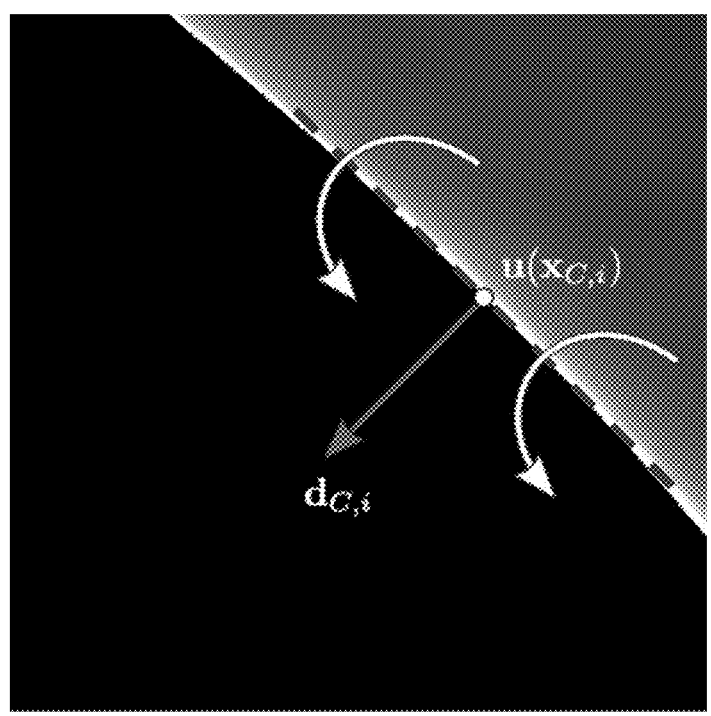

FIG. 24 shows the caustic is located on the desired side of the edge, i.e. the side $d_{C,i}$ points to.

Section 4.1.3 Fold Orientation

While the previous condition makes sure that the edge is orthogonal to $d_{C,i}$ it does not distinguish whether the fold is oriented as intended, i.e. which side of the edge will be illuminated. To account for this, we want the critical point in the projection of $l(\alpha)$ onto $d_{C,i}$ to be a local minimum. We therefore want its second derivative to be positive. As we can only enforce nonnegativity, this does not effectively prevent the point from becoming a saddle point.

$$\frac{\partial^2}{\partial \alpha^2}(u(x_{C,i}+\alpha t))\cdot d_{C,i} = \left(\frac{\partial^2 u}{\partial x^2}t_x^2 + \frac{\partial^2 u}{\partial x \partial y}t_x t_y + \frac{\partial^2 u}{\partial y^2}t_y^2\right)d_{C,i,x} + \left(\frac{\partial^2 v}{\partial x^2}t_x^2 + \frac{\partial^2 v}{\partial x \partial y}t_x t_y + \frac{\partial^2 v}{\partial y^2}t_y^2\right)d_{C,i,y} \stackrel{!}{\geq} 0 \quad (4.8)$$

Unfortunately, it is not as easy to eliminate t this time, but by plugging in coordinate axes, we obtain two necessary conditions similar to the result from before.

$$f_{3,x} := \frac{\partial^2 u}{\partial x^2}(x_{C,i})\cdot d_{C,i} = \frac{\partial^2 u}{\partial x^2}d_{C,i,x} + \frac{\partial^2 v}{\partial x^2}d_{C,i,y} \stackrel{!}{\geq} 0 \quad (4.9a)$$

$$f_{3,y} := \frac{\partial^2 u}{\partial x^2}(x_{C,i})\cdot d_{C,i} = \frac{\partial^2 u}{\partial x^2}d_{C,i,x} + \frac{\partial^2 v}{\partial y^2}d_{C,i,y} \stackrel{!}{\geq} 0 \quad (4.9b)$$

To penalize only negative values while ensuring continuous derivatives, we use $\min(0, f_{3,x})^2$ and $\min(0, f_{3,y})^2$ in the optimization. The derivatives of $(f_{3,x})^2$ are $$2f_{3,x}k''(x_{C,i}-x_j)k(y_{C,i}-y_j)d_{C,i} \text{ for } u_j, \quad (4.10a)$$

$$2f_{3,x}(\Sigma_j u_j k'''(x_{C,i}-x_j)k(y_{C,i}-y_j))\cdot d_{C,i} \text{ for } x_{C,i}, \quad (4.10b)$$

$$2f_{3,x}(\Sigma_j u_j k''(x_{C,i}-x_j)k'(y_{C,i}-y_j))\cdot d_{C,i} \text{ for } y_{C,i}. \quad (4.10c)$$

The gradient of $(f_{3,y})^2$ can again be derived analogously.

Figure 25:
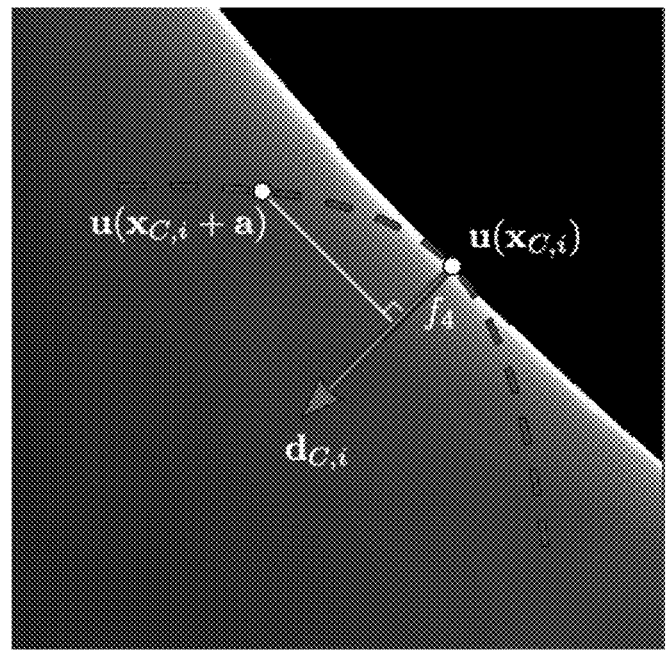
FIG. 25 shows an alternative way to make sure that the fold is located on the desired side of the edge; it uses an offset from $x_{C,i}$ instead of second derivatives.

FIG. 25 shows an alternative way to make sure that the fold is located on the desired side of the edge; it uses an offset from $x_{C,i}$ instead of second derivatives.

Section 4.1.4 Derivative-Free Fold Orientation

Unfortunately, the idea from Section 4.1.3 did not perform too well, as will be seen in Section 4.2. This may be due to the third derivatives in equation 4.10. Thus, a derivative-free approach was devised as an alternative. The goal is to evaluate u at a small distance from $x_{C,i}$ and to make sure the resulting point lands on the correct side of the desired edge.

$$f_{4,a} := (u(x_{C,i}+a) - u(x_{C,i}))\cdot d_{C,i} \stackrel{!}{\geq} 0 \quad (4.11)$$

For a, we use the vectors ( ) and ( ). Like previously, if $f_4$, a is negative, we use its square as a penalty: $\min(0, f_{4,a})^2$. The derivatives of $(f_{4,a})^2$ are $$2f_{4,a}(k(x_{C,i}+a_x-x_j)k(y_{C,i}+a_y-y_j)-k(x_{C,i}-x_j)k(y_{C,i}-y_j)) d_{C,i} \text{ for } u_j, \quad (4.12a)$$

$$2f_{4,a}\left(\sum_j u_j(k'(x_{C,i}+a_x-x_j)k(y_{C,i}+a_y-y_j) - k'(x_{C,i}-x_j)k(y_{C,i}-y_j))\right)\cdot d_{C,i} \text{ for } x_{C,i}, \quad (4.12b)$$

$$2f_{4,a}\left(\sum_j u_j(k(x_{C,i}+a_x-x_j)k'(y_{C,i}+a_y-y_j) - k(x_{C,i}-x_j)k'(y_{C,i}-y_j))\right)\cdot d_{C,i} \text{ for } y_{C,i}. \quad (4.12c)$$

Note that the term "derivative-free" refers to the goal described by equation (4.11) and not the optimization method, which may of course be gradient-based.

Section 4.1.5 Enforcing Folds

As an extension to the previous section, we want to really push some of the $u(x_{C,i}+a)$ away from the edge, not just to the correct side. But we can not just force the equation (4.11) to be positive, since not all a have to result in u that are at a distance from the edge. We therefore group the four a into two pairs of orthogonal vectors.

$$f_5 = \sum_{a \in \{a_1, a_2\}} \rho((u(x_{C,i}+a) - u(x_{C,i}))\cdot d_{C,i}) = \sum_a \rho(f_{4,a}) \stackrel{!}{\geq} c > 0 \quad (4.13)$$

$$\rho(x) := \text{sign}(x)\cdot x2 \quad (4.14)$$

Figure 26:
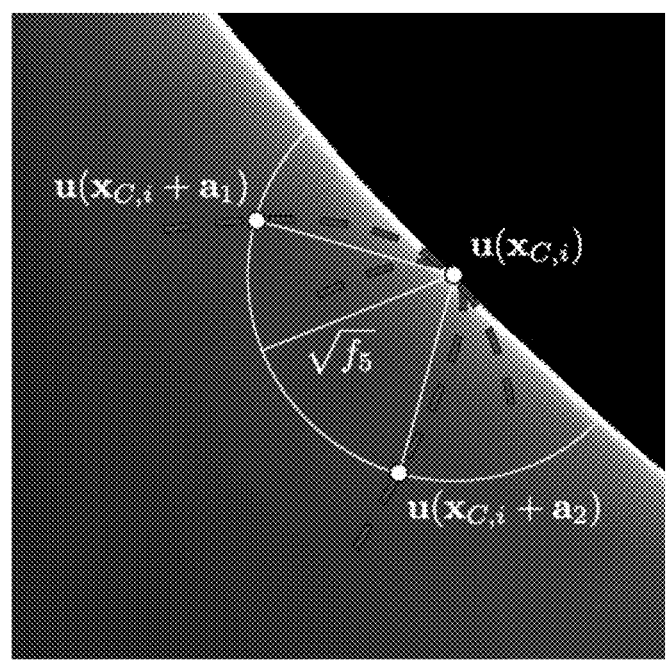
FIG. 26 illustrates that by combining two offsets from $x_{C,i}$, we can define a quantity that is strictly positive for a properly oriented fold.

FIG. 26 illustrates that by combining two offsets from $x_{C,i}$ we can define a quantity that is strictly positive for a properly oriented fold.

Assume that the corresponding directions $u(x_{C,i}+a) - u(x_{C,i})$ are also orthogonal and have the same length. This will usually not be true, but provides the basic intuition for this objective. If both scalar products with $d_{C,i}$ are nonnegative (which is asserted by the terms from the previous section), the resulting value $f_5$ is the squared length of these directions, independently of their exact orientation. If one of the scalar products becomes negative, ρ will make $f_5$ decrease and become the negative squared length if both of them are negative.

By demanding that $f_5$ is larger than a positive threshold c, we can make sure that the fold does really extend to the desired side. As we have done previously, we penalize a negative $f_5-c$ by using its square in the optimization, which ensures continuous derivatives: $\min(0, f_5-c)^2$.

The derivatives of $(f_5-c)^2$ are $$2(f_5-c)\sum_a 2|f_{4,a}| \quad (4.15)$$

$$(k(x_{C,i}+a_x-x_j)k(y_{C,i}+a_y-y_j) - k(x_{C,i}-x_j)k(y_{C,i}-y_j))$$

$$d_{C,i} \text{ for } u_j,$$

$$2(f_5-c)\sum_a 2|f_{4,a}|\left(\sum_j u_j(k'(x_{C,i}+a_x-x_j)k(y_{C,i}+a_y-y_j) - \right. \quad (4.15b)$$

$$\left. k'(x_{C,i}-x_j)k(y_{C,i}-y_j))\right) \cdot d_{C,i} \text{ for } x_{C,i},$$

$$2(f_5-c)\sum_a 2|f_{4,a}| \quad (4.15c)$$

$$\left(\sum_j u_j(k(x_{C,i}+a_x-x_j)k'(y_{C,i}+a_y-y_j) - k(x_{C,i}-x_j)\right.$$

$$\left. k'(y_{C,i}-y_j))\right) \cdot d_{C,i} \text{ for } y_{C,i},$$

Section 4.1.6 Range Restriction

We also want to make sure the $x_{C,i}$ are inside the range defining the specular grid, maybe even with a certain margin.

$$x_{C,i} \geq xl \Rightarrow \min(0, x_{C,i}-xl)2 \quad (4.16a)$$

$$x_{C,i} \leq xh \Rightarrow \min(0, xh-x_{C,i})2 \quad (4.16b)$$

$$x_{C,i} \geq yl \Rightarrow \min(0, y_{C,i}-yl)2 \quad (4.16c)$$

$$y_{C,i} \leq yh \Rightarrow \min(0, yh-y_{C,i})2 \quad (4.16d)$$

Section 4.1.7 Integrability

Besides these fold-generating considerations, we will again want to make sure the normal field we generate can be integrated to a height field. The derivation is roughly the same as for the brightness warping optimization in Section 3.2.

In equation (3.10) we have defined the integral of the vector field along the edges of a quadrilateral ABCD, and we will use the same formula here. Note that:

the meaning of u and x has swapped in comparison to Section 3: x are now positions of mesh nodes on the specular plane, and u are positions on the receiver, which causes the slight difference between equation (4.17) and (3.10); however, the unknowns are still the u;

in contrast to the previous sections, we assume here that the u are three-dimensional vectors with respect to the global coordinate system and not two-dimensional vectors with respect to the parameterization of the receiver (this will obviously require corresponding coordinate transformations);

as we have done with u in Section 3.2, the x are understood as three-dimensional vectors with a z component of 0 here, i.e. the specular surface is assumed to lie in the xy plane (without loss of generality).

Equation (3.10) therefore turns into $$f_{ABCD}(u) = \frac{1}{2}\left(\left(\frac{n_B}{n_{Bz}} - \frac{n_D}{n_{Dz}}\right) \cdot (x_C-x_A) - \left(\frac{n_C}{n_{Cz}} - \frac{n_A}{n_{Az}}\right) \cdot (x_B-x_D)\right). \quad (4.17)$$

Squaring and summing this quantity for all quadrilaterals, we obtain the objective function for the integrability part. As discussed in Section 3.3, this is independent of the mesh resolution, so no correction factor is required. Again, we exemplarily derive this term for uAx, so the least squares problem can be solved using steepest descent or the conjugate gradient method.

$$\frac{d}{du_{Ax}}(f_{ABCD}(u)^2) = f_{ABCD}(u)\left(\frac{d}{du_{Ax}}\left(\frac{n_A}{n_{Az}} \cdot (x_B-x_D)\right)\right) \quad (4.18)$$

Recalling the definitions $n_A=\|o_A\|i+\eta o_A$ and $o_A=u_A-x_A$, we obtain:

$$\frac{d}{du_{Ax}}\left(\frac{n_A}{n_{Az}} \cdot (x_B-x_D)\right) = \frac{1}{n_{Az}}\left(\frac{dn_A}{du_{Ax}} \cdot (x_B-x_D)\right) - \quad (4.19)$$

$$\frac{1}{n_{Az}^2}(n_A \cdot (x_B-x_D))\frac{dn_{Az}}{du_{Ax}}$$

$$= \frac{1}{n_{Az}}\left(\frac{d\|o_A\|}{du_{Ax}}(i \cdot (x_B-x_D)) + \eta(x_{Bx}-x_{Dx})\right) -$$

$$\frac{1}{n_{Az}^2}\frac{d\|o_A\|}{du_{Ax}}i_z(n_A \cdot (x_B-x_D))$$

$$= \frac{1}{n_{Az}}\left(\frac{d\|o_A\|}{du_{Ax}}\left(\left(i - i_z\frac{n_A}{n_{Az}}\right) \cdot (x_B-x_D)\right) + \right.$$

$$\eta(x_{Bx}-x_{Dx})).$$

with $$\frac{d\|o_A\|}{du_A} = \frac{1}{2\|o_A\|} \cdot 2(u_A-x_A) = \frac{o_A}{\|o_A\|}. \quad (4.20)$$

The derivative for $u_{Ay}$ works analogously, but care must be taken for $u_{Az}$. The $\eta(xBx-xDx)$ term seen in (4.19) vanishes since the z component of the x vectors is 0, on the other $$\frac{dn_{Az}}{du_{Az}}$$

hand, receives an additional +η for the second summand in the definition $n_A=\|o_A\|i+\eta o_A$.

$$\frac{d}{du_{Az}}\left(\frac{n_A}{n_{Az}}\cdot(x_B-x_D)\right) = \frac{1}{n_{Az}}\left(\frac{dn_A}{du_{Az}}\cdot(x_B-x_D)\right) - \quad (4.21)$$

$$\frac{1}{n_{Az}^2}(n_A\cdot(x_B-x_D))\frac{dn_{Az}}{du_{Az}}$$

$$= \frac{1}{n_{Az}}\frac{d\|o_A\|}{du_{Az}}(i\cdot(x_B-x_D)) -$$

$$\frac{1}{n_{Az}^2}\left(\frac{d\|o_A\|}{du_{Az}}i_z+\eta\right)(n_A\cdot(x_B-x_D))$$

$$= \frac{1}{n_{Az}}\left(\frac{d\|o_A\|}{du_{Az}}\left(\left(i-i_z\frac{n_A}{n_{Az}}\right)\cdot(x_B-x_D)\right) - \right.$$

$$\eta\left(\frac{n_A}{n_{Az}}\cdot(x_B-x_D)\right)$$

Section 4.1.8 Smoothness

Finally, most unknowns u will probably not be involved in a desired fold and therefore have no constraints except for the integrability. To have some control over them, we include a smoothness term in our optimization, $$\frac{1}{h^2}(4u_{i,j}-u_{i-1,j}-u_{i+1,j}-u_{i,j-1}-u_{i,j+1}) \stackrel{!}{=} 0, \quad (4.22)$$

where h is the grid spacing. We square this expression and sum it over all internal grid nodes $u_{i,j}$. Again, we want to be careful to use quantities that do not change when the grid resolution changes. Equation (4.22) is a discrete Laplacian and therefore resolution-independent per node. Consequently, a factor $h^2$ is required to make the sum of squares resolution-independent instead, which translates to a factor h for the expression in equation (4.22).

$$f_s := \frac{1}{h}(4u_{i,j}-u_{i-1,j}-u_{i+1,j}-u_{i,j-1}-u_{i,j+1}) \stackrel{!}{=} 0 \quad (4.23)$$

The derivatives of $(f_s)^2$ are $$\frac{8f_s}{h} \text{ for } u_{i,j}, \quad (4.24a)$$

$$-\frac{2f_s}{h} \text{ for } u_{i\pm1,j}, u_{i,j\pm1}. \quad (4.24b)$$

To ensure the smoothness of $u_{i,j}$ that lie on the boundary, similar conditions can be formulated using one-dimensional finite differences for second derivatives.

Section 4.1.9 Further Considerations

In a nutshell, the objectives defined in Sections 4.1.1 through 4.1.8 describe a system of nonlinear equations that will hopefully produce a caustic that
  exhibits patterns at the desired locations (Section 4.1.1) which
  are bright along the desired direction (Section 4.1.2),
  extend to the desired side (Sections 4.1.3 through 4.1.5);
  results in a normal field that can faithfully be reproduced using a height field (Section 4.1.7),
  is smooth (Section 4.1.8).

It should be noted that there are no penalties for folds that occur elsewhere, except for the fact that these regions are likely to have a higher Laplacian than others, which is penalized by the smoothness objective. Furthermore, there are no conditions regarding the local brightness that would be defined by a template image. This conclusion should not be an issue, since brightness warping can be used to adjust the brightness distribution—it can work with a deformed caustic mesh, it just needs to account for the varying quadrilateral areas when computing the desired brightnesses. The lack of control over undesired fold positions, however, may be more problematic.

Interpolation Kernel

The interpolation kernel used in equation (4.1) has not been specified yet. Since the conjugate gradient solver requires continuous derivatives, equation (4.10b) from Section 4.1.3 necessitates a kernel that is three times continuously differentiable. One such kernel is $M'_6$ [CP04], displayed in FIG. 28. $M'_6$ has a compact support and fourth order accuracy, i.e it will correctly interpolate cubic polynomials.

$$M'_6(x) = \quad (4.25)$$

$$\begin{cases} -\frac{1}{3}|x|^5+\frac{7}{8}|x|^4-\frac{5}{4}|x|^2+\frac{33}{40} & \text{if } |x|<1 \\ \frac{1}{6}|x|^5-\frac{21}{16}|x|^4+\frac{15}{4}|x|^3-\frac{35}{8}|x|^2+\frac{5}{4}|x|+\frac{51}{80} & \text{if } 1\le|x|<2 \\ -\frac{1}{240}(8|x|-9)(|x|-3)^4 & \text{if } 2\le|x|<3 \\ 0 & \text{if } 3\le|x| \end{cases}$$

Initialization

To initialize the algorithm, a smooth noise pattern is used as starting caustic. This introduces complexity to the results, and gives a way to generate different patterns for the same input by varying a random seed.

In the implementation, a height field is generated using smooth Perlin noise, and the $u_j$ are obtained from the resulting caustic. This has the advantage that the corresponding normal field is initially integrable, which is not granted when the deformation of the photon mesh is generated directly from Perlin noise.

Figure 27:
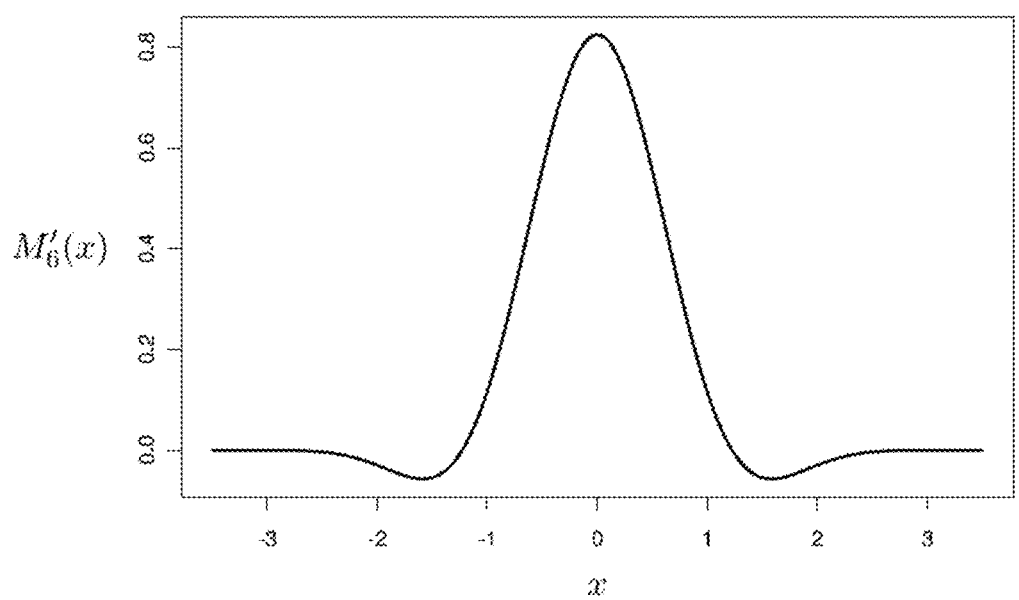
FIG. 27 shows a plot of the $M'_6$ kernel.

FIG. 27 shows a plot of the $M'_6$ kernel.

The $x_{C,i}$ are initially placed randomly in their allowed range. However, this will affect the results since $x_{C,i}$ for neighboring $u_{C,i}$ may start out at very different locations, so each will create its own little fold. FIGS. 28A-28D illustrates this effect. To create larger, connected folds, it is advisable to run a preparation phase that optimizes only the $x_{C,i}$ using the objective from Section 4.1.1 and leaves the $u_{C,i}$ constant. Intuitively speaking, it would be ideal if during this preparation, the $x_{C,i}$ for neighboring $u_{C,i}$ would get stuck together in a fold that exists in the initial caustic. They would then pull the fold into the desired shape during the main optimization.

Figure 28A:
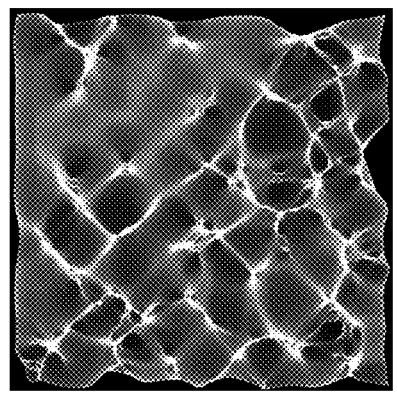
FIGS. 28A-28D show the effect of the preparation phase, where all experiments started from a flat height field.
Figure 28B:
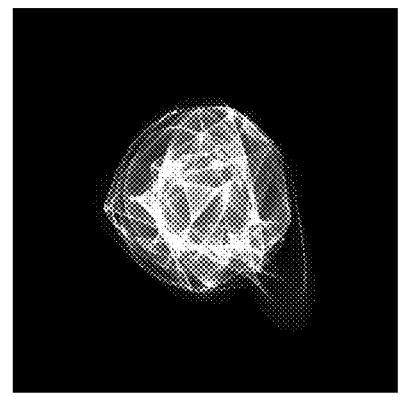
Figure 28C:
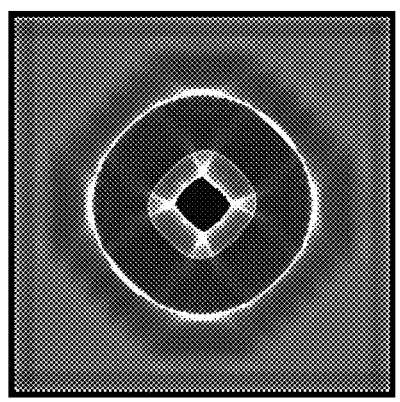
Figure 28D:
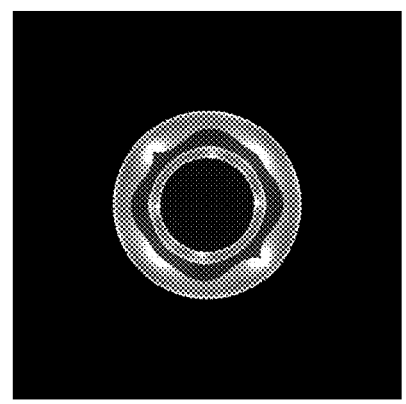

FIGS. 28A-28D show the effect of the preparation phase, where all experiments started from a flat height field; FIG. 28A and FIG. 28B without the preparation, FIG. 28C and FIG. 28D with it. The main optimization was limited to only two nonlinear conjugate gradient iterations per multigrid level to produce FIG. 28A and FIG. 28C.

Section 4.2 Fold Orientation Efficiency

Experiments showed that the objective from Section 4.1.3 (fold orientation) does not effect the desired results. This is why the derivative-free alternative described in Section 4.1.4 was devised, on which Section 4.1.5 is based in turn.

FIG. 29A-29D serve to compare the effects of the two ideas. It shows the results when the optimization is run on an input describing two concentric circles, each consisting of 50 points. The directions $d_{C,i}$ point inward on the larger circle, and outward on the smaller one, i.e. the desired caustic is supposed to fill the area between the two.

FIGS. 29A and 29C show the results using only the approach from Section 4.1.3, while FIGS. 29B and 29D were generated using only the derivative-free alternative from Section 4.1.4. The term from Section 4.1.5 was excluded from all these examples since it also significantly affects the orientation of the folds (see also FIG. 28D, which was generated using the terms from Sections 4.1.4 and 4.1.5).

FIGS. 29A-29D shows optimization output for an input specifying two concentric circles, initialized using a planar height field (FIG. 29A, FIG. 29B) and a Perlin noise height field (FIG. 29C, FIG. 29D). See Section 4.3 for an explanation.

It can be seen that while both approaches reproduce the circles, the first one hardly manages to affect the nodes at the border of the caustic, at least within the allotted number of 50000 conjugate gradient iterations. The derivative-free approach does not only perform better; the conjugate gradient method also terminates after a few thousand iterations due to a small gradient norm.

Section 4.3 Results

FIGS. 34A through 37C show the results of the algorithm applied to a variety of template images. The input for the algorithm was generated using the Canny edge detection algorithm [Can86]. All computations were done on an 81×81 field, which is significantly lower than the resolutions supported by the brightness warping method. This is due to the higher number of iterations required for good results, see also table 4.1. The lower resolution is sufficient though as there are no such fine details as in Section 3.

It can be seen that the approach mostly does a good job at reproducing the contours, and that they are indeed folds in most cases. The desired visual complexity of typical caustics is also achieved, particularly in the images where the height field was initialized using Perlin noise.

FIGS. 30A-30C Optimization result for the radioactivity symbol, initialized using an 81×81 height field with Perlin noise. As in Section 3, the distortion introduced by the normal field to height field optimization and by using an actual height field for rendering is barely visible to the naked eye. The origins of FIG. 30A is Radiation warning symbol, public domain; http://en.wikipedia.org/wiki/File:Radiation_warning_symbol.svg, retrieved on 24th Mar., 2011.

FIGS. 31A-31D show an optimization result for two different smilie images, initialized using a planar field. Both output images were generated using LuxRender. The narrow, brighter lines at the edges of the caustic mesh are an artifact from the normals to height field conversion. It also occurred to some degree in the previous Section, but is more prominent here due to the considerably lower field resolution.

However, as expected, the method does not prevent folds from occurring elsewhere. This effect is considerably more distracting in areas where there should be no or little light, and mostly affects concave silhouettes. Due to this, there were also experiments carried out using an additional penalty to photons lying in manually specified circular areas. FIG. 33 was created using this method. It appears to work reasonably well, but more involved methods (for example, using a signed distance function) would be required to make this approach viable and automatable for arbitrary inputs. Instead, a user-guided input mechanism was implemented as described in Section 5. Another limitation is the inability to produce separated areas, which would be particularly useful in FIG. 32D.

Figure 32A:
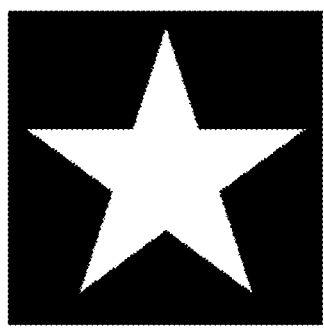
FIGS. 32A-32C show an optimization result for a pentagram, initialized using a planar field for FIG. 32B and a height field with Perlin noise for FIG. 32C, where
Figure 32B:
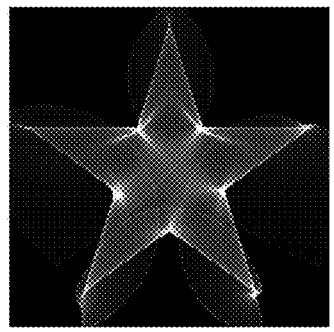
Figure 32C:
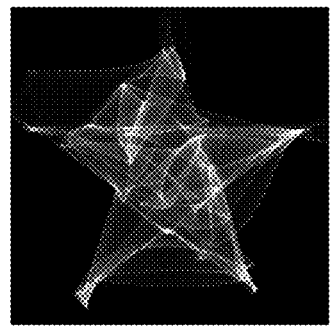

FIGS. 32A-32C show an optimization result for a pentagram, initialized using a planar field for FIG. 32B and a height field with Perlin noise for FIG. 32C.

FIG. 33 shows an optimization result for the pentagram, initialized using a height field with Perlin noise. An additional term was used in the optimization, which penalizes photons in circular areas positioned in the pentagram's concave regions.

FIGS. 34A-34C show an optimization result for a cat silhouette (template image by Christopher Martin), initialized using a planar field for FIG. 34B and a height field with Perlin noise for FIG. 34C. The origins of FIG. 34A is Cat silhouette, Christopher Martin, public domain; http://en.wikipedia.org/wiki/File:Cat_silhouette.svg, retrieved on 28th Apr., 2011.

TABLE 4.1

Timings for the various fold generation examples, in seconds. In all examples, an 81 × 81 field resolution was used.

| Template | FIG. | Initial field | # Iterations | t |
|---|---|---|---|---|
| Radioactivity | 30A-30C | Perlin | 20000 | 1214 |
| Smilie | 31B | flat | 20000 | 1140 |
| Smilie | 31D | flat | 20000 | 783 |
| Pentagram | 32B | flat | 20000 | 371 |
| Pentagram | 32C | Perlin | 50000 | 1431 |
| Cat | 34B | flat | 20000 | 691 |
| Cat | 34C | Perlin | 20000 | 655 |

Section 5 Editing Folds

The fold generation approach described in the previous Section does a decent job at reproducing the desired edges. However, as a side effect it tends to generate various folds that distractingly deviate from the desired pattern. In order to correct these, the fold contours are detected and displayed to the user, who can adjust their positions. The modified positions are then turned into control points for the fold generator, which is re-run to adjust the caustic accordingly.

The method to detect folds essentially consists of two steps: We must first find points that lie on fold contours. In a second step, the determined points must be clustered to form the corresponding folds. These two steps are described in the Sections 5.1 and 5.2, respectively. The same terminology as in Section 4 is used in these sections. Finally, Section 5.3 shows some examples of caustics that were generated with this approach.

Section 5.1 Detecting Critical Points

From Section 4.1.2, we recall the conditions that a fold point must satisfy:

$$\frac{\partial u}{\partial x}(x_C) \cdot d_C \stackrel{!}{=} 0 \qquad (5.1a)$$

$$\frac{\partial u}{\partial y}(x_C) \cdot d_C \stackrel{!}{=} 0, \qquad (5.1b)$$

where $u(x_C)$ describes the coordinates of the photon (in the two-dimensional coordinate system of the receiver) that is reflected or refracted at the point $x_C$ on the specular surface, and $d_C$ is the orientation of the fold (i.e. orthogonal to the contour). We will call the position $x_C$ a critical point if $u(x_C)$ lies on a fold contour.

Obviously, this can not be used to determine whether a given x is a critical point, as the direction $d_C$ is unknown. However, we can see that $$\frac{\partial u}{\partial x}(x)$$

as well as $$\frac{\partial u}{\partial y}(x)$$

are zero or orthogonal to the vector $d_C$, so the two are linearly dependent. This yields a necessary condition for critical points, $$f(x) := \det\left[\frac{du}{dx}(x) \quad \frac{\partial u}{\partial y}(x)\right] = 0. \quad (5.2)$$

Note that the absolute value of this determinant essentially describes the area of the caustic corresponding to an infinitesimal patch on the specular surface located at x. In order to find critical points, we can now look for points that minimize $f(x)^2$, for example using steepest descent or the conjugate gradient method.

To be used in an optimization method, the gradient of $f(x)^2$ is simply $$\frac{\partial}{\partial x}(f(x)^2) = 2f(x)\left(\det\left[\frac{\partial^2 u}{\partial^2 x} \quad \frac{\partial u}{\partial y}\right] + \det\left[\frac{\partial u}{\partial x} \quad \frac{\partial^2 u}{\partial x \partial y}\right]\right), \quad (5.3a)$$

$$\frac{\partial}{\partial y}(f(x)^2) = 2f(x)\left(\det\left[\frac{\partial^2 u}{\partial x \partial y} \quad \frac{\partial u}{\partial y}\right] + \det\left[\frac{\partial u}{\partial x} \quad \frac{\partial^2 u}{\partial x^2}\right]\right). \quad (5.3b)$$

Figure 35A:
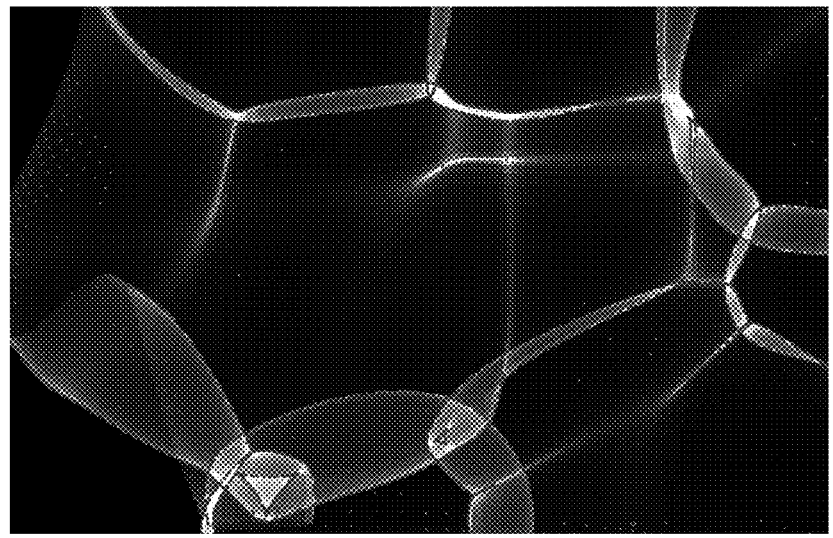
FIGS. 35A-35B show photons corresponding to critical point candidates, before (FIG. 35A) and after (FIG. 35B) applying the threshold obtained from FIG. 36.
Figure 35B:
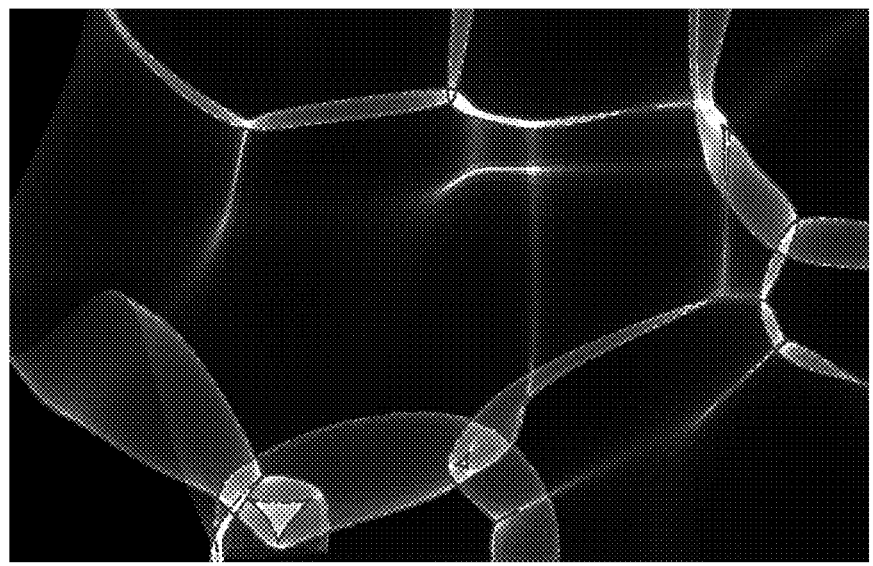

Sampling the height field with a grid of points and minimizing $f(x)^2$ for each of them, we find a set of candidates for critical points. The corresponding photons u(x) are shown in FIGS. 35A-35B. It also shows that there are points at positions where the caustic brightness has a local maximum, corresponding to a local minimum of the aforementioned caustic area. There are even more points where the gradient of f(x)2 appears to be low, so the optimization aborts without changing their initial position, as can be seen from the regular patterns of the resulting photons. Fortunately, the boundary between such false positives and actual critical points is extremely clear-cut, see FIG. 36, so it is easy to reject the false positives.

Figure 36:
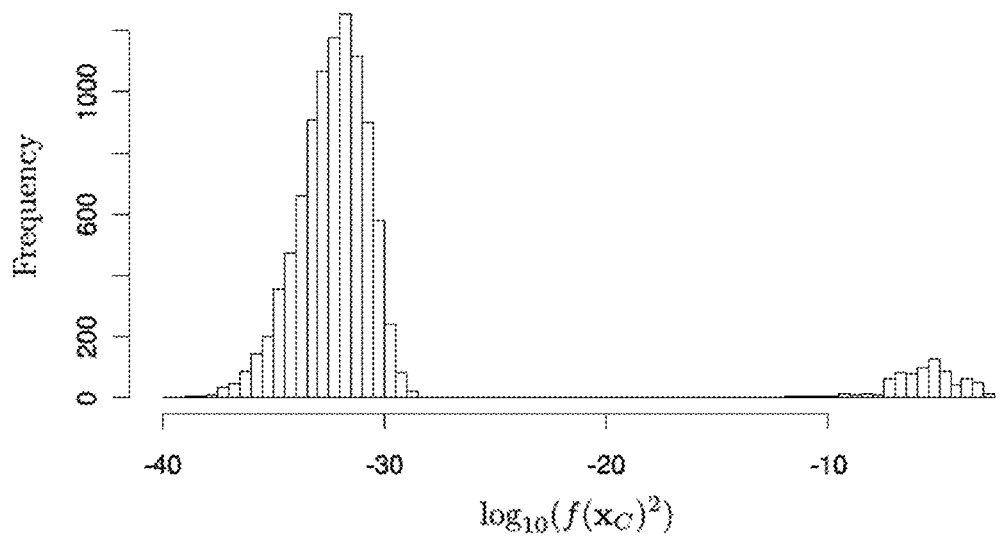
FIG. 36 shows a histogram of the logarithm of the objective function value, evaluated at the critical point candidates, where the large gap distinguishes actual fold points from false positives.

FIGS. 35A-35B shows photons corresponding to critical point candidates, before and after applying the threshold obtained from FIG. 36.

With these tools, we are now able to find critical points $x_C$, and their photon positions $u_C=u(x_C)$.

FIG. 36 shows a histogram of the logarithm of the objective function value, evaluated at the critical point candidates, The large gap distinguishes actual fold points from false positives.

Section 5.2 Tracing Contours

What is still missing are the $d_C$ to be passed to the fold generator. In order to find them, and to provide a useable editing mechanism to the user, we need to connect individual critical points to lines.

The algorithm to connect a given set of critical points, which were determined as just described, operates on the $x_C$ (i.e. on the specular surface) and not on the $u_C$ as this is easier and more reliable. It starts at an arbitrary point that is not yet assigned to a line. We then find its nearest neighbor and create a new line, if the neighbor is closer than a certain threshold. As the lines may intersect (see FIGS. 37A-37B) and we want to avoid taking the wrong direction in such cases, we do not proceed by simply hopping to nearest neighbors. Instead, we take the distance vector between the last two points, and additionally penalize deviations from this direction.

Figure 37A:
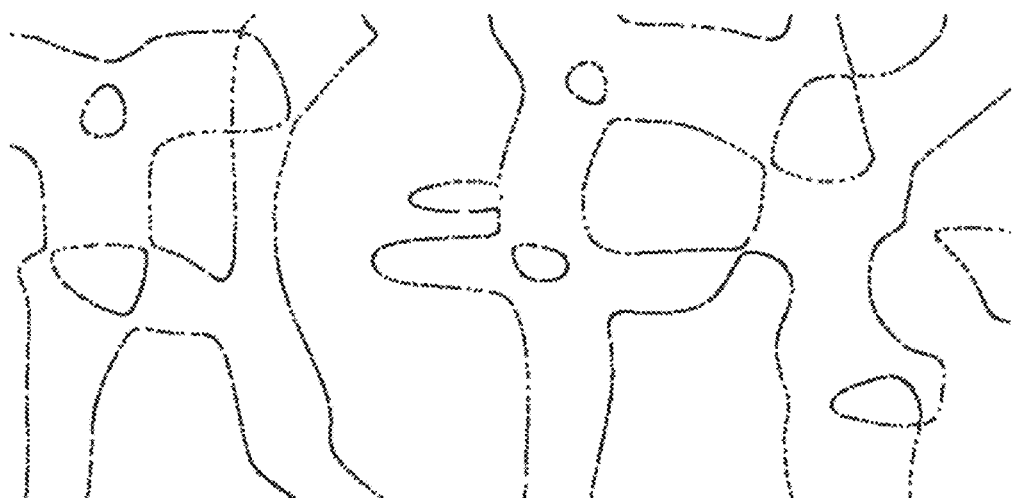

FIGS. 37A-37B show a cutout of the detected $x_C$ displayed FIG. 37B, illustrate the tracing step using a function with an elliptical shape instead of the Euclidean distance allows us to handle intersections more reliably in FIG. 37B.

If no sufficiently close neighbor is found, a new sample is created along the direction and passed through the optimization from Section 5.1, which allows us to close gaps between critical points. If a neighbor is already assigned to a line or the height field's border is reached, the process stops, returns to the starting point, and traces in the other direction.

We can now compute the orientation of the corresponding folds, i.e. which side of the contour is illuminated. This defines the unknown vectors $d_{C,i}$ which we will later use for the fold generator. Determining the direction $\pm d_{C,i}$ for a given point in a line can be done by simply connecting the position of the previous photon to the position of the next one and finding the orthogonal vector:

$$d_{C,i} \perp u(x_{C,i}+1) - u(x_{C,i}-1). \quad (5.4)$$

To determine the correct sign, one can employ the condition from Section 4.1.4: Evaluate u(x) at a number of positions (eight appears to be a reasonable choice) surrounding $x_{C,i}$, i.e. compute $u(x_{C,i}+a_j)$, and see whether the majority lies on the left or the right of the contour. The definitive orientation of a whole line is then determined by the majority over all its points.

In essence, we now have lines consisting of $x_{C,i}$, the corresponding photon positions $u_{C,i}$, and the corresponding fold orientation (left/right). With this, we can build a user interface to adjust the desired positions of the photons forming a fold, see FIGS. 38A-38C. The edited segments can then be passed to the fold generator, consisting of the unchanged $x_{C,i}$ found by the critical point search, the modified photon positions $u_{C,i}$ obtained from the user's edits, and the $d_{C,i}$ obtained from the $u_{C,i}$ using the orientation determined earlier.

FIGS. 38A-38C illustrate interactive editing steps, where The fold generator result is shown with the detected folds in FIG. 38A, the points that were used as the fold generator's input are shown in dark blue, folds from undesired regions are moved by shifting the corresponding photons, where their new positions are shown in red in FIG. 38B, and the fold generator is then re-run with these points added to its constraints, resulting in FIG. 38C.

Section 5.3 Results

FIGS. 39A-39B, 7A-7B and 7C-7D illustrate some results that were produced interactively. They are all based on results from the fold generator and were edited to move distracting folds away from dark regions.

It can be seen that the approach does indeed allow editing of the caustics so folds can be controlled. However, it turns out that some folds may prove to be stubborn, so the editing and re-running of the fold generator usually needs to be repeated several times. This is particularly cumbersome since the re-runs between manual editing steps take a while. For 1000 iterations on an 81×81 field, the run time is roughly a minute (depending on the number of designated fold points), and increases linearly with the number of unknowns when a higher field resolution is used. It is possible though to start at a lower resolution, and to increase it for more detailed modifications later on. FIGS. 7C-7D was generated using a resolution of 321×321 in the last steps.

Further considerations about the fold generation approach and the extensions described in this section are provided in Section 7.3.

FIGS. 39A-39B shows an interactive result for the radioactivity symbol, see also FIGS. 30A-30C.

FIGS. 7A-7B show an interactive result for the cat silhouette, see also FIGS. 34A-34C.

FIGS. 7C-7D shows an interactive result for the radioactivity symbol, see also FIGS. 30A-30C.

Section 6 Discussion

Section 2 stated the simplifications that were used for the derivations of the brightness warping approach in Section 3, and the fold generator and its extension in Sections 4 and 5. The assumption of parallel light and the assumption of perfectly specular surfaces are lifted in the implementation, which will be described in Section 6.1. Section 6.2 then discusses general issues arising with the proposed methods.

Section 6.1 Removing Simplifications

As described in Section 2, the approaches seen so far were devised under several more or less restrictive assumptions. This section explains the methods that were implemented to lift some of these restrictions. Further unimplemented ideas how some restrictions can be lifted can be found in Section 7.

Section 6.1.1 Point Light Sources

As an alternative to the assumption of parallel light, point lights were also implemented. One of the issues that arise is the integrability condition of the brightness warping method in Section 3.2, which needs to be extended to support varying incidence directions. It is convenient to extend the definition of the normal at node A seen there to $n_A = \|o_A\|i_A + \eta\|i_A\|o_A$. The incident and outgoing ray directions iA and oA obviously do not need to be normalized for this.

The derivative of $n_A$ is also required:

$$\frac{dn_A}{du_{Ax}} = \frac{d\|o_A\|}{du_{Ax}}i_A + \|o_A\|\frac{di_A}{du_{Ax}} + \eta\frac{d\|i_A\|}{du_{Ax}}o_A + \eta\|i_A\|\frac{do_A}{du_{Ax}}. \tag{6.1}$$

With $o_A = x_A - u_A$, $u_A$ being the position on the specular surface and $x_A$ the corresponding vertex coordinate in the caustic mesh, the individual terms can be rewritten:

$$\frac{d\|o_A\|}{du_{Ax}} = -\frac{o_{Ax}}{\|o_A\|}. \tag{6.2}$$

$$\frac{d\|i_A\|}{du_{Ax}} = \frac{1}{\|i_A\|}i_A \cdot \frac{di_A}{du_{Ax}}, \tag{6.3}$$

$$\frac{do_A}{du_{Ax}} = (-1, 0, 0)^T. \tag{6.4}$$

This can now be plugged into equation (3.11):

$$\frac{d}{du_{Ax}}(g_{ABCD}(u)^2) = g_{ABCD}(u)\left(-\left(\frac{n_{Bx}}{n_{Bz}} - \frac{n_{Dx}}{n_{Dz}}\right) + \frac{d}{du_{Ax}}\left(\frac{n_A}{n_{Az}} \cdot (u_B - u_D)\right)\right) \tag{6.5}$$

$$= g_{ABCD}(u)\left(-\left(\frac{n_{Bx}}{n_{Bz}} - \frac{n_{Dx}}{n_{Dz}}\right) + \frac{1}{n_{Az}}\left(\frac{dn_A}{du_{Az}} - \frac{dn_{Az}}{du_{Ax}}\frac{n_A}{n_{Az}}\right) \cdot (u_B - u_D)\right)$$

For the integrability considerations for the fold generator (Section 4), few modifications are required to support varying incidence directions. The positions on the specular surface are fixed in that approach, therefore the constant direction i in Section 4.1.7 simply needs to be replaced by the vector $$\frac{i_A}{\|i_A\|}.$$

The incident light direction and its derivatives are still missing here. For a reflective setup with a point light source at position L, they are simple:

$$i_A = L - u_A \tag{6.6}$$

$$\frac{di_A}{du_{Ax}} = (-1, 0, 0)^T. \tag{6.7}$$

For refractive setups, we have to consider two surfaces, with the approaches from the previous Sections operating on the one where the light exits the medium. The problem of finding the incident light direction at that position translates to finding the refracting point on the surface where the light enters the medium. No closed-form solution exists, but as the first surface is assumed to be a plane Π, it is unique and can be found easily using Fermat's principle [WZHB09]. This means that the time the light takes to arrive at uA needs to be minimized:

$$\min_{p_A \in \Pi} \|p_A - L\| + \eta\|p_A - u_A\|, \tag{6.8}$$

where pA is the position where the light enters the medium, and L is the position of the light source. The optimization can be done using Newton's method.

The incident ray directions can now be computed as $p_A - u_A$. In the integrability computations of Section 3.2, they need to be evaluated and differentiated often at arbitrary positions on the specular surface. Thus, precomputing them on a regular grid and using a kernel such as M'4[CP04] to interpolate the directions and their derivatives saves time. This can also be extended easily to handle other variants of incident light, as long as no point on the specular surface is illuminated from multiple angles, and the ray directions form a smooth function.

A further implication of using a point light source is varying irradiance, the incident power per unit area. The irradiance on a sphere around a point light source is inversely proportional to the squared radius, since the illuminated area changes. For an arbitrary surface, the irradiance furthermore needs to be multiplied by the cosine of the angle of incidence, as per Lambert's cosine law. Using the conservation of radiant flux, as discussed in Section 2.1, it is now possible to compute the brightness of caustics accordingly.

This affects the considerations in Section 3.1, where the desired area of a face on the specular surface is determined. Unfortunately, now the irradiance does not only vary between the faces (which is simple to handle), but also depends on their location. This complicates the derivations seen in that section.

Instead of handling this irradiance issue in an analytically correct fashion, the implementation was simply adjusted to use per-face irradiances, which are assumed to remain constant as the face moves. For practical purposes with sufficient distance of the reflector or refractor to the light source, this works well as the varying irradiance is barely noticeable anyway. In more extreme cases, the algorithm can be re-run to account for the brightness changes, see FIGS. 40A-40E.

FIGS. 40A-40E show an initial brightness distribution and results after applying and re-applying brightness warping to the Mona Lisa template, where the light source is located 4 cm away from the first refractive plane, and a A 10×10 cm field, 1 cm away from the first plane, is used to generate the caustic.

Section 6.1.2 Imperfect Specularity

Physical manufacturing of the computed surfaces will typically involve some polishing step to improve the specularity. Achieving perfect specularity however, as assumed by the approaches devised earlier, is unrealistic. The obtained surfaces will not be perfectly smooth, resulting in some scattering, which we would like to account for. Instead of working with a full-blown bidirectional scattering distribution function (BSDF), we resort to yet another simplification: we assume that we are given the point spread function (PSF) resulting on the receiver. This can be imagined as pointing a laser at the surface and looking at the speck of light it produces. We furthermore assume that its shape does not depend on the position where the laser hits the surface. In terms of a BSDF, this would mean a spatially homogeneous, isotropic distribution. Fresnel effects, i.e. varying reflectivity depending on the incidence angle on a surface, are neglected. Distortions of the PSF due to varying incidence angles on the receiver and due to varying distances between the positions on reflector/refractor and receiver are also disregarded.

Under these assumptions, the caustic resulting from a surface is simply the convolution of the point spread function with the corresponding caustic as it would look assuming perfect specularity. For the brightness warping approach, the problem of handling imperfect surfaces therefore turns into a deconvolution problem, which can be solved using the Richardson-Lucy algorithm [Ric72]. The algorithm cannot produce negative values, but it can introduce ringing artifacts. The implementation we use extends the original image at the borders, so the deconvolution will be as large as the user-specified input and no cropping occurs. Furthermore, the values at the border are bevelled to prevent artifacts, as suggested by Richardson. More precisely, the convolution of an image with a PSF that is not a Dirac delta function will exhibit some slope at the border, as seen for example in FIG. 41C. The Richardson-Lucy deconvolution will in turn cause artifacts if the input has non-black borders that are not bevelled accordingly. To alleviate this, we use a white image, convolve it with the PSF, multiply the result with the input image that was extended at the borders, and finally pass the image obtained in this way to the Richardson-Lucy algorithm.

Since no experiments with physical objects were carried out to evaluate this method, a simulation was performed using LuxRender's rough glass material, see FIGS. 41A-41C and 42A-42C. To determine the point spread function of this surface, a screen with a small hole in it was used to reduce the light to a narrow beam before it passes through the glass. The resulting image of the PSF was then cropped, scaled, and used for the deconvolution of the target image. The size of one pixel of the PSF must match the size of one pixel of the original image as it is projected onto the receiver. For example, the configuration used for FIGS. 42B and 42C, the setup using a planar surface results in a caustic that is 911 pixels wide. The same configuration was used to render the PSF. Since the Lena image is 512 pixels wide, the image of the PSF produced by LuxRender was scaled by a factor of 512/911.

Figure 41A:
FIGS. 41A-41C show deconvolution results for Lena, where
Figure 41B:
Figure 41C:

FIGS. 41A-41C show deconvolution results for Lena. The inset in FIG. 41B displays the point spread function.

Figure 42A:
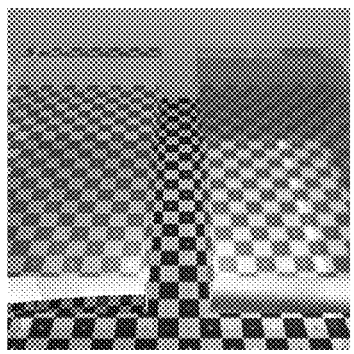
FIGS. 42A-42C show results using LuxRender's rough glass material for Lena, without and with deconvolution, where
Figure 42B:
Figure 42C:

FIGS. 42A-42C show results using LuxRender's rough glass material for Lena, without and with deconvolution, where FIG. 42A shows a rendering of two glass blocks, one perfectly specular, and one whose top face uses the rough glass material, while its other faces are also perfectly specular, and the distance to the checkerboard floor is half the distance between the specular surface and receiver used for FIG. 42B and FIG. 42C.

Similar to imperfect specularity, an area light source also results in a cone of light emanating from a single point on the surface instead of a single ray. Consequently, the resulting blur of a caustic can likewise be treated as a convolution, and the same approach may be used to account for it. This time, the PSF can obviously not be determined using a laser, instead a screen with a small hole can be placed directly at the specular surface. FIGS. 43A-43C show the result of a simulation carried out in this way. Since the PSF is a disk, the original image was blurred to avoid severe ringing artifacts in the deconvolved image. The blurred version was also used for the reference example without deconvolution. In practice, this obviously defeats the purpose of deconvolving, so depending on the input image, it is only of limited use for this kind of PSF. The alternative is to simply accept the resulting ringing in the deconvolved image, though it might lead to considerable problems due to inaccuracies when the surface is manufactured.

FIGS. 43A-43C show LuxRender results for Claude Monet's "Mohnblumen", where the deconvolution was used to abolish the blur introduced by using an area light source, the corresponding point spread function is displayed in the inset in FIG. 43C. Only the red color channel of the original was used so the contrast between the poppies and the grass is more noticeable than in a standard grayscale version. The origins of this image is "Mohnblumen" (1873), Claude Monet, public domain; http://en.wikipedia.org/wiki/File:Claude_Monet_037.jpg, retrieved on 22nd Apr., 2011.

Section 6.2 Review

The discussion of the different approaches can be found in the results sections of the corresponding sections. This section contains more general considerations about the methods.

Section 6.2.1 Near-Planarity

One will notice that the computed height fields tend to be very flat, in particular the ones generated using brightness warping. Directly related to the field's amplitude is the amount of distortion when comparing caustics computed from a normal-mapped plane (on which this patent application is based) and actually displaced surfaces (as used by the LuxRender simulations shown in various figures). Putting the low depth range in relation to the distance to the receiver for reasonable setups, this justifies the simplification of using a normal-mapped plane. A potential alternative to use actual height fields without rendering the described methods inapplicable is described in Section 7.1.

mentioned in Section 3.5, Papas et al. [PJJ+11] compared their approach to the system described by Finckh et al. [FDL10] on the Lena test image, with the intention to mill the respective physical surfaces. However, the surface provided by Finckh et al. had a depth range of a mere 0.07 mm for a 10×10 cm area, therefore Papas et al. aborted the experiment. At the same size, the height field produced by the brightness warping approach (FIGS. 5A-5D) has a depth

TABLE 6.1

Depth ranges of some surfaces generated using brightness warping. The parameter $\eta$ is the index of refraction, where 'R' means that the corresponding example was generated using a reflective surface instead. The area of the field in centimeters is denoted by A, d is the distance to the receiver in centimeters, and $\Delta b$ the value that was used to augment the brightness as described in Section 3.1. The depth range and the standard deviation of the height field are listed in the columns $\Delta z$ and $\sigma z$, respectively, and measured in millimeters.

| Template | FIG. | $\eta$ | A | d | $\Delta b$ | $\Delta z$ | $\sigma z$ |
|---|---|---|---|---|---|---|---|
| Mona Lisa | 15A-15B | 1.5 | 10 × 10 | 25 | 0.25 | 6.63 | 1.96 |
| Mona Lisa | — | 2.0 | 10 × 10 | 25 | 0.25 | 3.33 | 0.98 |
| Mona Lisa | — | 1.5 | 10 × 10 | 50 | 0.25 | 3.33 | 0.99 |
| Mona Lisa | — | 1.5 | 10 × 10 | 25 | 0.1 | 8.87 | 2.58 |
| Mona Lisa | — | R | 10 × 10 | 25 | 0.25 | 1.66 | 0.49 |
| Simple shapes | 17A-17C | 1.5 | 10 × 10 | 25 | 0.25 | 13.93 | 3.91 |
| Panda | 18A-18B | 1.5 | 10 × 10 | 25 | 0.05 | 4.32 | 1.09 |
| "Cherokee Pass" | 20A-20D | 1.5 | 14 × 10 | 25 | 0.05 | 5.26 | 1.64 |
| Lena | 5A-5D | 1.5 | 10 × 10 | 25 | 0 | 3.18 | 0.88 |

As can be seen in table 6.1, several parameters affect the depth range of the surface. The range decreases as the index of refraction or the distance to the receiver increases. The brightness distribution of the desired image also affects the depth range, with more irregular distributions causing higher amplitudes. Furthermore, it can be seen that in general, the surfaces produced by the fold generator have a higher depth range (table 6.2). This is not surprising, as the folds in the caustics require higher normal variations.

TABLE 6.2

Depth ranges of the surfaces produced by the fold generator. All images were generated using a 10 × 10 cm field with a refractive index of 1.5, at a distance of 25 cm from the receiver. The depth range and the standard deviation of the height field are listed in the columns $\Delta z$ and $\sigma z$, respectively, and measured in millimeters.

| Template | FIG. | Initialization | $\Delta z$ | $\sigma z$ |
|---|---|---|---|---|
| Radioactivity | 30A-30C | Perlin | 11.54 | 2.07 |
| Smilie | 31B | flat | 4.74 | 0.68 |
| Smilie | 31D | flat | 10.75 | 1.92 |
| Pentagram | 32B | flat | 12.59 | 1.96 |
| Pentagram | 32C | Perlin | 12.69 | 2.54 |
| Cat | 34B | flat | 9.70 | 2.10 |
| Cat | 34C | Perlin | 27.16 | 4.40 |

As a further consideration, the depth range can also be controlled by scaling a caustic. This will obviously result in a concave or convex surface even if the caustic has a constant brightness. But a larger caustic also implies larger normal variations for the same relative amount of distortion. Indeed, it can be verified that the difference between a field producing an image and a field producing a constant light patch of the same size increases as the caustic is enlarged. On the other hand, increasing the caustic size also leads to a decrease in its brightness, which limits the usefulness of this idea.

Regarding physical manufacturing, the depth range also affects the viability of a surface for milling. As already range of 3.18 mm (incidentally, the lowest in table 6.1 using this setup). It should therefore be feasible for manufacturing.

Section 6.2.2 Suitability of the Approaches

The two main approaches described in this patent application are based on different ideas: The brightness warping method was devised for fold-free caustics to reproduce natural images as accurately as possible. In contrast to the fold generator, it is also applicable to low-frequency images. Additionally, the deconvolution, which can only be applied to brightness warping, works best if the frequencies in the desired image are limited.

Though the brightness warping produces accurate results, the corresponding caustics may not immediately be recognized as such, since the typical bright fold features of caustics are missing. This also exposes the method to comparisons to the much simpler method of projecting an image using a transparency. The main difference here is that redirecting light using a reflective or refractive surface uses the complete radiant power, which allows to create regions that are brighter than they would be if illuminated just by direct light.

On the other hand, the fold generation approach is aimed at reproducing contours by introducing folds at the correct locations. It does not account for brightness and is therefore mainly suited for simple, monochrome images. However, for complex shapes, considerable user interaction may be required to move distracting folds out of the way. Folds inside bright regions can remain, but may be regarded as aesthetic features instead of a detriment.

Ultimately, one can say that the brightness warping approach is a more scientifically accurate method, while the fold generation and editing are more of an artistic nature.

Section 7

The alternatives to parallel light sources and perfectly specular surfaces provided in Section 6.1 address simplifications that are rather simple to overcome. The following sections consider other limitations that could be investigated in future work, as well as other possibilities that may be worth exploring.

Section 7.1 Actual Height Fields

Perhaps the most severe simplification is that the actual shape of the height field is being ignored, and only its normals are used for the computations.

In practice, the algorithms produce rather flat fields (see Section 6.2.1), and the distortion that arises in the LuxRender simulations is not noticeable with the naked eye in the images throughout this patent application. However, as already discussed, the extent of the resulting height field depends on the distance to the receiver and the shape of the caustic. For some cases, this simplification may therefore become problematic, for example if the brightness warping approach is to be used for designing reflectors with a roughly parabolic shape.

Extending the existing approaches to directly account for the surface is not trivial due to the decoupling of the normal field computation and the conversion to a height field. As an alternative, it seems plausible that an iterative approach can be used to solve the problem. It requires the algorithms to be extended to a non-planar basis shape, parameterized by a height field. This shape is to be used whenever positions on the specular surface are computed, notably for ray directions, but it remains fixed throughout the optimization. The underlying optimization procedure, i.e. deforming a mesh on the specular or diffuse surface (brightness warping and fold generator, respectively), thus remains unchanged.

With this, the algorithm is run assuming a planar field in a first pass, and a height field is derived from that. Then, the algorithm is re-run using the newly obtained surface, and the height field recomputed. This is repeated until the shape converges. This idea not been implemented, so obviously no experiments were possible to assess whether it will indeed lead to convergence.

Section 7.2 Discontinuous Normal Fields

Figure 31A:
FIGS. 31A-31D show an optimization result for two different similar images, initialized using a planar field, where
Figure 31B:
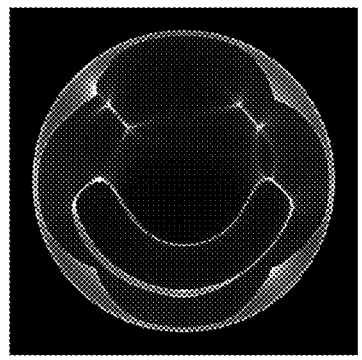
Figure 31C:
Figure 31D:
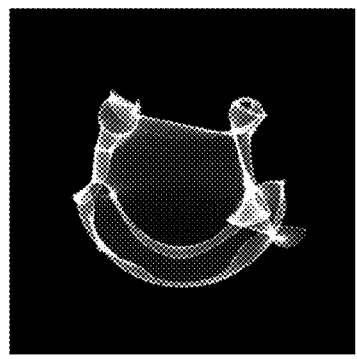

The assumption of connected caustic patterns is also a considerable restriction, think of FIG. 31D, for example. Although the brightness warping does not modify the caustic mesh (which must be contiguous) throughout the optimization, there is a noteworthy relation to disconnected caustics. As explained previously, the algorithm cannot produce perfectly black areas; this would require the caustic to be disconnected. However, very dark parts of the input image will result in small quadrilaterals in the warped mesh. The location of these quadrilaterals therefore determines where a discontinuity of the normal field would be appropriate, which could be used for an approach that treats the resulting regions independently. Advantageously, this segmentation also accounts for the integrability as well as the total power to be distributed to separate caustic pieces.

Obviously, the height field representation of the surface using a regular grid is not adequate for disconnected caustics, as the discontinuity will most often not lie on a grid line.

Section 7.3 Fold Generator

There are several limitations to the fold generator and its extension to user-guided editing. One is its slow convergence; to make interactive adjustments more practicable, considerable optimizations are required. It would also be fitting to explore methods that make the user interaction more direct, instead of the stepwise mechanism of repeatedly editing critical point positions and re-running the optimization.

Alternatively, a method that automatically detects striking undesired folds and corrects their positions to desired edges or to regions where they do not stand out as strongly would greatly increase the power of this approach. One idea was already mentioned in Section 4, namely using signed distance functions to penalize photons lying in areas that should not be illuminated.

One may also notice that the approach introduces and adjusts folds, but there is no direct way to dispel them yet. If there are corresponding control points in the optimization, they can of course be removed. But it is not granted that the smoothness term (Section 4.1.8) will abolish the fold when the optimization is re-applied. Though this is generally a difficult problem and no reasonable way to remove a fold may exist, FIG. 35D is an example where it seems plausible that the undesired ones can be straightened out, maybe just by locally varying the weight of the smoothness term.

Finally, it would be interesting to combine the fold generator and brightness warping so an image can reproduced accurately, but with folds occurring at clear contours. The problem of undesired folds is again of great significance here. Furthermore, an ambiguity concerning the desired irradiance of the faces in the caustic mesh arises. Brightness warping expects preface irradiances as input, but when folds are present, multiple faces can cover the same piece of the receiver, where the per-face irradiance sums up. To attain the desired brightness, this can be turned into an optimization problem and complemented with additional objectives to enforce smoothness and/or other properties.

Section 7.4 Further Extensions

One further limitation of the methods proposed in this patent application is the fixed setup: The caustics will only be projected as desired in a specific configuration of the incident light, the reflective or refractive object, and the receiver. As only one of two surfaces of a block of glass is used for refractive caustics, it is imaginable that by using both surfaces it would be possible to create a refractor where the outgoing light rays are parallel, so the distance to the receiver does not matter. Likewise, it is conceivable that an object can cast two different images at two different receiver locations (as also pointed out by Papas et al. [PJJ+11]) or when lit from two different angles.

Considering incident light, the idea to manufacture special windows to cast specific patterns in the sunlight is somewhat limited due to the sun's movement. One can easily imagine multiple versions of the same pattern, adjusted to different times of the day, so some caustics are distorted while others are more precise at a given time. Still, methods to refract the sunlight so the correct caustic is cast multiple times a day, or even constantly, would definitely come in handy.

Notwithstanding all these interesting possibilities, two of the main restrictions of the proposed approaches remain: The fact that they can not handle complex objects with self-shadowing and interreflections, and the assumption that any given point of the surface is hit only by rays of the same direction. Although they would be much more powerful, methods that overcome these limitations while retaining the advantages of the proposed approaches may be difficult to find.

Section 8

In this patent application, two methods for caustic design were proposed. The first one, dubbed brightness warping, computes the shape of a reflective or refractive surface that casts a given image when illuminated by a light source. The method operates on a set of normals and ignores the actual displacement of the surface throughout the computation; an actual height field is obtained in a second step. This approach allows for a gradient-based optimization method that scales to high resolutions. Natural images can therefore be reproduced very accurately, as was shown using ray-traced simulations. The results surpass these from state-of-the-art methods, though physical prototypes would be required for a conclusive comparison. In contrast to the similar work by Papas et al. [PJJ+11], smooth surfaces are generated, which may be beneficial for physical production.

The second approach investigates the typical fold features of caustics. As these are uninteresting or even undesired for classical luminaire design, this appears to be a fairly novel field of research. The only other work (to the author's knowledge) considering the reproduction of such features [FDL10] requires a complete image of a caustic as input. The proposed system is based on a framework describing these fold features, which was then turned into an optimization method used to introduce them at specified locations. To give some more control over the resulting caustic, the approach was extended for user interaction. As a result, it is possible to create caustics that "fill" a desired shape with complex patterns.

FIG. 44 shows rendering showing a brightness warping result together with the glass object casting the caustic. The template image is shown in the inset; it was originally created by Joakim Back†. The origins of this image is "Dereliction", Joakim Back, Creative Commons Attribution-Noncommercial; http://vuni.net/, retrieved on 30th Apr., 2011.

Section a Normal Fields to Height Fields

In Section 2.3.1, the linear least squares system for converting a normal field to a height field was described, with a singular matrix $\tilde{A}=A^TA$ in the normal equations. That matrix does not meet the sufficient (but not necessary) conditions for convergence of the Gauss-Seidel or conjugate gradient methods known from literature [She94, GVL96]: both will converge for symmetric, strictly positive definite matrices, Gauss-Seidel also converges for strictly diagonally dominant matrices. None of this conditions is met by $A^TA$. Nevertheless, both methods will work with the described matrix. This section is a rough outline why they do.

Section A.1 Gauss-Seidel Method

The Gauss-Seidel method [GVL96] is used to solve linear systems $\tilde{A}x=\tilde{B}$ (for a square matrix $\tilde{A}$, i.e. $\tilde{A}=A^TA$ for the above least squares problem). It relies on a matrix splitting $$\tilde{A}=M-N, \quad (A.1)$$

where M is the lower triangular component of $\tilde{A}$, including the diagonal. The method then iterates $$x_k=M^{-1}(\tilde{b}-Nx_{k-1}). \quad (A.2)$$

It can be shown that the distance to the solution after k iterations is with the iteration matrix $$ek=Gek-1=Ge_0, \quad (A.3)$$

$$G=M-1N=I-M-1\tilde{A}. \quad (A.4)$$

G's eigenvalues $\lambda_i$ determine the convergence of the method; it converges if all $|\lambda_i|<1$.

For our case, let us first note that the triangular matrix M is invertible (its determinant is the product of diagonal elements, which are all positive). Otherwise, the Gauss-Seidel method would not be applicable to the matrix in the first place.

Secondly, the proof in [GVL96, p. 512] stating that $|\lambda_i|<1$ for symmetric positive definite matrices directly translates to a weak version: $|\lambda_i|\leq 1$ for symmetric positive semi-definite matrices.

Thirdly, a vector is an eigenvector of G with eigenvalue 1 if and only if it is an eigenvector of with eigenvalue 0. In our case, the vector 1 and its multiples are the only such eigenvectors.

Now let us see what happens to ek. It should be noted that there is no unique solution, so let ek be the distance to the solution with mean 0. The Gauss-Seidel iteration will leave ek's components that are collinear with the eigenvector 1 alone, i.e. it will not change the mean of x (barring numerical drift). All other components will shrink due to $|\lambda_i|<1$, so the Gauss-Seidel method will indeed converge to a solution.

Section A.2 Conjugate Gradient Method

For an overview of the conjugate gradient method, the reader is referred to [She94] or [NW06]. The terminology of the latter will be used here. The method's convergence for a strictly positive definite symmetric matrix $\tilde{A}$ follows from several factors [NW06]:

i. The search directions $p_i$ are pairwise conjugate (or zero), $$p_i^T\tilde{A}p_j=0 \,\forall i\neq j: \quad (A.5)$$

if the algorithm has not found a solution after k iterations, i.e. the residual $rk=\tilde{A}xk-\tilde{b}$ is nonzero, the resulting search direction pk used by the next iteration is also nonzero This point is not explicitly stated in the proof in [NW06]. From the definition pk=−rk+βk pk−1=0, it follows rTpk=−rTrk≠0.

ii. a set of nonzero, pairwise conjugate vectors is linearly independent if $\tilde{A}$ definite; is positive iii. for a positive definite matrix $\tilde{A}$, the solution xk found after k iterations minimizes the convex objective $xTA\tilde{\,}x-xT\tilde{b}$ with respect to the space spanned by the previous search directions, i.e. it is the minimizer in the set $$\{x|x=x0+\text{span}\{p0,\ldots,pk-1\}\}. \quad (A.6)$$

The first three items imply that the search space will eventually span the whole $R^n$ (unless the optimum is found earlier and the directions become zero), so the algorithm will terminate with the correct solution after at most n iterations. In our case, the vector of ones 1 is orthogonal to the residuals $r_i$, since $$r_i=\tilde{A}x_i-\tilde{b} \quad (A.7)$$

$$A^TAx_i-A^Tb, \quad (A.8)$$

thus $$1^Tr_i = \underbrace{1^TA^T}_{0^T}Ax_i - \underbrace{1^TA^T}_{0^T}b = 0, \quad (A.9)$$

so by induction it is also orthogonal to the search directions $p_i$:

$$p0=r0 \Rightarrow 1^Tp0=0$$

$$p_i=-r_i+\beta_ip_i-1 \Rightarrow 1^Tp_i=0.$$

Again, this means that the algorithm will not change the mean of our solution. The semidefiniteness and singularity of our matrix does not affect the conjugacy of the directions (i) and the fact that the algorithm produces nonzero directions if it has not found the solution yet (ii). The linear independence of pairwise conjugate nonzero vectors (iii) is also guaranteed if they are not collinear with 1; assuming a linear dependence $$\sum_i c_i p_i = 0 \quad (A.10)$$

implies that the coefficients $c_i$ are all 0:

$$p_j^T\tilde{A}\sum_i c_i p_i = p_j^T\tilde{A}p_jc_j = 0, \quad (A.11)$$

where $p^T\tilde{A}p_j$ is nonnegative due to the semidefiniteness and nonzero since the $p_i$ are not collinear with 1.

The optimality property (iv) assumes a unique solution in its proof, and since the solution is unique with respect to the search space, the property still holds.

Put together, this means that the search space will not span Rn (if the algorithm does not terminate earlier), instead it will span an n−1-dimensional subspace orthogonal to 1, where the solution is unique, and the algorithm will find a correct solution. This concludes the argument why the conjugate gradient method can still be applied to our singular optimization problem.

REFERENCE NUMERALS 1 first mesh
2 first surface
3 cell area of the first mesh
5 second surface
9 second mesh
11 cell area of the second mesh

REFERENCES

[ASG08] O. Anson, F. J. Seron, and D. Gutierrez. NURBS-based inverse reflector design. In *Proceedings of CEIG 2008*, pages 65-74, 2008.

[Can86] J. Canny. A computational approach to edge detection. *IEEE Trans. Pattern Anal. Mach. Intell.*, 8(6):679-698, November 1986.

[CP04] A. K. Chaniotis and D. Poulikakos. High order interpolation and differentiation using B-splines. *J. Comput. Phys.*, 197:253-274, June 2004.

[DCC99] Steven Doyle, David Corcoran, and Jon Connell. Automated mirror design using an evolution strategy. *Optical Engineering*, 38(2):323-333, 1999.

[FDL10] Manuel Finckh, Holger Dammertz, and Hendrik P. A. Lensch. Geometry construction from caustic images. In Kostas Daniilidis, Petros Maragos, and Nikos Paragios, editors, *Computer Vision—ECCV 2010*, volume 6315 of *Lecture Notes in Computer Science*, pages 464-477. Springer, 2010.

[FLW02] Raanan Fattal, Dani Lischinski, and Michael Werman. Gradient domain high dynamic range compression. In *Proceedings of the 29th annual conference on Computer graphics and interactive techniques*, SIGGRAPH '02, pages 249-256, New York, N.Y., USA, 2002. ACM.

[GVL96] G. H. Golub and C. F. Van Loan. *Matrix computations*. Johns Hopkins University Press, 3rd edition, 1996.

[Hac85] W. Hackbusch. *Multi-grid methods and applications*. Springer series in computational mathematics. Springer, 1985.

[LSS98] J. Loos, Ph. Slusallek, and H.-P. Seidel. Using wavefront tracing for the visualization and optimization of progressive lenses. *Computer Graphics Forum*, 17(3): 255-265, 1998.

[MMP09] A. Mas, I. Martóin, and G. Patow. Fast inverse reflector design (FIRD). *Computer Graphics Forum*, 28(8):2046-2056, 2009.

[Neu97] A. Neubauer. Design of 3D-reflectors for near field and far field problems. *Institute for Mathematics and its Applications*, 92:101-118, 1997.

[NW06] Jorge Nocedal and Stephen J. Wright. *Numerical optimization*. Springer, 2nd edition, 2006.

[PJJ+11] Marios Papas, Wojciech Jarosz, Wenzel Jakob, Szymon Rusinkiewicz, Wojciech Matusik, and Tim Weyrich. Goal-based caustics. *Computer Graphics Forum (Proceedings of Eurographics '11)*, 30(2), June 2011.

[PP05] Gustavo Patow and Xavier Pueyo. A survey of inverse surface design from light transport behavior specification. *Computer Graphics Forum*, 24(4):773-789, 2005.

[PPV07] Gustavo Patow, Xavier Pueyo, and Alvar Vinacua. User-guided inverse reflector design. *Computers & Graphics*, 31(3):501-515, 2007.

[Ric72] William Hadley Richardson. Bayesian-based iterative method of image restoration. *Journal of the Optical Society of America*, 62(1):55-59, January 1972.

[She94] Jonathan R. Shewchuk. An introduction to the conjugate gradient method without the agonizing pain. Technical report, Carnegie Mellon University, Pittsburgh, Pa., USA, 1994.

[WN75] B. S. Westcott and A. P. Norris. Reflector synthesis for generalized far-fields. *Journal of Physics A: Mathematical and General*, 8(4):521, 1975.

[WPMR09] Tim Weyrich, Pieter Peers, Wojciech Matusik, and Szymon Rusinkiewicz. Fabricating microgeometry for custom surface reflectance. *ACM Transactions on Graphics (Proc. SIGGRAPH)*, 28(3), August 2009.

[WZHB09] Bruce Walter, Shuang Zhao, Nicolas Holzschuch, and Kavita Bala. Single scattering in refractive media with triangle mesh boundaries. *ACM Transactions on Graphics*, 28(3), August 2009.

We claim:

1. A method for forming a reflective or refractive surface, comprising:

providing a processor;

discretizing a two-dimensional image formed on a first surface into a first mesh of a plurality of first nodes on the first surface via the processor, wherein a first portion of the plurality of the first nodes on the first surface defines a first cell area $A_{d,1}$ of the first mesh on which a first beam of light with a first radiant flux $\Phi_1$ is incident, and a second portion of the plurality of the first nodes on the first surface defines a second cell area $A_{d,2}$ of the first mesh on which a second beam of light with a second radiant flux $\Phi_2$ is incident, and wherein the second cell area $A_{d,2}$ of the first mesh is adjacent to the first cell area $A_{d,1}$ of the first mesh and the first cell area $A_{d,1}$ of the first mesh and the second cell area $A_{d,2}$ of the first mesh have at least one first one node of the plurality of first nodes in common;

discretizing a reflective or refractive second surface into a second mesh of a plurality of
second nodes on a second surface via the processor, wherein a first portion of the plurality of the second nodes on the second surface defines a first cell area $A_{s,1}$ of the second mesh on which the first beam of light with the first radiant flux $\Phi_1$ is incident and is deviated towards the first cell area $A_{d,1}$ of the first mesh, and a second portion of the plurality of the second nodes on the second surface define a second cell area $A_{s,2}$ of the second mesh on which the second beam of light with the second radiant flux $\Phi_2$ is incident and is deviated towards the second cell area $A_{d,2}$ of the first mesh, and wherein the first cell area $A_{s,1}$ of the second mesh is adjacent to the second cell area $A_{s,2}$ of the second mesh and the first cell area $A_{s,1}$ of the second mesh and the second cell area $A_{s,2}$ of the second mesh have at least one second node of the plurality of second nodes in common;

in an iterative optimization process, adjusting positions of one or more second nodes of the first portion of the plurality of second nodes of the first cell area $A_{s,1}$ of the second mesh on the second surface via the processor, so that the first cell area $A_{s,1}$ of the second mesh corresponds to a first radiant exitance $M_1$ of the first beam of light on the first cell area $A_{s,1}$ of the second mesh on the second surface, wherein the first radiant exitance $M_1$ corresponds to a brightness of the two-dimensional image in the first cell area $A_{d,1}$ of the first mesh; and adjusting positions of one or more second nodes of the second portion of the plurality second nodes of the second cell area $A_{s,2}$ of the second mesh on the second surface via the processor, so that the second cell area $A_{s,2}$ of the second mesh corresponds to a second radiant exitance $M_2$ of the second beam of light on the second cell area $A_{s,2}$ of the second mesh on the second surface, wherein the second radiant exitance $M_2$ corresponds to a brightness of the two-dimensional image in the second cell area $A_{d,1}$ of the first mesh.

2. The method according to claim 1, further comprising: determining surface normals at each of the one or more second nodes of the first portion of the plurality of second nodes defining the first cell area $A_{s,1}$ of the second mesh on the second surface with adjusted positions on the second surface via the processor, the surface normals corresponding to rays of the first beam of light that are incident on the second surface and extend between the one or more second nodes of the first portion of the plurality of second nodes defining the first cell area $A_{s,1}$ of the second mesh with adjusted positions and the first portion of the plurality of first nodes of the first cell area $A_{d,1}$ of the first mesh on the first surface; and calculating a height field corresponding to the surface normals via the processor, the height field corresponding to the surface normals defining the reflective or refractive second surface.

3. The method according to claim 2,
wherein a field of surface normals corresponding to the surface normals is continuous and the height field corresponding to the surface normals is continuously differentiable.

4. The method according to claim 1,
wherein the first mesh of the plurality of first nodes and the second mesh of the plurality of second nodes are triangular, or quadrilateral, meshes comprising triangular, or quadrilateral, cell areas, respectively.

5. The method according to claim 1,
wherein the first mesh of the plurality of first nodes is a regular fixed mesh.

6. The method according to claim 1, wherein the first beam of light and the second beam of light comprise the same radiant exitance $M_i$ on the second surface.

7. An apparatus for forming a reflective or refractive surface, comprising:
a processor,
wherein the apparatus is configured to perform the method of claim 1.

8. One or more non-transitory computer readable media having executable programming instructions stored thereon that, when executed by one or more processors of a device cause the one or more processors to perform a method according to claim 1.

9. A method for forming a reflective or refractive surface, comprising:
providing a processor;
discretizing a two dimensional image formed on a first surface into a first mesh of a plurality of first nodes on the first surface via the processor,
wherein a first portion of the plurality of first nodes on the first surface defines a first cell area $A_{d,1}$ of the first mesh on which a first beam of light with a first radiant flux $\Phi_1$ is incident, and a second portion of the plurality of first nodes on the first surface defines a second cell area $A_{d,2}$ of the first mesh on which a second beam of light with a second radiant flux $\Phi_2$ is incident, and
wherein the second cell area $A_{d,2}$ of the first mesh is adjacent to the first cell area $A_{d,1}$ of the first mesh and the first cell area $A_{d,1}$ of the first mesh and the second cell area $A_{d,2}$ of the first mesh have at least one first node of the plurality of first nodes in common;
discretizing a reflective or refractive second surface into a second mesh of a plurality of second nodes on a second surface via the processor,
wherein a first portion of the plurality of second nodes on the second surface defines a first cell area $A_{s,1}$ of the second mesh on which the first beam of light with the first radiant flux $\Phi_1$ is incident, and a second portion of the plurality of second nodes on the second surface defines a second cell area $A_{s,2}$ of the second mesh on which the second beam of light with the second radiant flux $\Phi_2$ is incident, and
wherein the second cell area $A_{s,2}$ of the second mesh is adjacent to the first cell area $A_{s,1}$ of the second mesh and the first cell area $A_{s,1}$ of the second mesh the second cell area $A_{s,2}$ of the second mesh have at least one second node of the plurality of second nodes in common;
in an iterative optimization process, adjusting positions of one or more first nodes of the first portion of the plurality of the first nodes defining the first cell area $A_{d,1}$ of the first mesh on the first surface on which the two dimensional image is formed via the processor, so as to correspond to a first radiant exitance $M_1$ of the first beam of light on the first cell area $A_{d,1}$ of the first mesh,
wherein the first radiant exitance $M_1$ corresponds to a brightness of the two-dimensional image in the first cell area $A_{d,1}$ of the first mesh; and
adjusting positions of one or more first nodes of the second portion of the plurality of the first nodes defining the second cell area $A_{d,2}$ of the first mesh on the first surface on which the two dimensional image is formed via the processor, so as to correspond to a second radiant exitance $M_2$ of the second beam of light on the second cell area $A_{d,2}$ of the first mesh,
wherein the second radiant exitance $M_2$ corresponds to a brightness of the two dimensional image in the second cell area $A_{d,2}$ of the first mesh.

10. The method according to claim 9,
determining surface normals of the second surface at each second node of the first portion of the plurality of second nodes defining the first cell area $A_{s,1}$ of the second mesh via the processor, the surface normals corresponding to rays of the first beam of light that are incident on the second surface and extend between the first portion of the plurality of second nodes defining the first cell area $A_{s,1}$ of the second mesh on the second surface and the one or more first nodes of the first portion of the plurality of first nodes defining the first cell area $A_{d,1}$ of the first mesh on the first surface with adjusted positions; and
calculating a height field corresponding to the surface normals via the processor.

11. The method according to claim 10,
wherein a field of surface normals corresponding to the surface normals is continuous and the height field corresponding to the surface normals is continuously differentiable.

12. The method according to claim 10,
wherein adjusting the positions of the one or more first nodes of the first portion of the plurality of the first nodes defining the first cell area $A_{d,1}$ of the first mesh on the first surface on which the two dimensional image is formed, adjusting the positions of one or more first nodes of the second portion of the plurality of the first nodes defining the second cell area $A_{d,2}$ of the first mesh on the first surface on which the two dimensional image is formed, and determining the surface normals of the second surface at each second node of the first portion of the first portion of the plurality of second nodes defining the first cell area $A_{s,1}$ of the second mesh having adjusted positions is performed via the processor with an optimization algorithm.

13. The method according to claim 9, wherein the first mesh of the plurality of first nodes on the first surface and the second mesh of the plurality of second nodes on the second surface are triangular, or quadrilateral, meshes comprising triangular, or quadrilateral, cell areas, respectively.

14. The method according to claim 9, wherein the second mesh of the plurality of second nodes is a regular fixed mesh.

15. The method according to claim 9, wherein the first beam of light and the second beam of light have the same radiant flux $\Phi_i$ and the same radiant exitance $M_i$ on the first cell area $A_{s,1}$ of the second mesh and second cell area $A_{s,2}$ of the second mesh, respectively, and have the same radiant flux $\Phi_i$ and different radiant exitances $M_1$ and $M_2$ on the first cell area $A_{d,1}$ of the first mesh and the second cell area $A_{d,2}$ of the first mesh having adjusted node positions, respectively.

16. The method according to claim 9, further comprising: adjusting positions of one or more first nodes of the second portion of the plurality of first nodes defining the second cell area $A_{d,2}$ of the first mesh via the processor, wherein the second cell area $A_{d,2}$ of the first mesh corresponds to the second beam of light that has a second radiant exitance $M_2$ on the second cell area $A_{d,2}$ of the first mesh and at least partially overlaps the first cell area $A_{d,1}$ of the first mesh so that a superposition of the first beam of light and the second beam of light corresponds to a superposed light intensity in an overlapping first cell area $A_{d,1}$ of the first mesh and second cell area $A_{d,2}$ of the first mesh on the first surface.

17. The method according to claim 16, wherein the overlapping first cell area $A_{d,1}$ of the first mesh and the second cell area $A_{d,2}$ of the first mesh corresponds to at least one step transition of the light intensity or a singularity of the light intensity in the two dimensional image.

18. The method according to claim 16, further comprising: adjusting positions of one or more first nodes of a corresponding multiple portions of the plurality of first nodes defining multiple cell areas $A_{d,i}$ of the first mesh via the processor, wherein the multiple cell areas $A_{d,i}$ of the first mesh correspond to multiple adjacent beams of light having respective radiant exitances $M_i$ on the multiple cell areas $A_{d,i}$ of the first mesh and on multiple cell areas $A_{s,i}$ of the second mesh, the multiple cell areas $A_{d,i}$ of the first mesh at least partially overlapping each other corresponding to multiple overlapping beams of light, and
wherein regions on the first surface where the multiple adjacent beams of light superpose with each other include regions of step transitions of light intensity of the two-dimensional image.

19. The method according to claim 18, further comprising: performing an optimization using an optimization algorithm via the processor to obtain the surface normals of the second surface.

20. The method according to claim 16, wherein adjusting the positions of the one or more first nodes of the first portion of the plurality of first nodes defining the first cell area $A_{d,1}$ of the first mesh on the first surface and the positions of the one or more first nodes of the second portion of the plurality of first nodes defining the second cell area $A_{d,2}$ of the first mesh on the first surface is at least partially in correspondence with a position of an edge of transition of light intensity so that the second cell area $A_{d,2}$ of the first mesh corresponding to the second beam of light overlaps the first cell area $A_{d,1}$ of the first mesh in a region which includes the edge of transition of light intensity and the first beam of light correspondingly overlaps the second beam of light.

21. The method according to claim 9, further comprising: determining at least one cell area $A_{d,i}$ of the first mesh that comprises at least one edge of at least one step transition of light intensity corresponding to at least one light intensity function singularity in the two dimensional image via the processor; and
determining the at least one position of the at least one edge of the at least one step transition of light intensity in the at least one cell area $A_{d,i}$ of the first mesh via the processor.

22. The method according to claim 21, wherein determining the at least one cell area $A_{d,i}$ of the first mesh that comprises the at least one edge of the at least one step transition of light intensity includes using the Canny edge detection algorithm.

23. The method according to claim 21, further comprising: determining at least one vector $d_{C,i}$ defining at least one orientation of the at least one edge of the at least one step transition of light intensity and at least one direction of either high light intensity, or low light intensity, in the two-dimensional image with regard to the at least one edge.

24. A system configured to determine in an iterative optimization process based on a template image formed on a two-dimensional surface a deformation of a mesh, comprising:
a processor,
wherein the processor is configured to:
determine, in an iterative optimization process, a deformation of a mesh comprising a plurality of cells which correspond to a plurality of imaginary partial light beams each having a respective radiant flux $\Phi_i$,
wherein each cell of the plurality of cells comprises several nodes which are defined on a two-dimensional surface such that in a deformed mesh resulting from a deformation of the mesh each area of a cell of the plurality of cells corresponds to a predetermined light intensity or exitance $M_i$ of a respective imaginary partial light beam of the plurality of imaginary partial light beams, a sum of the predetermined light intensities of the plurality of imaginary partial light beams forming a template image, and
wherein corresponding to the deformation of the mesh at least some of the nodes of the deformed mesh are shifted on the two-dimensional surface with regard to their position on the two-dimensional surface prior to the iterative optimization process; and
obtain a field of surface normals on a surface on which the plurality of imaginary partial light beams impinge based on the deformation of the mesh, the surface corresponding to a refractive or reflective surface or to a surface corresponding to the template image formed by the plurality of imaginary partial light beams.

25. The system of claim 24, wherein the processor is configured to determine a height field based on the field of surface normals, the height field representing a surface of a refractive or reflective slab of material that produces the template image when light is shined on it.

26. The system of claim 24,
wherein the processor, using an optimization algorithm, is configured to calculate at least one of the deformed mesh, the field of surface normals, and the height field.

27. The system of claim 24,
wherein the processor is configured to detect and determine a position and/or an orientation of a transition of light intensity in the template image.

28. The system of claim 27,
wherein the processor is configured to determine the deformation of the mesh corresponding to light intensities of partial light beams defined by the template image, and
wherein the processor considers at least one edge of a light transition in the template image as a singularity of the light intensity distribution function and as an area where the cells of the deformed mesh overlap each other corresponding to an overlap of partial light beams emanating from different cell areas of the mesh on the refractive or reflective surface.

* * * * *

UNITED STATES PATENT AND TRADEMARK OFFICE
CERTIFICATE OF CORRECTION

PATENT NO. : 9,576,553 B2
APPLICATION NO. : 13/974989
DATED : February 21, 2017
INVENTOR(S) : Mark Pauly and Thomas Kiser It is certified that error appears in the above-identified patent and that said Letters Patent is hereby corrected as shown below:

Column 3,
Line 35, "$\Phi_1$, is" should read --$\Phi_i$ is--.

Column 15,
Line 66, "(1), is" should read --$\Phi_i$ is--.

Column 25,
Line 42, "[PB+11]." should read --[PJJ+11].--.

Column 33,
Line 23, "the up" should read --the $u_P$--.

Column 36,
Line 42, "17C. FIGS. 18A-18B" should read --17C.
       FIGS. 18A-18B--.

Column 37,
Line 28, "(positions)," should read --(positions $x_j$),--.

Column 38,

Line 60, "$2f_1 \cdot \Sigma u_j k'(x_{C,i}-x_j)k(y_{C,i}-y_j)$ for $x_{C,i}$" should read
-- $2f_1 \cdot \sum_j u_j k'(x_{C,i} - x_j)k(y_{C,i} - y_j)$ for $x_{C,i}$ --.

Line 62, "$2f_1 \cdot \Sigma u_j k(x_{C,i}-x_j)k'(y_{C,i}-y_j)$ for $y_{C,i}$" should read
-- $2f_1 \cdot \sum_j u_j k(x_{C,i} - x_j)k'(y_{C,i} - y_j)$ for $y_{C,i}$ --.

Signed and Sealed this
Nineteenth Day of December, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,576,553 B2

Column 39,
Line 31, "(4.7b)" should read --(4.7a)--.

Line 34, "$2f_{2,x}(\Sigma_j u_j k'(x_{C,i}-x_j)k'(y_{C,i}-y_j))r_{C,i} \text{ for } y_{C,i}$" should read
--$2f_{2,x}\left(\sum_j u_j k'(x_{C,i} - x_j)k'(y_{C,i} - y_j)\right) \cdot d_{C,i} \quad \text{for } y_{C,i}$--.

Column 41,
Line 17, "(4.15)" should read --(4.15a)--.

Column 57,
Line 55, "$|_i|<1$." should read --$|\lambda_i|<1$.--.
Line 65, "of with" should read --of A˜ with--.